United States Patent
Sengupta et al.

(10) Patent No.: US 11,190,329 B2
(45) Date of Patent: Nov. 30, 2021

(54) UPLINK LOW-PAPR DMRS SEQUENCE DESIGN

(71) Applicant: Intel Corporation, Santa Clara, CA (US)

(72) Inventors: Avik Sengupta, San Jose, CA (US); Sameer Pawar, Santa Clara, CA (US); Alexei Vladimirovich Davydov, Nizhny Novgorod (RU); Guotong Wang, Beijing (CN); Gregory Vladimirovich Morozov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/724,178

(22) Filed: Dec. 20, 2019

(65) Prior Publication Data
US 2020/0127801 A1    Apr. 23, 2020

Related U.S. Application Data

(60) Provisional application No. 62/791,694, filed on Jan. 11, 2019, provisional application No. 62/806,679, (Continued)

(51) Int. Cl.
| | |
|---|---|
| *H04L 5/10* | (2006.01) |
| *H04L 5/00* | (2006.01) |
| *H04L 27/26* | (2006.01) |
| *H04W 72/04* | (2009.01) |
| *H04L 27/20* | (2006.01) |

(52) U.S. Cl.
CPC ............. *H04L 5/10* (2013.01); *H04L 5/0051* (2013.01); *H04L 27/2035* (2013.01);
(Continued)

(58) Field of Classification Search
CPC ..... H04L 5/10; H04L 5/0051; H04L 27/2035; H04L 27/2614; H04L 27/2636; H04W 72/042
See application file for complete search history.

(56) References Cited

U.S. PATENT DOCUMENTS

| | | | |
|---|---|---|---|
| 2018/0324005 A1* | 11/2018 | Kim ...................... | H03H 17/04 |
| 2020/0059335 A1* | 2/2020 | Hu ......................... | H04W 72/04 |

(Continued)

OTHER PUBLICATIONS

"3GPP TS 38.211 v15.1.0, NR Physical Channels and Modulation (Release 15)", Technical Specification. 3GPP Organizational Partners., (2018), 102 pgs.
(Continued)

*Primary Examiner* — Duc C Ho
(74) *Attorney, Agent, or Firm* — Schwegman Lundberg & Woessner, P.A.

(57) ABSTRACT

An apparatus of user equipment (UE) includes processing circuitry coupled to a memory, where to configure the UE for DMRS processing in an NR network, the processing circuitry is to generate a plurality of binary sequences of length L, the binary sequences being arranged according to a signal quality metric. A set of CGSs is generated using the binary sequences, based on minimizing cross-correlation between subsets of binary sequences of different lengths selected from the plurality of binary sequences. A CGS is selected from the set of CGSs as a DMRS, based on uplink PRB resource allocation. The DMRS is encoded for transmission, where the encoding includes BPSK modulation and discrete Fourier transformation (DFT) spreading of the DMRS.

20 Claims, 13 Drawing Sheets

Related U.S. Application Data filed on Feb. 15, 2019, provisional application No. 62/808,730, filed on Feb. 21, 2019, provisional application No. 62/809,443, filed on Feb. 22, 2019, provisional application No. 62/817,944, filed on Mar. 13, 2019.

(52) U.S. Cl.
CPC ...... *H04L 27/2614* (2013.01); *H04L 27/2636* (2013.01); *H04W 72/042* (2013.01)

(56) References Cited

U.S. PATENT DOCUMENTS

| | | | |
|---|---|---|---|
| 2020/0112466 A1* | 4/2020 | Yang | H04L 27/2613 |
| 2020/0214083 A1* | 7/2020 | Sengupta | H04L 27/2614 |
| 2020/0259693 A1* | 8/2020 | Baldemair | H04L 5/0048 |

OTHER PUBLICATIONS

"3GPP TS 38.212 v15.1.0, NR Multiplexing and Channel Coding (Release 15)", Technical Specification. 3GPP Organizational Partners, (2018), 94 pgs.

"3GPP TS 38.214 V15.1.0, NR Physical Layer Procedures for Data (Release 15)", Technical Specification. 3GPP Organizational Partners., (2018), 77 pgs.

"Benefits of Resource Specific DMRS mapping", Ericsson. R1-1806231 ,3GPP RAN WG1 Meeting #93, (2018), 4 pgs.

"Study on the maximum number of MIMO layers for MU-MIMO", Intel Corporation, R1-1702190, , 3GPP TSG RAN1 Meeting #88, (2017), 4 pgs.

\* cited by examiner

UPLINK LOW-PAPR DMRS SEQUENCE DESIGN

CROSS-REFERENCE TO RELATED APPLICATION

This patent application claims the benefit of U.S. Provisional Patent Application No. 62/791,694, filed Jan. 11, 2019; 62/806,679, filed Feb. 15, 2019; 62/808,730, filed Feb. 21, 2019; 62/809,443, filed Feb. 22, 2019; and 62/817,944, filed Mar. 13, 2019, each of which are incorporated by reference herein in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Other aspects are directed to techniques for low uplink peak-to-average-power-ratio (PAPR) demodulation reference signal (DMRS) sequence design.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include configuring uplink low-PAPR DMRS sequence design.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 5 in FIG. 6 illustrate example frequency domain complex sequences that can be used for linear cross-correlation, in accordance with some aspects.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
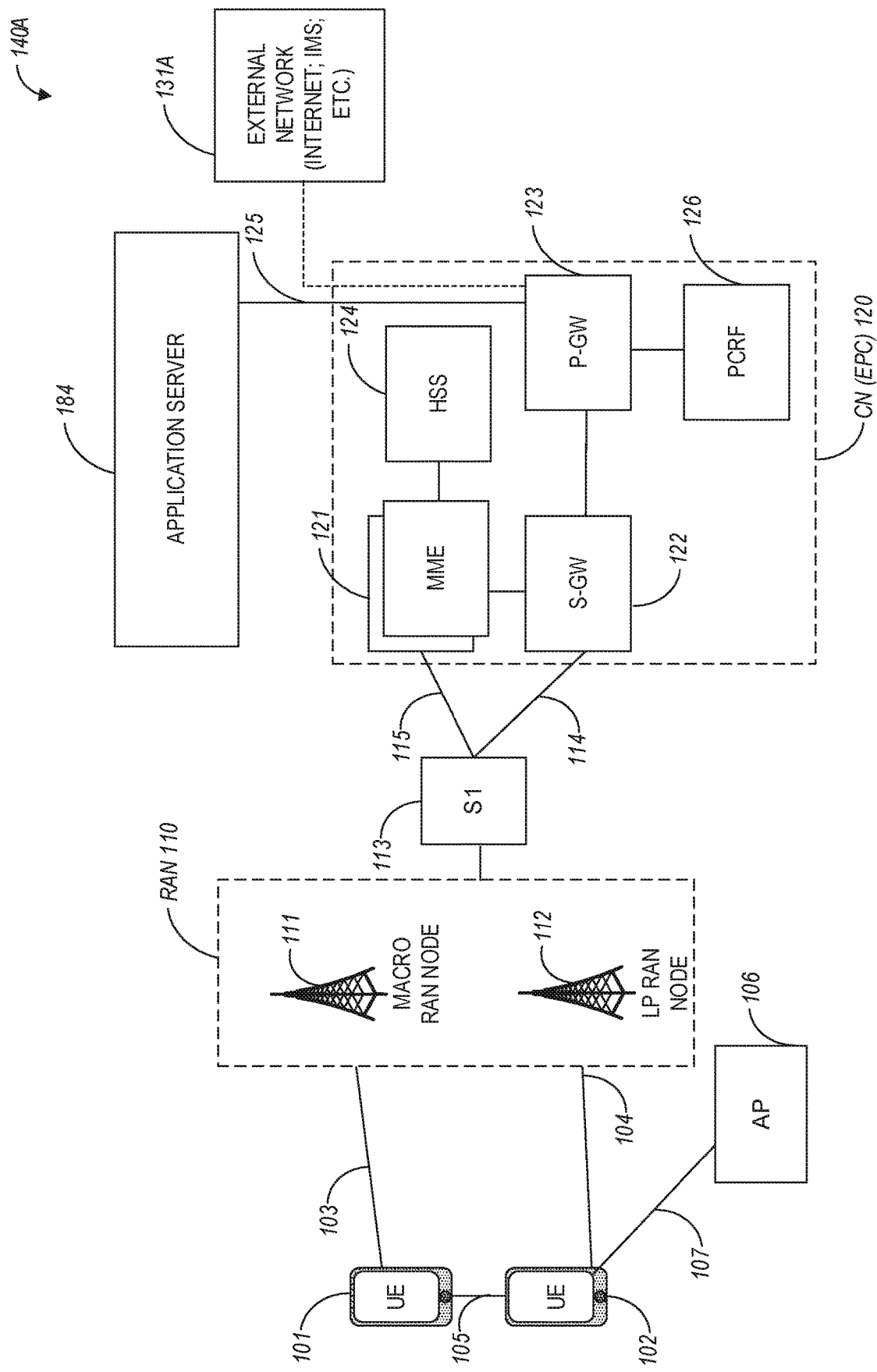
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
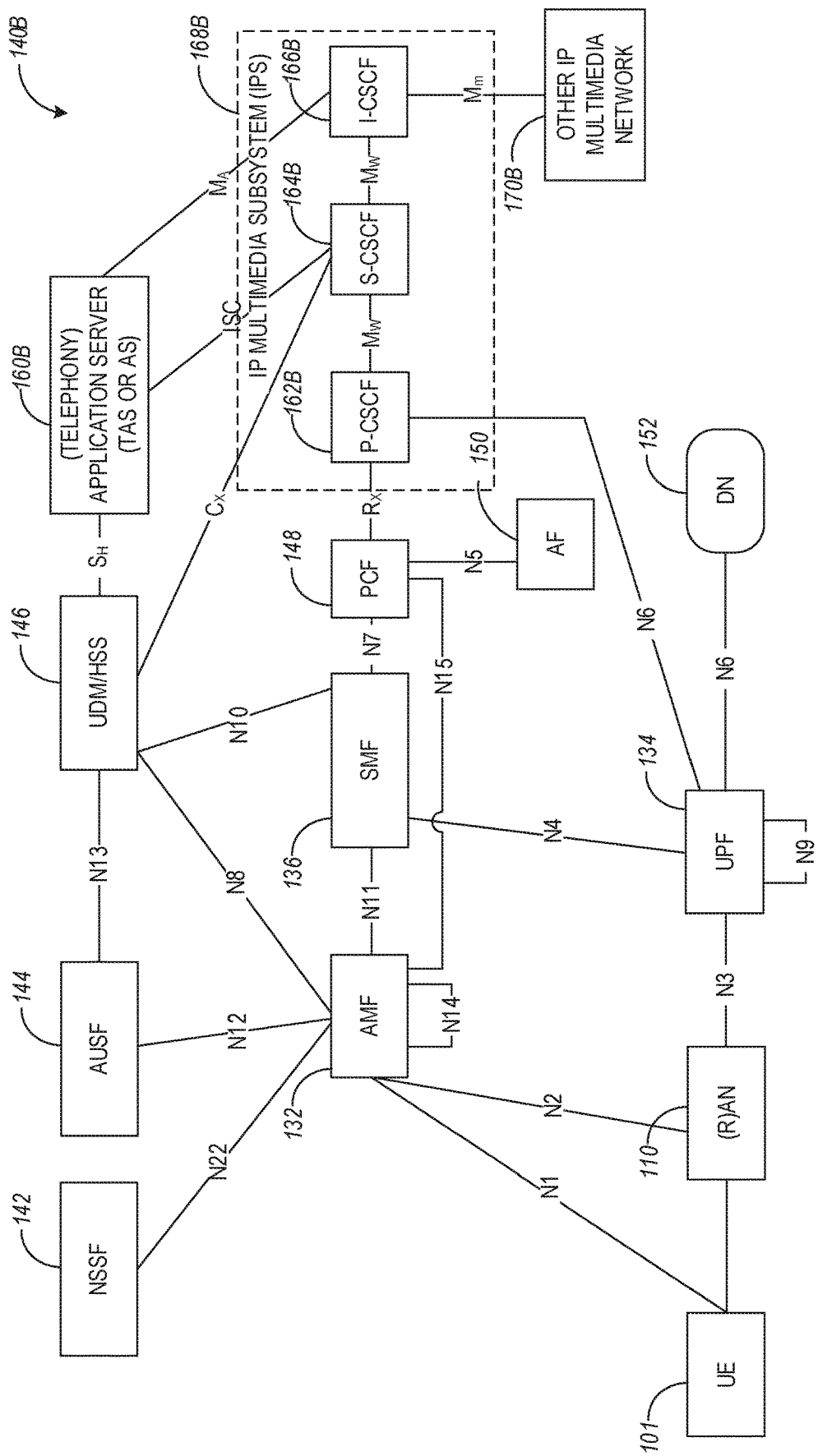
FIG. 1B and FIG. 1C illustrate a non-roaming 5G system architecture, in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
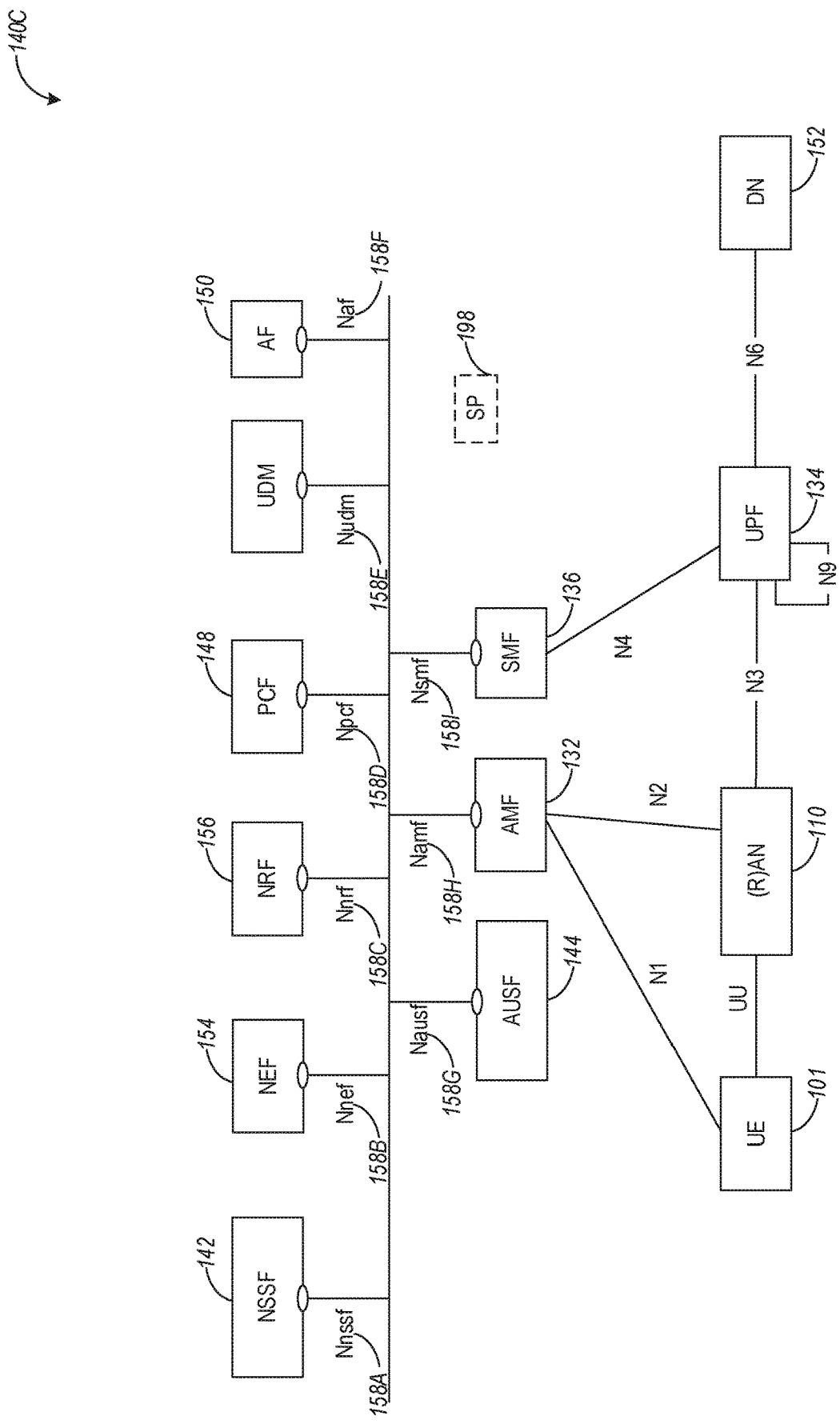

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE or a base station (e.g., any of the UEs or base stations illustrated in connection with FIG. 1A-FIG. 1C).

Techniques discussed herein are associated with 3GPP NR Rel-16 and NR MIMO low PAPR reference signal design. For PUSCH/PUCCH DMRS for pi/2 modulation, new DMRS sequences may be specified to reduce the PAPR to the same level as for data symbols. In some aspects, for length 6 computer-generated sequences (CGS), 8-PSK may be used.

In Rel-15 NR, for the case of pi/2 BPSK modulated DFT-S-OFDM based PUSCH/PUCCH, the corresponding demodulation reference signals (DMRSs) may be generated in the frequency domain based on computer-generated sequences (CGS) mapped to QPSK constellation for the case of resource allocation of up to 3 physical resource blocks (PRBs) or based on extended Zadoff-Chu sequences for larger resource allocations. For the case when pi/2 BPSK modulation is used for data, the PAPR of the DMRS is degraded compared to the data especially when pulse shaping is used.

Techniques discussed herein can be used for low PAPR reference signal design for DFT-S-OFDM based PUSCH/PUCCH with pi/2 BPSK modulation for large and small resource allocation.

Figure 2:
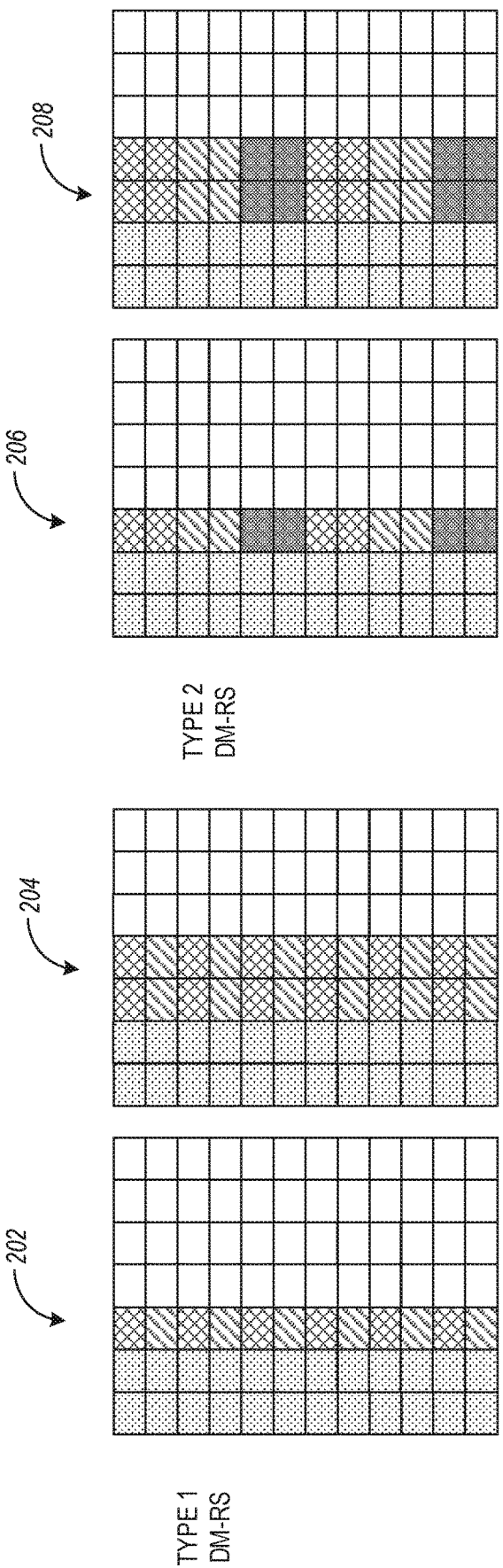
FIG. 2 illustrates example type I and type II DMRS, in accordance with some aspects.

FIG. 2 illustrates example type I and type II DMRS, in accordance with some aspects. In NR Rel-15, two different DMRS types were designed namely Type-1 DMRS (202 and 204) and Type-2 DMRS (206 and 208) which are shown in FIG. 2.

For the single symbol case, Type 1 DMRS uses a comb-2 structure with 2 CDM-Groups and length-2 FD-OCC per pair of alternating REs in each CDM-Group, while Type 2 DMRS uses a comb-3 structure with 3 CDM-Groups and length-2 FD-OCC per pair of adjacent REs in each CDM-Group. The length-2 FD-OCC is given by [1 1, 1 −1].

For Uplink DMRS, when the DFT-S-OFDM waveform is used, only Type 1 DMRS is used in Rel-15 NR. For this case, the DMRS base sequence is generated in the frequency domain according to the following:

(a) Case I (Small Resource Allocation): For base sequences of length {6, 12, 18, 24} computer-generated sequences mapped to QPSK constellation are used. For length 30, the sequence is also constant modulus and is based on points chosen from the unit circle in the I/Q plane.

(b) Case II (Larger Resource Allocation): For base sequences of length 36 or larger, cyclically extended Zadoff-ChuZC) sequence is used.

In some aspects, the base sequences are divided into $u \in \{1, \ldots, 30\}$ each containing a single base sequence for sequence length up to $5_{sc}^{RB}$ (where $N_{sc}^{RB}=12$ for NR) and two base sequences for larger sequence length where $v \in \{0, 1\}$ is the base sequence number. In some aspects, the DMRS sequences are generated in the frequency domain i.e., they are not DFT-spread and are constant modulus signals in the frequency domain. In the case when pi/2-BPSK is used for modulating the PUSCH/PUCCH, the PAPR of the data becomes much lower than of the ZC or CGS based DMRS. In this IDF, we propose sequence design for the case of PUSCH/PUCCH when pi/2 BPSK modulation and DFT-s-OFDM waveform is used. We discuss sequence design for the aforementioned cases separately.

In some embodiments, for the case of Rel-16 NR, the DMRS for pi/2 BPSK modulated PUSCH and PUCCH can be generated in the time domain as a binary sequence, mapped to a pi/2 BPSK constellation and then transmitted after DFT-spreading and OFDM symbol generation similar to PUSCH/PUCCH. For this case, a Type 1 DMRS mapping in the frequency domain, with the following sequence options can be used:

(a) Case I (Resource Allocations of 1-4 PRB): Sequence lengths {6, 12, 18 and 24} use binary CGS sequences; and (b) Case II (Resource Allocations of more than 4 PRB): Sequence lengths of 30 and above use PN sequences based on Gold Code.

In some aspects, the mapping of the binary sequence b(i) to pi/2 BPSK sequence d(i) is defined according to the following equation:

$$d(i) = \frac{e^{j\frac{\pi}{2}(i \bmod 2)}}{\sqrt{2}}[(1 - 2b(i)) + j(1 - 2b(i))].$$

In some aspects, after DFT-spreading of the pi/2-BPSK modulated DMRS sequence, frequency-domain pulse/spectrum shaping can be applied.

Sequence Design for Case I (Small Resource Allocation. 1-4 PRB)

Figure 3:
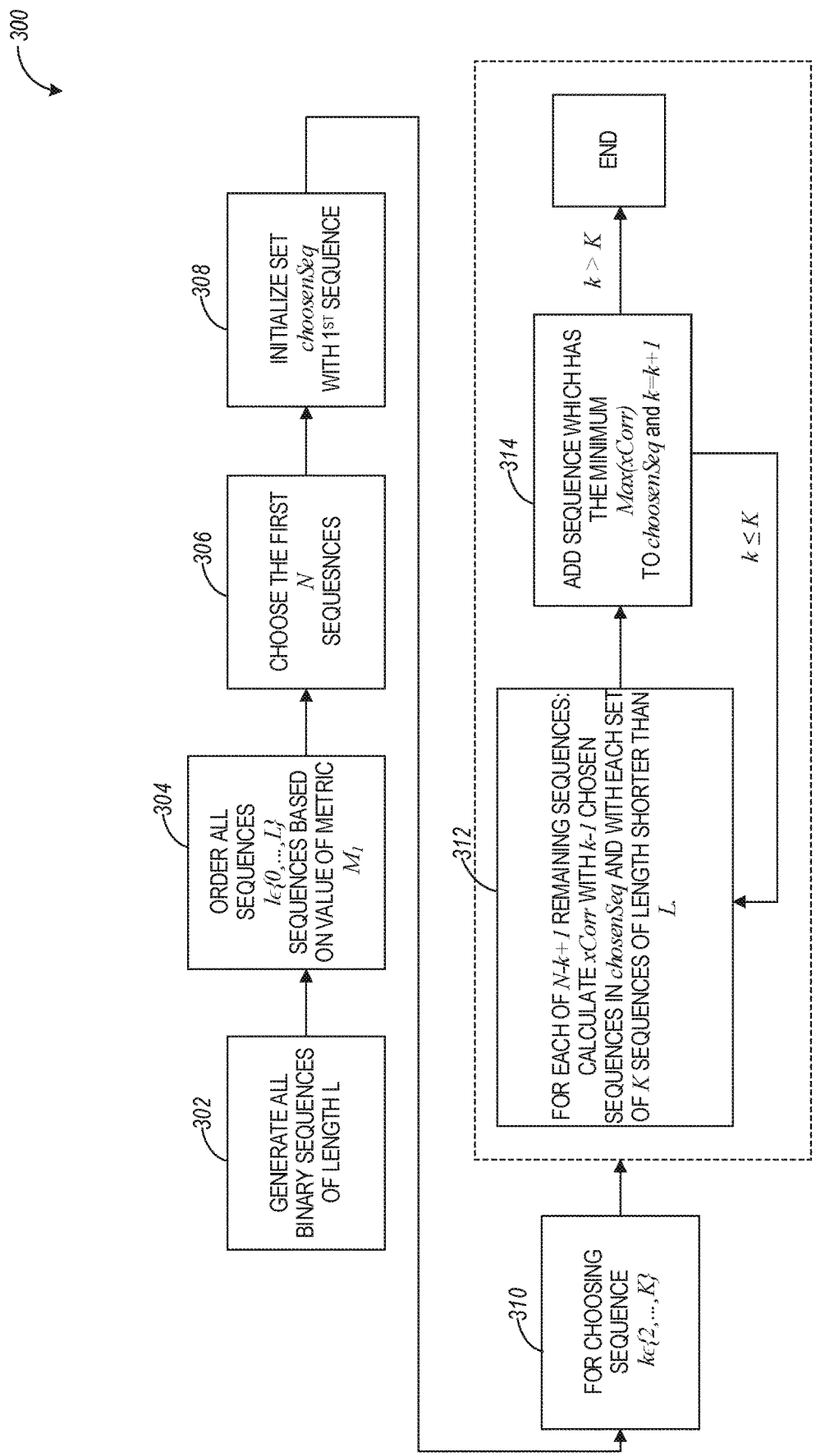
FIG. 3 is a block diagram of an example system for generating computer-generated sequences (CGS), in accordance with some aspects.

FIG. 3 is a block diagram of an example system 300 for generating computer-generated sequences (CGS), in accordance with some aspects. Referring to FIG. 3, system 300 can include circuitry, interfaces, logic, and code configured to perform the functions referenced as 302, 304, 306, 308, 310, 312, and 314.

For the case of resource allocation of less than 5 PRB, the following techniques performed by system 300 may be used in connection with the design of computer-generated sequences (CGS). In one embodiment of this invention, a method as shown in FIG. 3 can be used.

As an example of the method shown in FIG. 3, the CGS generation may start with the smallest, i.e., length 6, sequence design. Then based on the sequences designed in this case, the length 12 sequences are designed such that cross-correlation between chosen length 6 and length 12 sequences are minimized (e.g., at 312 and 314). Similarly, for length 18 sequence design, the cross-correlation between the selected length 6, 12 sequences and length 18 sequences are minimized and for length 24, the cross-correlation between chosen length 6, 12, 18 sequences and length 24 sequences are minimized.

In one embodiment, the function xCorr(•) in FIG. 3 measures the maximum linear cross-correlation in the time domain after OFDM symbol generation between two sequences. Furthermore, the maximum linear cross-correlation between the first sequence and all possible shifted and zero-padded versions (in the frequency domain) of the second sequence where the shifts are in multiples of 6 subcarriers and replicate the impact of non-overlapping frequency allocation for all sequences. The methodology for evaluation of autocorrelation and frequency domain shift is illustrated in FIG. 4.

Figure 4:
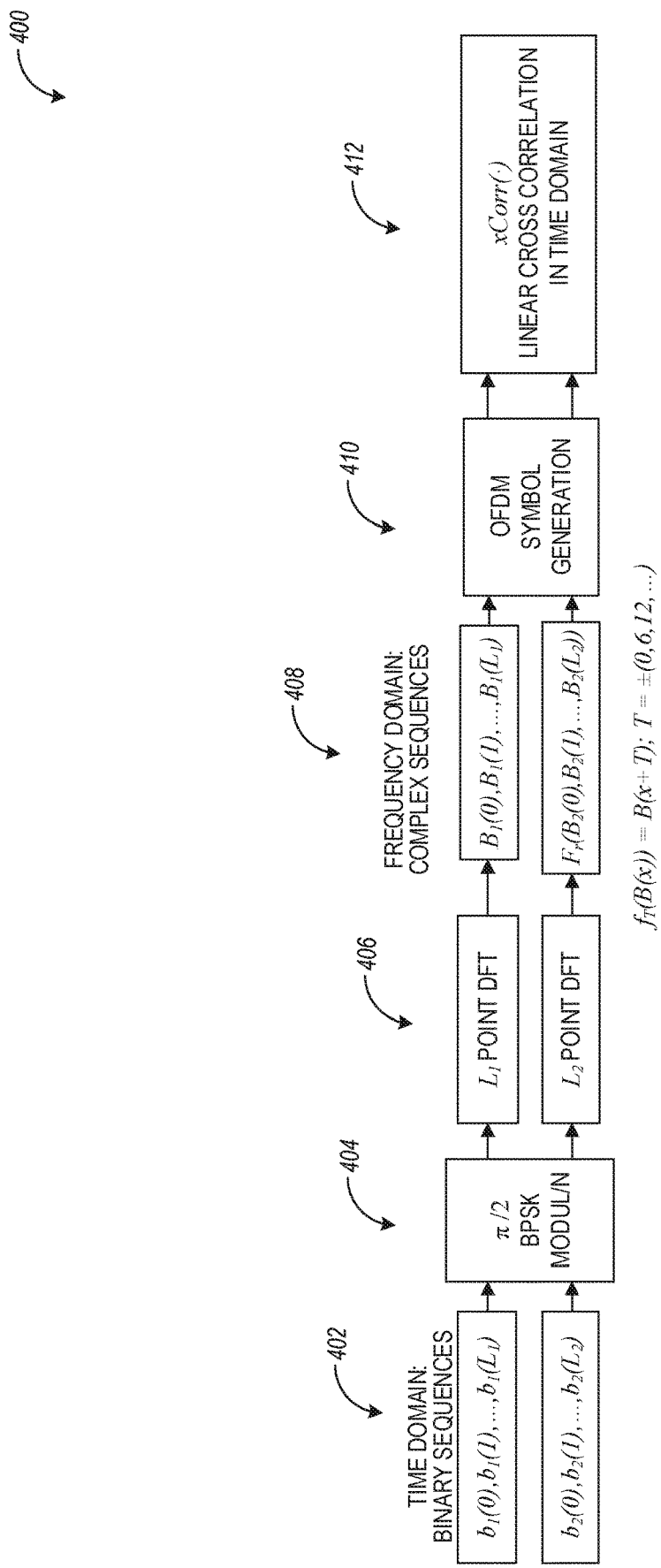
FIG. 4 is a block diagram of an example system for performing linear cross-correlation in the time domain, in accordance with some aspects.

FIG. 4 is a block diagram of an example system 400 for performing linear cross-correlation in the time domain, in accordance with some aspects. Referring to FIG. 4, the system 400 can initiate the linear cross-correlation processing using time-domain binary sequences 402. The time-domain binary sequences are then modulated using pi/2-BPSK modulation 404 and discrete Fourier transformation (DFT) 406 to obtain frequency domain complex sequences 408. The frequency-domain complex sequences are then used for OFDM symbol generation 410, and the linear cross-correlation in the time domain 412 is applied to the generated OFDM symbols.

The function $f_T(•)$ denotes a shifting of the sequence in the frequency domain. In one embodiment, the shifting can be done after mapping the complex frequency domain sequence to alternate sub-carriers after multiplying with OCC i.e., after Type 1 DMRS resource mapping. The reference point is subcarrier zero of the lowest numbered sub-carrier in the UE's uplink resource allocation.

Figure 5:
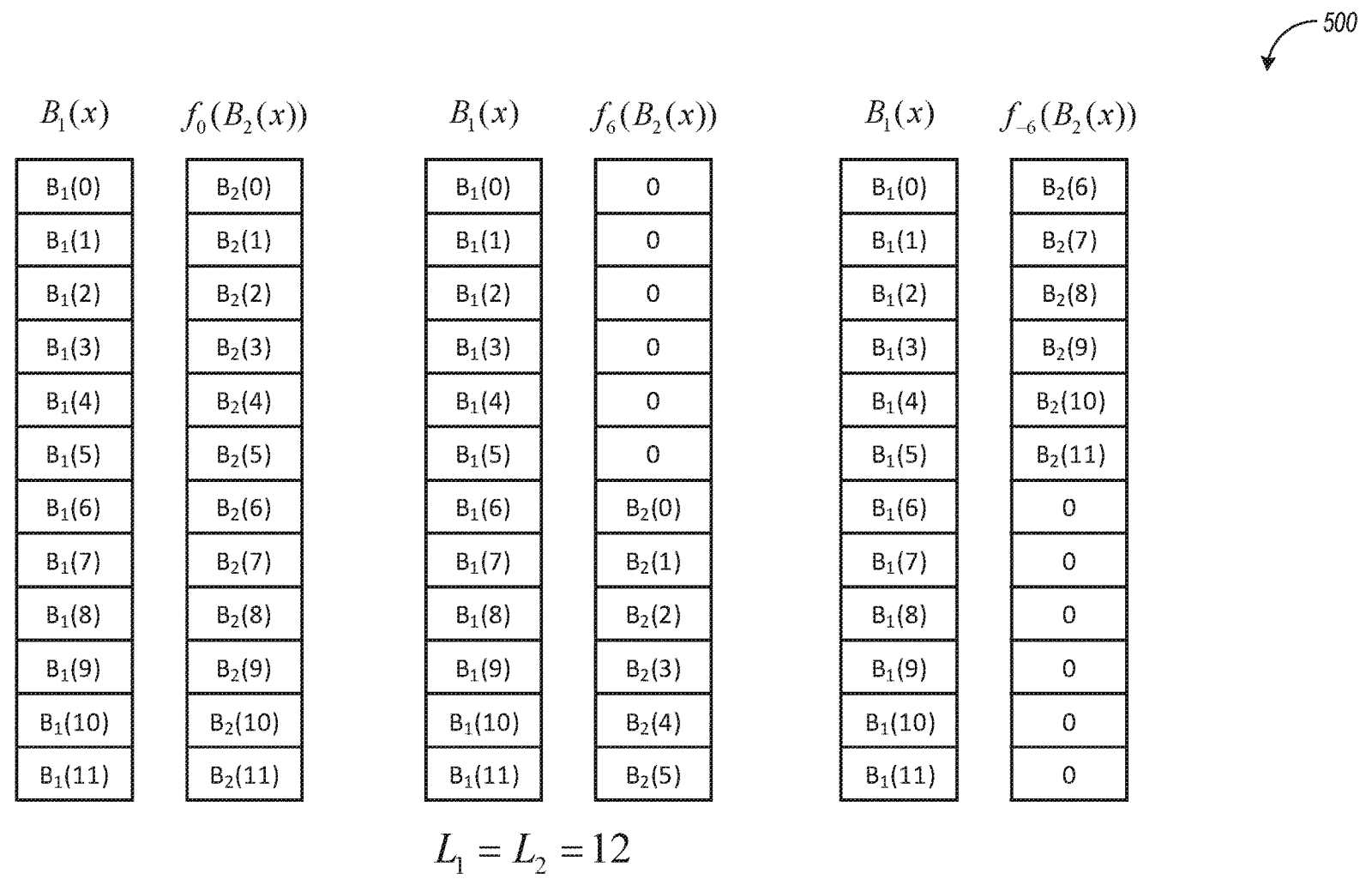
Figure 6:
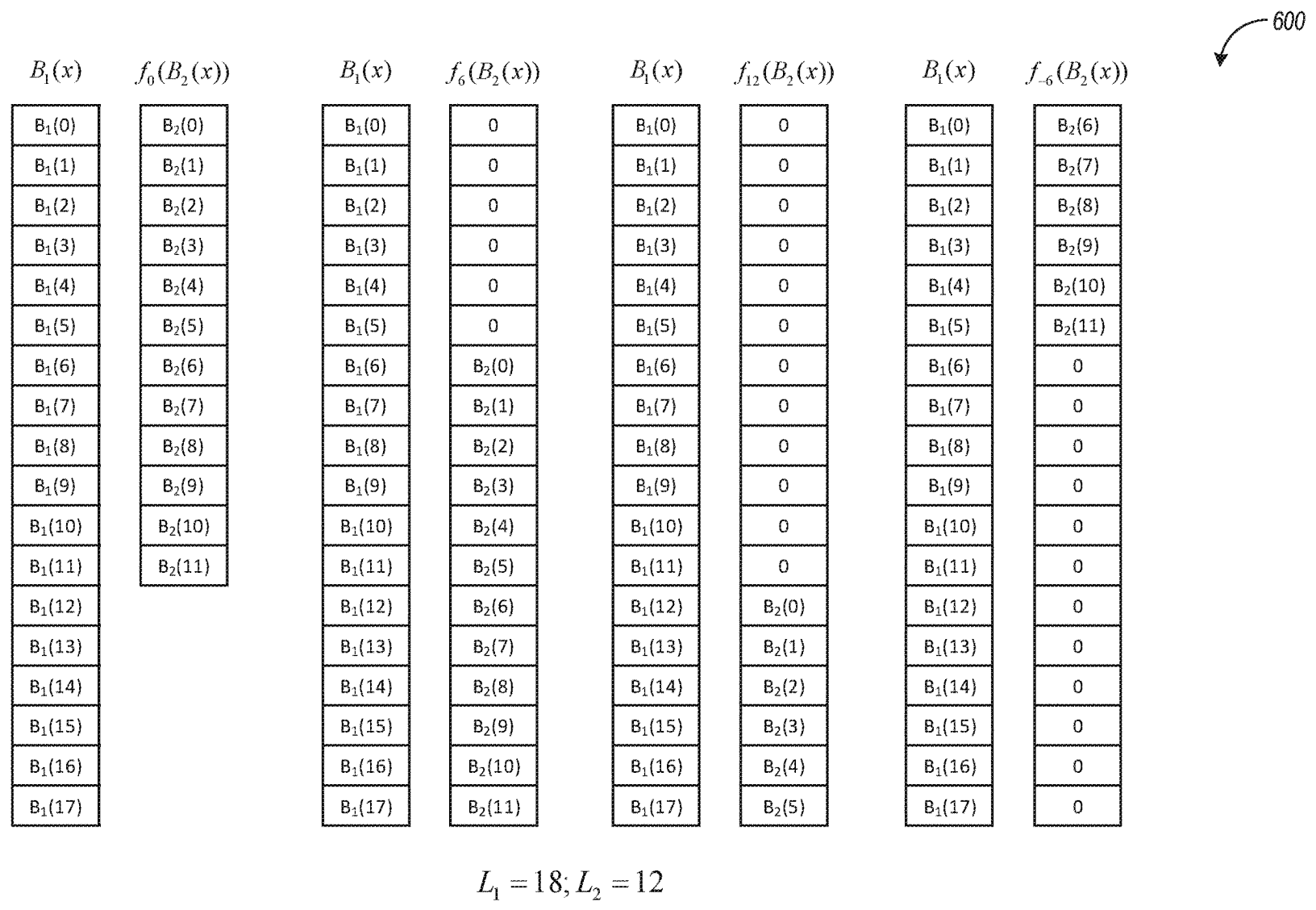

FIG. 5 in FIG. 6 illustrate example frequency domain complex sequences 500 and 600 that can be used for linear cross-correlation, in accordance with some aspects.

As an example, the different cases for $f_T(•)$ for sequences with the same or different lengths are illustrated in FIG. 5 and FIG. 6. In some aspects, use cases can be generalized to sequences of any two lengths. The sequences are then mapped to the subcarriers based on Type 1 DMRS mapping and linear cross-correlation is calculated in the time domain after OFDM symbol generation (as seen in FIG. 4).

In another embodiment, in addition to linear cross-correlation of a sequence with equal and smaller length sequences, circular cross-correlation may also be evaluated. Final cross-correlation, i.e., max(xCorr(•)) for a given sequence is the maximum linear cross-correlation values among all shifts and all chosen sequences of shorter length. Finally, the sequence with a minimum of this value is chosen in each iteration.

The sequence design in this embodiment depends on the values of the metric $M_l$ which is selected. The metric can be selected to optimize sequence design and improve channel estimation performance. The following aspects discuss example selection choices for the metric.

In some aspects, the metric can be chosen to be the minimization of frequency domain PAPR (FD-PAPR). The FD-PAPR may be is defined as the ratio of maximum to mean power of the pi/2 BPSK-modulated sequence in the frequency domain after DFT spreading. Minimizing FD-PAPR may leave the option for an overall non-flat power profile even with some zero power samples. An example of sequences generated using this metric (i.e., FD-PAPR minimization) with K=30 sequences each for lengths L={6, 12, 18 and 24} are illustrated in Tables 1-4 below.

TABLE 1

Length 6 CGS Sequence: FD-PAPR Minimization

| # | Binary Sequence | | | | | | PAPR |
|---|---|---|---|---|---|---|---|
| 0 | 0 | 0 | 0 | 1 | 1 | 1 | 0.7900 |
| 2 | 1 | 1 | 1 | 1 | 1 | 1 | 1.7210 |
| 3 | 1 | 1 | 0 | 0 | 1 | 1 | 1.1195 |
| 4 | 1 | 0 | 0 | 1 | 1 | 1 | 0.9162 |
| 5 | 1 | 1 | 0 | 1 | 0 | 1 | 1.6140 |
| 6 | 1 | 0 | 1 | 0 | 1 | 1 | 1.5028 |
| 7 | 0 | 0 | 1 | 0 | 1 | 1 | 1.1906 |
| 8 | 1 | 0 | 1 | 1 | 0 | 1 | 0.7836 |
| 9 | 1 | 0 | 1 | 0 | 0 | 1 | 0.9694 |
| 10 | 0 | 1 | 1 | 1 | 0 | 1 | 1.5951 |
| 11 | 0 | 1 | 0 | 0 | 0 | 1 | 1.6034 |
| 12 | 0 | 0 | 0 | 1 | 0 | 1 | 1.5969 |
| 13 | 0 | 1 | 0 | 1 | 1 | 1 | 1.5200 |
| 14 | 0 | 0 | 1 | 1 | 1 | 1 | 1.1354 |
| 15 | 0 | 0 | 0 | 0 | 1 | 1 | 1.2340 |
| 16 | 1 | 0 | 0 | 0 | 1 | 1 | 0.7733 |
| 17 | 1 | 1 | 0 | 0 | 0 | 1 | 0.8306 |
| 18 | 1 | 1 | 1 | 0 | 0 | 1 | 0.9982 |
| 19 | 1 | 0 | 0 | 1 | 0 | 1 | 1.0226 |
| 20 | 1 | 0 | 1 | 1 | 1 | 1 | 1.4450 |
| 21 | 1 | 1 | 1 | 1 | 0 | 1 | 1.5782 |
| 22 | 0 | 1 | 0 | 1 | 0 | 1 | 1.9329 |
| 23 | 1 | 0 | 0 | 0 | 0 | 1 | 1.0016 |
| 24 | 0 | 1 | 1 | 0 | 1 | 1 | 0.7552 |
| 25 | 0 | 0 | 1 | 0 | 0 | 1 | 0.7709 |
| 26 | 1 | 1 | 0 | 1 | 1 | 1 | 1.4457 |
| 27 | 0 | 1 | 1 | 0 | 0 | 1 | 1.0078 |
| 28 | 1 | 1 | 1 | 0 | 1 | 1 | 1.4589 |
| 29 | 0 | 1 | 0 | 0 | 1 | 1 | 1.1927 |
| 30 | 0 | 0 | 1 | 1 | 0 | 1 | 1.1887 |

TABLE 2

Length 12 CGS Sequence: FD-PAPR Minimization

| # | Binary Sequence | | | | | | | | | | | | PAPR |
|---|---|---|---|---|---|---|---|---|---|---|---|---|---|
| 1 | 1 | 0 | 0 | 1 | 0 | 1 | 0 | 0 | 1 | 1 | 1 | 1 | 0.7246 |
| 2 | 1 | 1 | 0 | 0 | 0 | 1 | 1 | 1 | 1 | 1 | 1 | 1 | 1.3355 |
| 3 | 0 | 0 | 1 | 1 | 1 | 0 | 1 | 1 | 1 | 0 | 0 | 1 | 1.0249 |
| 4 | 0 | 1 | 1 | 0 | 1 | 1 | 0 | 1 | 0 | 0 | 1 | 1 | 1.1550 |
| 5 | 1 | 0 | 0 | 1 | 0 | 0 | 1 | 0 | 0 | 0 | 1 | 1 | 0.9065 |
| 6 | 1 | 1 | 0 | 1 | 1 | 1 | 1 | 0 | 0 | 0 | 1 | 1 | 1.2986 |
| 7 | 0 | 0 | 1 | 0 | 1 | 1 | 0 | 1 | 1 | 0 | 0 | 1 | 0.9108 |
| 8 | 0 | 0 | 1 | 1 | 0 | 1 | 1 | 0 | 0 | 0 | 0 | 1 | 0.8118 |
| 9 | 0 | 0 | 0 | 1 | 1 | 0 | 0 | 1 | 0 | 0 | 1 | 1 | 1.1064 |
| 10 | 0 | 1 | 1 | 0 | 1 | 1 | 1 | 0 | 1 | 1 | 0 | 1 | 1.1347 |
| 11 | 1 | 1 | 1 | 1 | 0 | 1 | 0 | 0 | 1 | 1 | 0 | 1 | 1.5071 |
| 12 | 0 | 0 | 1 | 0 | 1 | 0 | 0 | 0 | 0 | 0 | 1 | 1 | 1.0061 |
| 13 | 1 | 1 | 0 | 1 | 1 | 0 | 0 | 1 | 0 | 1 | 1 | 1 | 1.2851 |
| 14 | 1 | 1 | 1 | 0 | 0 | 1 | 1 | 1 | 0 | 1 | 0 | 1 | 1.3026 |
| 15 | 1 | 0 | 1 | 0 | 0 | 0 | 1 | 0 | 0 | 0 | 0 | 1 | 0.9161 |
| 16 | 0 | 1 | 1 | 1 | 0 | 0 | 0 | 1 | 0 | 0 | 0 | 1 | 1.1321 |
| 17 | 1 | 1 | 0 | 1 | 0 | 1 | 1 | 1 | 0 | 0 | 0 | 0 | 0.9354 |
| 18 | 1 | 0 | 0 | 0 | 1 | 0 | 1 | 0 | 1 | 1 | 1 | 1 | 1.1092 |
| 19 | 0 | 1 | 1 | 1 | 0 | 1 | 0 | 1 | 1 | 0 | 1 | 1 | 1.2061 |
| 20 | 1 | 0 | 0 | 0 | 0 | 1 | 1 | 1 | 0 | 0 | 0 | 1 | 0.9108 |
| 21 | 1 | 1 | 1 | 0 | 1 | 1 | 1 | 0 | 0 | 0 | 0 | 1 | 0.8315 |
| 22 | 0 | 1 | 0 | 0 | 1 | 1 | 1 | 0 | 0 | 1 | 0 | 1 | 0.8405 |
| 23 | 1 | 1 | 1 | 0 | 1 | 0 | 0 | 1 | 1 | 1 | 1 | 1 | 0.9985 |
| 24 | 1 | 0 | 0 | 0 | 0 | 0 | 0 | 1 | 1 | 0 | 0 | 1 | 1.0427 |
| 25 | 1 | 0 | 1 | 1 | 0 | 0 | 0 | 1 | 0 | 1 | 1 | 1 | 1.0183 |

TABLE 2-continued

Length 12 CGS Sequence: FD-PAPR Minimization

| # | Binary Sequence | | | | | | | | | | | | PAPR |
|---|---|---|---|---|---|---|---|---|---|---|---|---|---|
| 26 | 0 | 0 | 0 | 1 | 1 | 1 | 1 | 1 | 0 | 0 | 0 | 1 | 1.1852 |
| 27 | 1 | 0 | 1 | 0 | 0 | 0 | 1 | 0 | 0 | 0 | 0 | 1 | 1.0544 |
| 28 | 1 | 1 | 0 | 0 | 1 | 1 | 0 | 0 | 0 | 1 | 1 | 1 | 0.8784 |
| 29 | 0 | 0 | 1 | 1 | 0 | 1 | 0 | 1 | 1 | 0 | 0 | 1 | 1.2318 |
| 30 | 0 | 0 | 0 | 1 | 1 | 0 | 0 | 1 | 1 | 1 | 1 | 1 | 1.0360 |

TABLE 3

Length 18 CGS Sequence: FD-PAPR Minimization

| # | Binary Sequence | | | | | | | | | | | | | | | | | | PAPR |
|---|---|---|---|---|---|---|---|---|---|---|---|---|---|---|---|---|---|---|---|
| 1 | 1 | 0 | 0 | 1 | 0 | 0 | 1 | 0 | 0 | 1 | 0 | 0 | 1 | 1 | 1 | 0 | 1 | 1 | 0.9654 |
| 2 | 1 | 0 | 1 | 0 | 0 | 1 | 1 | 1 | 0 | 0 | 1 | 1 | 0 | 1 | 1 | 0 | 1 | 1 | 1.0262 |
| 3 | 1 | 0 | 0 | 0 | 1 | 1 | 0 | 1 | 0 | 0 | 0 | 1 | 0 | 0 | 1 | 0 | 0 | 1 | 1.1571 |
| 4 | 0 | 1 | 1 | 0 | 1 | 1 | 0 | 0 | 1 | 1 | 1 | 0 | 0 | 1 | 0 | 1 | 1 | 1 | 1.0402 |
| 5 | 1 | 0 | 1 | 1 | 0 | 0 | 1 | 1 | 1 | 0 | 1 | 1 | 0 | 0 | 1 | 1 | 1 | 1 | 1.4181 |
| 6 | 1 | 0 | 0 | 0 | 1 | 1 | 1 | 0 | 1 | 1 | 1 | 0 | 0 | 1 | 0 | 0 | 0 | 1 | 1.1382 |
| 7 | 1 | 1 | 0 | 0 | 0 | 1 | 1 | 0 | 1 | 1 | 1 | 0 | 0 | 0 | 1 | 1 | 0 | 1 | 1.0046 |
| 8 | 0 | 1 | 1 | 0 | 1 | 1 | 0 | 1 | 1 | 0 | 0 | 1 | 0 | 0 | 0 | 1 | 1 | 1 | 0.9854 |
| 9 | 0 | 1 | 0 | 1 | 0 | 0 | 1 | 1 | 1 | 0 | 0 | 1 | 1 | 1 | 0 | 0 | 0 | 1 | 1.2556 |
| 10 | 0 | 1 | 1 | 1 | 1 | 1 | 1 | 1 | 0 | 0 | 1 | 0 | 0 | 1 | 1 | 0 | 1 | 1 | 0.9751 |
| 11 | 1 | 0 | 0 | 0 | 1 | 0 | 0 | 0 | 1 | 1 | 1 | 1 | 1 | 0 | 0 | 0 | 1 | 1 | 1.3411 |
| 12 | 0 | 0 | 1 | 1 | 0 | 0 | 0 | 1 | 0 | 1 | 0 | 1 | 0 | 1 | 1 | 1 | 1 | 0 | 0.9867 |
| 13 | 1 | 1 | 0 | 0 | 1 | 0 | 0 | 1 | 0 | 0 | 0 | 0 | 0 | 0 | 0 | 1 | 1 | 0 | 1.2466 |
| 14 | 1 | 0 | 1 | 0 | 1 | 1 | 0 | 1 | 1 | 1 | 0 | 1 | 1 | 0 | 1 | 1 | 0 | 1 | 1.3344 |
| 15 | 0 | 1 | 0 | 1 | 1 | 0 | 0 | 1 | 1 | 0 | 1 | 1 | 0 | 0 | 1 | 1 | 0 | 1 | 1.0760 |
| 16 | 1 | 0 | 0 | 1 | 1 | 0 | 0 | 0 | 0 | 0 | 0 | 1 | 1 | 0 | 0 | 1 | 1 | 1 | 1.1064 |
| 17 | 0 | 0 | 0 | 1 | 1 | 1 | 0 | 0 | 0 | 0 | 0 | 1 | 1 | 1 | 0 | 1 | 1 | 1 | 1.0374 |
| 18 | 0 | 1 | 0 | 1 | 0 | 1 | 1 | 1 | 0 | 0 | 0 | 0 | 1 | 1 | 1 | 1 | 0 | 1 | 0.9822 |
| 19 | 1 | 0 | 1 | 1 | 1 | 0 | 0 | 1 | 0 | 0 | 1 | 0 | 0 | 0 | 1 | 1 | 0 | 1 | 1.0103 |
| 20 | 0 | 0 | 1 | 0 | 1 | 1 | 0 | 1 | 1 | 1 | 1 | 1 | 1 | 1 | 0 | 0 | 0 | 1 | 0.9814 |
| 21 | 0 | 1 | 0 | 0 | 1 | 0 | 0 | 1 | 1 | 0 | 0 | 1 | 1 | 0 | 0 | 0 | 0 | 1 | 1.1578 |
| 22 | 0 | 1 | 0 | 0 | 1 | 0 | 0 | 1 | 0 | 0 | 1 | 0 | 0 | 0 | 1 | 0 | 0 | 0 | 1.0395 |
| 23 | 0 | 1 | 0 | 0 | 1 | 1 | 0 | 0 | 0 | 1 | 1 | 0 | 0 | 1 | 1 | 1 | 1 | 1 | 1.4382 |
| 24 | 0 | 0 | 1 | 1 | 0 | 1 | 1 | 0 | 0 | 1 | 1 | 1 | 0 | 0 | 0 | 0 | 0 | 1 | 1.1530 |
| 25 | 0 | 1 | 0 | 0 | 1 | 1 | 0 | 0 | 1 | 0 | 0 | 1 | 1 | 1 | 0 | 0 | 0 | 0 | 0.8877 |
| 26 | 0 | 0 | 0 | 1 | 0 | 0 | 0 | 1 | 1 | 0 | 0 | 1 | 0 | 0 | 1 | 1 | 1 | 1 | 0.9535 |
| 27 | 0 | 1 | 1 | 0 | 0 | 0 | 1 | 1 | 0 | 1 | 1 | 0 | 1 | 1 | 1 | 0 | 1 | 1 | 0.9322 |
| 28 | 0 | 0 | 1 | 1 | 0 | 0 | 1 | 0 | 1 | 0 | 0 | 0 | 1 | 1 | 0 | 0 | 0 | 1 | 0.9205 |
| 29 | 1 | 1 | 0 | 0 | 1 | 0 | 1 | 1 | 0 | 0 | 1 | 0 | 0 | 0 | 0 | 0 | 0 | 0 | 1.2881 |
| 30 | 1 | 1 | 1 | 1 | 0 | 1 | 1 | 0 | 0 | 1 | 0 | 0 | 1 | 0 | 0 | 0 | 0 | 1 | 1.2873 |

TABLE 4

Length 24 CGS Sequence: FD-PAPR Minimization

| # | Binary Sequence | | | | | | | | | | | | | | | | | | | | | | | | PAPR |
|---|---|---|---|---|---|---|---|---|---|---|---|---|---|---|---|---|---|---|---|---|---|---|---|---|---|
| 1 | 0 | 0 | 1 | 0 | 1 | 1 | 0 | 0 | 0 | 1 | 0 | 1 | 0 | 1 | 1 | 0 | 1 | 0 | 0 | 1 | 1 | 1 | 1 | 1 | 0.7137 |
| 2 | 0 | 0 | 0 | 0 | 0 | 1 | 1 | 0 | 1 | 1 | 0 | 1 | 0 | 1 | 1 | 1 | 0 | 0 | 0 | 1 | 1 | 0 | 1 | 1 | 0.8614 |
| 3 | 0 | 0 | 0 | 1 | 0 | 0 | 0 | 1 | 1 | 0 | 1 | 1 | 1 | 1 | 1 | 0 | 0 | 1 | 0 | 0 | 0 | 1 | 0 | 1 | 0.9458 |
| 4 | 1 | 0 | 0 | 1 | 1 | 1 | 0 | 0 | 1 | 1 | 0 | 0 | 0 | 0 | 1 | 0 | 0 | 1 | 1 | 1 | 1 | 0 | 0 | 1 | 0.9172 |
| 5 | 0 | 1 | 0 | 1 | 1 | 0 | 1 | 0 | 1 | 1 | 0 | 1 | 1 | 1 | 0 | 0 | 1 | 1 | 0 | 0 | 0 | 1 | 0 | 1 | 0.9057 |
| 6 | 1 | 0 | 0 | 1 | 1 | 1 | 1 | 1 | 0 | 0 | 0 | 0 | 0 | 1 | 0 | 0 | 0 | 0 | 1 | 1 | 0 | 0 | 0 | 1 | 0.9268 |
| 7 | 0 | 0 | 0 | 0 | 0 | 1 | 0 | 0 | 1 | 1 | 1 | 0 | 1 | 1 | 0 | 1 | 0 | 0 | 0 | 1 | 1 | 0 | 0 | 1 | 0.9421 |
| 8 | 0 | 1 | 1 | 1 | 1 | 1 | 0 | 1 | 1 | 1 | 0 | 1 | 0 | 1 | 0 | 1 | 1 | 0 | 0 | 1 | 0 | 1 | 0 | 0 | 0.9372 |
| 9 | 1 | 1 | 0 | 0 | 0 | 1 | 0 | 0 | 1 | 1 | 0 | 1 | 0 | 1 | 0 | 1 | 0 | 1 | 1 | 0 | 0 | 0 | 0 | 0 | 0.8682 |
| 10 | 0 | 1 | 1 | 0 | 1 | 0 | 1 | 0 | 0 | 1 | 0 | 0 | 1 | 1 | 0 | 1 | 0 | 0 | 0 | 0 | 1 | 1 | 1 | 1 | 0.8829 |
| 11 | 1 | 1 | 1 | 0 | 0 | 0 | 0 | 0 | 1 | 1 | 1 | 1 | 0 | 0 | 0 | 1 | 0 | 0 | 0 | 0 | 1 | 1 | 1 | 1 | 0.9589 |
| 12 | 1 | 1 | 1 | 0 | 0 | 1 | 0 | 0 | 1 | 0 | 0 | 1 | 1 | 0 | 1 | 1 | 1 | 1 | 0 | 0 | 1 | 0 | 0 | 0 | 0.8610 |

TABLE 4-continued

Length 24 CGS Sequence: FD-PAPR Minimization

| # | Binary Sequence | PAPR |
|---|---|---|
| 13 | 0 0 0 1 0 0 1 0 0 0 0 1 1 1 0 0 1 0 1 1 1 (with 0 0 1) | 0.9659 |
| 14 | 0 0 1 0 1 1 0 0 0 0 0 1 1 0 1 0 0 1 1 1 0 (with 1 1 1) | 0.7358 |
| 15 | 1 0 1 0 0 1 1 1 0 1 0 0 1 1 1 0 1 0 1 0 1 (with 1 0 1) | 0.9275 |
| 16 | 0 0 0 1 0 0 0 1 0 1 1 0 1 0 1 0 0 0 0 0 1 (with 1 1 1) | 0.8785 |
| 17 | 1 1 1 0 0 0 0 1 1 0 0 1 0 0 1 1 0 0 0 0 1 (with 1 1 1) | 0.8635 |
| 18 | 1 1 1 0 1 1 0 0 0 0 1 0 0 1 1 1 1 0 0 0 1 (with 1 1 1) | 0.9034 |
| 19 | 0 0 1 1 1 1 0 0 1 1 0 1 1 0 0 1 1 1 1 0 0 (with 0 0 0) | 0.8491 |
| 20 | 1 0 0 1 1 1 0 0 0 1 0 0 1 0 1 1 0 1 0 1 1 (with 1 1 1) | 0.8570 |
| 21 | 1 0 0 1 1 1 0 0 1 1 1 0 1 1 0 1 1 0 1 0 1 (with 0 0 1) | 0.8743 |
| 22 | 1 0 1 1 1 0 0 0 0 0 0 1 1 1 0 0 0 1 0 0 1 (with 0 0 1) | 0.8927 |
| 23 | 1 1 1 0 0 0 0 1 1 1 0 1 1 0 1 1 0 0 1 0 1 (with 0 1 1) | 1.1863 |
| 24 | 0 0 0 0 1 1 0 0 0 1 1 1 0 1 1 0 1 0 0 1 0 (with 1 0 0) | 1.1875 |
| 25 | 0 0 1 1 0 1 1 1 1 0 1 1 0 0 0 0 1 0 0 1 1 (with 1 1 1) | 0.9685 |
| 26 | 0 0 1 1 0 1 1 0 1 0 0 0 1 1 1 0 1 1 1 0 0 (with 1 0 0) | 0.9483 |
| 27 | 0 0 1 1 0 1 0 0 0 1 1 0 1 1 1 0 1 1 0 1 1 (with 1 1 0) | 0.9336 |
| 28 | 1 1 1 1 0 0 1 1 0 1 1 0 0 1 1 1 0 0 0 0 0 (with 1 1 1) | 0.9018 |
| 29 | 1 0 0 0 0 1 1 1 0 0 0 0 0 0 0 1 0 0 1 1 1 (with 1 0 1) | 0.9307 |
| 30 | 0 0 0 1 0 1 0 1 0 0 1 0 0 1 0 1 1 0 0 0 1 (with 0 1 1) | 0.9208 |

In another embodiment of this invention, the metric can be a minimization of the following ratio:

$$M_l = \frac{\max P_l}{p},$$

where $\overline{P}_l$ is the vector of powers of the reference signal sequence in the frequency domain after pi/2 BPSK modulation and DFT-spreading. The value of p can be determined as follows: (a) sort the values in $\overline{P}_l$ in ascending order, and (b) select the n-th value in this sorted set and assign to p. The value of n can be $\{2, 3, 4, 5 \ldots\}$. The significance of n is that it allows the frequency domain signal to possibly have n number of zero power samples.

Note that when this metric is minimized with n=2, one zero power sample may still be allowed in the frequency domain. An example of sequences generated using this metric (Max to $2^{nd}$ Min Power Ratio) with K=30 sequences each for lengths L=$\{6, 12, 18$ and $24\}$ and n=2 are illustrated in Tables 5-8 below.

TABLE 5

Length 6 CGS Sequence: Max to 2nd Min Power Ratio Minimization

| # | Binary Sequence | PAPR |
|---|---|---|
| 1 | 0 1 1 1 1 1 | 1.4753 |
| 2 | 1 1 1 0 0 1 | 0.9982 |

TABLE 5-continued

Length 6 CGS Sequence: Max to 2nd Min Power Ratio Minimization

| # | Binary Sequence | PAPR |
|---|---|---|
| 3 | 0 1 0 0 1 1 | 1.1927 |
| 4 | 1 0 1 1 1 1 | 1.4450 |
| 5 | 0 0 1 0 0 1 | 0.7709 |
| 6 | 0 1 0 1 0 1 | 1.9329 |
| 7 | 1 0 0 1 0 1 | 1.0226 |
| 8 | 0 1 0 1 1 1 | 1.5200 |
| 9 | 1 0 0 0 1 1 | 0.7733 |
| 10 | 1 1 1 1 0 1 | 1.5782 |
| 11 | 0 0 1 1 1 1 | 1.1354 |
| 12 | 1 1 0 1 1 1 | 1.4457 |
| 13 | 1 1 0 1 0 1 | 1.6140 |
| 14 | 0 0 1 0 1 1 | 1.1906 |
| 15 | 1 0 1 1 0 1 | 0.7836 |
| 16 | 1 0 1 0 0 1 | 0.9694 |
| 17 | 1 0 0 1 1 1 | 0.9162 |
| 18 | 0 1 1 1 0 1 | 1.5951 |
| 19 | 1 0 1 0 1 1 | 1.5028 |
| 20 | 1 1 1 1 1 1 | 1.7210 |
| 21 | 0 0 1 1 0 1 | 1.1887 |
| 22 | 1 0 0 0 0 1 | 1.0016 |
| 23 | 0 0 0 0 1 1 | 1.2340 |
| 24 | 0 0 0 1 1 1 | 0.7900 |
| 25 | 0 1 1 0 1 1 | 0.7552 |
| 26 | 1 0 0 0 0 1 | 0.8306 |
| 27 | 0 1 0 0 0 1 | 1.6034 |
| 28 | 0 1 1 0 0 1 | 1.0078 |
| 29 | 1 1 1 0 1 1 | 1.4589 |
| 30 | 1 1 0 0 1 1 | 1.1195 |

TABLE 6

Length 12 CGS Sequence: Max to 2nd Min Power Ratio Minimization

| # | Binary Sequence | | | | | | | | | | | | PAPR |
|---|---|---|---|---|---|---|---|---|---|---|---|---|---|
| 1 | 0 | 0 | 1 | 0 | 0 | 1 | 1 | 1 | 1 | 1 | 1 | 1 | 1.0253 |
| 2 | 1 | 1 | 0 | 1 | 0 | 1 | 1 | 0 | 0 | 0 | 1 | 1 | 1.1817 |
| 3 | 0 | 1 | 0 | 0 | 1 | 0 | 0 | 1 | 0 | 1 | 0 | 1 | 1.3548 |
| 4 | 0 | 0 | 1 | 0 | 1 | 0 | 0 | 1 | 1 | 0 | 1 | 1 | 1.2126 |
| 5 | 1 | 0 | 0 | 0 | 1 | 1 | 1 | 0 | 1 | 0 | 1 | 1 | 1.2811 |
| 6 | 0 | 0 | 0 | 0 | 0 | 0 | 1 | 0 | 1 | 1 | 1 | 1 | 1.1579 |
| 7 | 0 | 0 | 1 | 1 | 1 | 1 | 1 | 0 | 1 | 0 | 0 | 1 | 0.7693 |
| 8 | 0 | 0 | 0 | 1 | 1 | 1 | 1 | 1 | 0 | 0 | 0 | 1 | 1.1852 |
| 9 | 0 | 0 | 0 | 0 | 1 | 1 | 0 | 0 | 1 | 0 | 0 | 1 | 1.3594 |
| 10 | 1 | 0 | 0 | 0 | 1 | 0 | 0 | 0 | 1 | 1 | 1 | 1 | 1.1349 |
| 11 | 1 | 0 | 0 | 1 | 0 | 1 | 0 | 0 | 0 | 1 | 0 | 1 | 1.4975 |
| 12 | 1 | 1 | 0 | 0 | 0 | 0 | 1 | 0 | 1 | 1 | 1 | 1 | 1.4738 |
| 13 | 1 | 0 | 1 | 0 | 0 | 0 | 1 | 1 | 1 | 0 | 0 | 1 | 0.9882 |
| 14 | 0 | 1 | 1 | 1 | 0 | 1 | 0 | 1 | 0 | 1 | 1 | 1 | 1.7127 |
| 15 | 0 | 1 | 1 | 0 | 1 | 0 | 0 | 0 | 1 | 0 | 0 | 1 | 0.9254 |
| 16 | 0 | 1 | 1 | 1 | 0 | 1 | 0 | 1 | 0 | 1 | 1 | 1 | 1.2061 |
| 17 | 1 | 0 | 1 | 0 | 0 | 1 | 0 | 1 | 1 | 0 | 1 | 1 | 0.9334 |
| 18 | 1 | 1 | 0 | 0 | 1 | 1 | 1 | 1 | 0 | 1 | 0 | 1 | 1.4995 |
| 19 | 1 | 0 | 0 | 0 | 1 | 0 | 0 | 0 | 0 | 0 | 1 | 1 | 1.1643 |
| 20 | 1 | 0 | 1 | 0 | 0 | 0 | 0 | 1 | 1 | 0 | 0 | 1 | 0.7859 |
| 21 | 0 | 1 | 0 | 1 | 0 | 0 | 1 | 0 | 1 | 0 | 0 | 1 | 0.8722 |
| 22 | 0 | 0 | 0 | 1 | 1 | 0 | 0 | 0 | 0 | 1 | 0 | 1 | 1.3498 |
| 23 | 1 | 0 | 0 | 1 | 0 | 0 | 1 | 1 | 1 | 1 | 1 | 1 | 0.9996 |
| 24 | 0 | 1 | 1 | 0 | 0 | 0 | 0 | 1 | 1 | 0 | 0 | 1 | 0.7427 |
| 25 | 0 | 1 | 1 | 1 | 0 | 1 | 0 | 0 | 1 | 1 | 0 | 1 | 1.5378 |
| 26 | 0 | 1 | 0 | 0 | 1 | 1 | 0 | 1 | 1 | 0 | 0 | 1 | 1.2242 |
| 27 | 1 | 1 | 1 | 1 | 0 | 1 | 1 | 0 | 0 | 1 | 0 | 1 | 1.2995 |
| 28 | 0 | 1 | 0 | 0 | 1 | 0 | 0 | 1 | 0 | 1 | 1 | 1 | 1.0183 |
| 29 | 1 | 0 | 1 | 0 | 1 | 1 | 1 | 1 | 0 | 0 | 0 | 1 | 1.2080 |
| 30 | 1 | 1 | 1 | 0 | 0 | 1 | 1 | 1 | 0 | 1 | 0 | 1 | 1.3026 |

TABLE 7

Length 18 CGS Sequence: Max to 2nd Min Power Ratio Minimization

| # | Binary Sequence | | | | | | | | | | | | | | | | | | PAPR |
|---|---|---|---|---|---|---|---|---|---|---|---|---|---|---|---|---|---|---|---|
| 1 | 0 | 0 | 0 | 1 | 0 | 0 | 1 | 0 | 0 | 1 | 0 | 0 | 0 | 1 | 1 | 1 | 1 | 1 | 1.0435 |
| 2 | 1 | 0 | 0 | 1 | 1 | 1 | 1 | 1 | 1 | 0 | 0 | 1 | 1 | 0 | 1 | 0 | 1 | 1 | 1.2188 |
| 3 | 0 | 0 | 1 | 0 | 1 | 0 | 1 | 0 | 0 | 1 | 1 | 0 | 0 | 0 | 0 | 1 | 1 | 1 | 1.2523 |
| 4 | 1 | 1 | 0 | 0 | 1 | 0 | 1 | 1 | 1 | 0 | 1 | 0 | 0 | 1 | 1 | 1 | 0 | 1 | 1.1078 |
| 5 | 1 | 0 | 0 | 1 | 0 | 0 | 1 | 1 | 1 | 1 | 1 | 0 | 1 | 0 | 1 | 1 | 1 | 1 | 1.3453 |
| 6 | 0 | 0 | 1 | 0 | 0 | 1 | 1 | 1 | 0 | 0 | 1 | 0 | 1 | 0 | 0 | 0 | 0 | 1 | 1.3865 |
| 7 | 1 | 0 | 0 | 0 | 0 | 1 | 0 | 0 | 0 | 0 | 1 | 1 | 0 | 1 | 1 | 1 | 0 | 1 | 1.1227 |
| 8 | 1 | 1 | 1 | 1 | 0 | 0 | 0 | 0 | 1 | 0 | 0 | 0 | 1 | 0 | 0 | 0 | 0 | 1 | 1.1765 |
| 9 | 1 | 1 | 1 | 0 | 0 | 0 | 0 | 0 | 1 | 0 | 0 | 0 | 1 | 0 | 0 | 0 | 1 | 1 | 1.1976 |
| 10 | 1 | 1 | 0 | 1 | 1 | 1 | 0 | 0 | 0 | 1 | 1 | 1 | 0 | 1 | 0 | 1 | 0 | 1 | 1.0380 |
| 11 | 1 | 1 | 1 | 0 | 0 | 0 | 1 | 0 | 0 | 0 | 1 | 1 | 1 | 1 | 1 | 0 | 1 | 1 | 1.3882 |
| 12 | 1 | 1 | 0 | 1 | 1 | 0 | 1 | 0 | 1 | 1 | 1 | 0 | 1 | 0 | 1 | 1 | 0 | 1 | 1.3924 |
| 13 | 0 | 0 | 1 | 0 | 1 | 0 | 0 | 1 | 0 | 0 | 1 | 0 | 1 | 0 | 0 | 0 | 0 | 1 | 1.3302 |
| 14 | 1 | 0 | 0 | 0 | 0 | 0 | 1 | 1 | 1 | 0 | 1 | 1 | 1 | 0 | 0 | 0 | 0 | 1 | 1.3397 |
| 15 | 1 | 1 | 1 | 0 | 1 | 1 | 1 | 0 | 1 | 0 | 0 | 0 | 1 | 1 | 1 | 1 | 1 | 1 | 0.9359 |
| 16 | 0 | 1 | 1 | 0 | 1 | 0 | 0 | 1 | 0 | 0 | 0 | 1 | 1 | 1 | 1 | 1 | 1 | 1 | 1.1285 |
| 17 | 0 | 1 | 0 | 1 | 0 | 1 | 1 | 1 | 0 | 0 | 0 | 1 | 1 | 0 | 0 | 0 | 1 | 1 | 1.0158 |
| 18 | 1 | 0 | 0 | 1 | 0 | 0 | 1 | 0 | 0 | 0 | 0 | 0 | 0 | 0 | 1 | 1 | 0 | 1 | 1.0088 |
| 19 | 1 | 0 | 1 | 0 | 1 | 0 | 0 | 1 | 1 | 1 | 0 | 0 | 1 | 1 | 0 | 0 | 0 | 1 | 1.2417 |
| 20 | 0 | 0 | 0 | 1 | 1 | 1 | 0 | 1 | 0 | 0 | 1 | 0 | 1 | 0 | 0 | 0 | 1 | 1 | 1.2787 |
| 21 | 0 | 0 | 1 | 1 | 1 | 0 | 0 | 0 | 0 | 1 | 1 | 0 | 1 | 0 | 1 | 0 | 1 | 0 | 1.1306 |
| 22 | 0 | 1 | 1 | 1 | 0 | 0 | 0 | 1 | 1 | 1 | 0 | 0 | 0 | 0 | 0 | 1 | 1 | 1 | 1.0320 |
| 23 | 1 | 1 | 0 | 0 | 0 | 0 | 1 | 1 | 1 | 0 | 0 | 0 | 1 | 0 | 0 | 0 | 1 | 1 | 1.0175 |
| 24 | 0 | 0 | 1 | 0 | 1 | 1 | 0 | 1 | 1 | 1 | 1 | 1 | 1 | 1 | 0 | 0 | 0 | 1 | 0.9814 |
| 25 | 0 | 0 | 0 | 1 | 0 | 0 | 1 | 0 | 1 | 0 | 0 | 1 | 0 | 0 | 0 | 1 | 0 | 1 | 1.2935 |
| 26 | 0 | 1 | 1 | 0 | 0 | 0 | 0 | 0 | 0 | 0 | 1 | 1 | 0 | 1 | 0 | 0 | 0 | 1 | 1.1623 |
| 27 | 1 | 0 | 1 | 1 | 1 | 0 | 1 | 0 | 0 | 0 | 0 | 0 | 1 | 1 | 0 | 1 | 1 | 1 | 1.2810 |
| 28 | 0 | 0 | 1 | 1 | 1 | 1 | 1 | 1 | 1 | 0 | 0 | 1 | 0 | 0 | 1 | 1 | 0 | 1 | 1.1472 |
| 29 | 0 | 1 | 1 | 0 | 1 | 0 | 0 | 1 | 1 | 1 | 0 | 0 | 1 | 0 | 1 | 1 | 1 | 1 | 1.4049 |
| 30 | 1 | 0 | 1 | 1 | 1 | 0 | 1 | 0 | 0 | 1 | 1 | 0 | 0 | 1 | 0 | 1 | 1 | 1 | 1.3758 |

TABLE 8

Length 24 CGS Sequence: Max to 2nd Min Power Ratio Minimization

| # | Binary Sequence | | | | | | | | | | | | | | | | | | | | | | | | PAPR |
|---|---|---|---|---|---|---|---|---|---|---|---|---|---|---|---|---|---|---|---|---|---|---|---|---|---|
| 1 | 0 | 0 | 0 | 0 | 0 | 1 | 0 | 1 | 1 | 0 | 0 | 1 | 1 | 1 | 0 | 0 | 1 | 1 | 1 | 1 | 1 | 1 | 1 | 1 | 1.4446 |
| 2 | 0 | 0 | 0 | 0 | 1 | 1 | 0 | 1 | 1 | 1 | 0 | 0 | 1 | 0 | 0 | 0 | 0 | 0 | 0 | 0 | 0 | 1 | 1 | 1 | 1.3892 |
| 3 | 1 | 1 | 1 | 1 | 0 | 1 | 0 | 1 | 0 | 1 | 0 | 0 | 1 | 0 | 0 | 0 | 1 | 1 | 1 | 1 | 0 | 0 | 1 | 1 | 1.2319 |
| 4 | 1 | 1 | 0 | 0 | 1 | 0 | 1 | 0 | 0 | 0 | 0 | 1 | 1 | 0 | 0 | 0 | 1 | 0 | 0 | 0 | 0 | 1 | 1 | 1 | 1.2953 |
| 5 | 1 | 1 | 1 | 1 | 1 | 1 | 0 | 1 | 0 | 1 | 0 | 0 | 0 | 1 | 1 | 1 | 0 | 0 | 0 | 0 | 0 | 1 | 1 | 1 | 1.3358 |
| 6 | 0 | 0 | 1 | 1 | 1 | 0 | 0 | 1 | 1 | 0 | 1 | 0 | 0 | 0 | 0 | 0 | 0 | 1 | 1 | 1 | 1 | 1 | 1 | 1 | 1.4503 |
| 7 | 0 | 1 | 0 | 0 | 1 | 1 | 1 | 1 | 1 | 0 | 0 | 0 | 1 | 0 | 0 | 0 | 1 | 1 | 0 | 0 | 0 | 0 | 0 | 1 | 1.3035 |
| 8 | 0 | 1 | 1 | 0 | 0 | 1 | 0 | 1 | 1 | 0 | 0 | 0 | 0 | 0 | 1 | 0 | 1 | 0 | 0 | 1 | 1 | 1 | 1 | 1 | 1.3066 |
| 9 | 0 | 1 | 1 | 0 | 0 | 0 | 1 | 0 | 1 | 1 | 0 | 1 | 0 | 1 | 1 | 1 | 0 | 0 | 0 | 0 | 1 | 1 | 1 | 1 | 1.0165 |
| 10 | 0 | 1 | 1 | 1 | 0 | 0 | 0 | 1 | 0 | 1 | 0 | 0 | 1 | 0 | 1 | 1 | 1 | 0 | 1 | 0 | 0 | 0 | 0 | 1 | 1.0198 |

TABLE 8-continued

Length 24 CGS Sequence: Max to 2nd Min Power Ratio Minimization

| # | Binary Sequence | PAPR |
|---|---|---|
| 11 | 0 0 0 1 0 1 0 0 1 0 1 0 0 0 0 0 0 0 1 0 0 1 1 1 | 1.6128 |
| 12 | 1 1 0 0 1 0 0 0 1 0 1 1 1 0 1 0 0 1 0 0 0 0 0 1 | 1.1774 |
| 13 | 1 0 1 1 1 1 0 0 0 1 0 0 1 1 1 1 0 0 1 1 1 1 1 1 | 1.4923 |
| 14 | 1 0 0 0 0 0 1 0 0 1 0 0 1 1 1 0 1 0 1 0 1 1 1 1 | 1.1815 |
| 15 | 0 0 0 1 1 1 1 0 1 1 1 0 1 1 1 0 0 1 0 0 0 1 1 1 | 1.1783 |
| 16 | 1 1 1 0 1 1 0 0 1 0 0 0 0 1 0 0 1 0 0 0 0 0 0 1 | 1.2069 |
| 17 | 0 0 1 0 0 0 0 0 0 1 1 1 0 0 0 0 1 1 0 1 1 1 1 1 | 0.9264 |
| 18 | 0 0 0 1 0 0 1 0 0 1 1 0 1 0 1 0 0 0 0 1 1 1 1 1 | 0.8785 |
| 19 | 1 0 0 0 0 0 1 0 1 0 1 1 0 0 0 1 0 0 0 1 1 1 1 1 | 1.2135 |
| 20 | 1 1 1 0 1 1 0 0 1 1 1 0 1 0 1 1 0 1 0 1 1 1 1 1 | 1.1749 |
| 21 | 0 0 0 1 1 1 1 1 1 1 0 1 1 0 0 0 0 1 0 0 1 1 1 1 | 1.3666 |
| 22 | 1 0 0 0 1 0 1 1 1 0 1 1 0 0 0 1 0 1 1 0 1 0 1 1 | 1.2057 |
| 23 | 1 0 0 0 1 1 1 0 1 1 1 1 0 0 1 0 1 0 1 1 0 1 1 1 | 1.2885 |
| 24 | 0 0 0 0 1 0 1 0 0 1 0 0 0 1 0 1 1 0 1 0 0 0 1 1 | 1.1662 |
| 25 | 1 0 0 0 1 1 1 1 1 0 1 1 0 1 0 0 0 1 0 1 1 1 0 1 | 1.3859 |
| 26 | 1 0 0 0 1 0 0 0 1 1 0 0 0 0 1 0 1 0 0 1 1 1 1 1 | 1.4271 |
| 27 | 1 1 0 0 0 1 0 0 0 0 1 1 1 0 1 1 1 1 0 0 1 1 1 1 | 1.5297 |
| 28 | 0 1 0 1 0 1 1 1 1 0 0 0 0 0 1 0 0 1 0 0 1 1 1 1 | 1.6127 |
| 29 | 1 0 1 1 1 1 0 0 0 1 0 1 0 0 0 1 1 1 0 1 1 1 1 | 1.3727 |
| 30 | 0 0 0 0 1 0 0 1 1 1 1 0 0 0 0 1 1 1 1 1 1 0 1 1 | 0.9364 |

In another embodiment of this invention, the metric can be the maximization of the Pth percentile power of the frequency domain samples of the reference signal after pi/2-BPSK modulation and DFT-spreading, where P={10, 20, 30, 40, 50}.

An example of sequences generated using this metric with K=30 sequences each for lengths L={6, 12, 18 and 24} and P=10 is provided in Tables 9-12 below.

TABLE 9

Length 6 CGS Sequence: 10th Percentile Power Maximization

| # | Binary Sequence | PAPR |
|---|---|---|
| 1 | 0 1 1 1 1 1 | 1.4753 |
| 2 | 1 0 0 1 1 1 | 0.9162 |
| 3 | 1 1 0 0 1 1 | 1.1195 |
| 4 | 1 1 0 0 0 1 | 0.8306 |
| 5 | 0 0 0 0 0 1 | 1.5695 |
| 6 | 0 1 0 1 0 1 | 1.9329 |
| 7 | 0 1 1 0 1 1 | 0.7552 |
| 8 | 1 0 1 0 0 1 | 0.9694 |
| 9 | 0 0 1 0 1 1 | 1.1906 |
| 10 | 0 1 0 0 0 1 | 1.6034 |
| 11 | 0 1 1 1 0 1 | 1.5951 |
| 12 | 1 1 1 1 0 1 | 1.5782 |
| 13 | 1 1 0 1 0 1 | 1.6140 |
| 14 | 0 0 1 1 0 1 | 1.1887 |
| 15 | 0 0 1 0 0 1 | 0.7709 |
| 16 | 0 1 1 0 0 1 | 1.0078 |
| 17 | 1 0 1 1 0 1 | 0.7836 |
| 18 | 1 1 0 0 1 1 | 1.4589 |
| 19 | 1 0 0 0 1 1 | 1.0226 |
| 20 | 1 1 0 1 1 1 | 1.4457 |
| 21 | 0 0 0 1 0 1 | 1.5969 |
| 22 | 1 0 1 1 1 1 | 1.4450 |
| 23 | 0 0 0 0 1 1 | 1.2340 |
| 24 | 1 1 1 1 1 1 | 1.7210 |
| 25 | 1 0 0 0 1 1 | 0.7733 |
| 26 | 0 0 0 1 1 1 | 0.7900 |
| 27 | 0 1 0 0 1 1 | 1.1927 |
| 28 | 0 0 1 1 1 1 | 1.1354 |
| 29 | 1 1 1 0 0 1 | 0.9982 |
| 30 | 1 0 0 0 0 1 | 1.0016 |

TABLE 10

Length 12 CGS Sequence: 10th Percentile Power Maximization

| # | Binary Sequence | PAPR |
|---|---|---|
| 1 | 0 0 0 1 1 1 1 1 1 1 1 1 | 1.3590 |
| 2 | 1 1 1 0 0 1 0 0 1 1 1 1 | 0.9985 |
| 3 | 1 1 1 1 0 1 1 0 1 1 1 1 | 1.6917 |
| 4 | 0 1 0 0 1 1 0 1 1 0 0 1 | 1.2242 |
| 5 | 1 0 0 0 1 1 1 0 1 0 1 1 | 1.2811 |
| 6 | 1 0 1 1 0 0 1 0 1 0 0 1 | 0.7782 |
| 7 | 0 1 1 1 0 0 0 0 1 0 0 1 | 1.1321 |
| 8 | 0 0 0 0 0 1 1 0 1 1 1 1 | 1.0219 |
| 9 | 0 1 1 0 1 0 1 1 0 1 1 1 | 1.1598 |
| 10 | 1 1 0 0 0 1 0 1 1 0 1 1 | 1.1203 |
| 11 | 0 0 0 1 0 0 1 1 1 0 0 1 | 1.0621 |
| 12 | 1 1 0 1 0 0 1 1 0 1 0 1 | 1.5482 |
| 13 | 0 1 0 1 0 1 0 1 1 0 1 1 | 1.3570 |
| 14 | 0 0 0 0 0 1 1 0 0 0 1 1 | 1.2429 |
| 15 | 1 0 0 0 0 1 0 0 0 0 0 1 | 1.5501 |
| 16 | 0 0 1 1 1 0 1 1 1 0 0 1 | 1.0249 |
| 17 | 0 1 1 0 1 0 1 0 1 1 0 1 | 0.8395 |
| 18 | 0 1 0 1 1 1 0 1 1 1 1 1 | 1.7041 |
| 19 | 1 0 1 0 0 0 1 1 1 0 0 0 | 1.3051 |
| 20 | 0 0 0 1 1 0 0 1 0 0 0 1 | 1.3547 |
| 21 | 0 0 0 0 1 0 1 0 0 0 0 1 | 1.7419 |
| 22 | 1 1 1 1 0 1 1 1 1 1 0 0 | 1.5968 |
| 23 | 1 1 1 0 0 1 1 1 1 1 0 1 | 1.4922 |
| 24 | 1 0 1 0 0 0 0 0 1 0 1 1 | 1.7153 |
| 25 | 0 1 1 1 0 1 0 1 1 1 1 1 | 1.3190 |
| 26 | 1 0 0 1 0 1 0 0 1 1 1 1 | 0.7246 |
| 27 | 1 1 0 1 1 1 1 0 1 0 1 1 | 1.5165 |
| 28 | 1 1 0 0 1 0 1 1 1 0 0 1 | 1.1954 |
| 29 | 0 1 0 0 1 0 1 0 1 0 0 1 | 0.8576 |
| 30 | 0 0 1 0 0 1 0 0 0 0 1 1 | 1.3789 |

TABLE 11

Length 18 CGS Sequence: 10th Percentile Power Maximization

| # | Binary Sequence | | | | | | | | | | | | | | | | | | PAPR |
|---|---|---|---|---|---|---|---|---|---|---|---|---|---|---|---|---|---|---|---|
| 1  | 0 | 0 | 0 | 0 | 1 | 0 | 0 | 0 | 1 | 0 | 0 | 0 | 0 | 1 | 1 | 1 | 1 | 1 | 1.1787 |
| 2  | 1 | 1 | 1 | 1 | 1 | 0 | 1 | 1 | 1 | 1 | 0 | 0 | 1 | 0 | 0 | 1 | 1 | 1 | 1.3002 |
| 3  | 1 | 1 | 1 | 1 | 0 | 1 | 0 | 0 | 1 | 1 | 1 | 0 | 1 | 0 | 1 | 0 | 0 | 1 | 1.2249 |
| 4  | 1 | 1 | 1 | 1 | 1 | 0 | 1 | 1 | 0 | 0 | 0 | 0 | 1 | 0 | 1 | 0 | 0 | 1 | 1.2300 |
| 5  | 0 | 0 | 0 | 1 | 1 | 0 | 1 | 0 | 0 | 0 | 0 | 0 | 0 | 0 | 0 | 0 | 1 | 1 | 1.1847 |
| 6  | 1 | 1 | 1 | 1 | 1 | 0 | 1 | 0 | 0 | 1 | 1 | 1 | 0 | 0 | 1 | 1 | 1 | 1 | 1.1227 |
| 7  | 1 | 1 | 1 | 1 | 1 | 0 | 0 | 1 | 0 | 0 | 1 | 0 | 1 | 1 | 0 | 1 | 1 | 1 | 0.9601 |
| 8  | 1 | 1 | 1 | 0 | 0 | 0 | 1 | 0 | 1 | 0 | 1 | 0 | 1 | 1 | 0 | 0 | 0 | 1 | 1.1453 |
| 9  | 0 | 0 | 1 | 0 | 1 | 0 | 0 | 1 | 1 | 0 | 1 | 0 | 0 | 0 | 0 | 0 | 1 | 1 | 1.2984 |
| 10 | 1 | 0 | 1 | 0 | 1 | 0 | 0 | 0 | 1 | 0 | 0 | 1 | 0 | 1 | 1 | 0 | 0 | 1 | 1.6605 |
| 11 | 0 | 0 | 0 | 1 | 1 | 1 | 1 | 0 | 0 | 0 | 1 | 1 | 0 | 1 | 0 | 1 | 0 | 1 | 1.1314 |
| 12 | 0 | 1 | 1 | 0 | 1 | 0 | 0 | 0 | 1 | 0 | 0 | 0 | 1 | 0 | 1 | 0 | 1 | 1 | 1.7587 |
| 13 | 0 | 0 | 1 | 1 | 1 | 1 | 0 | 1 | 0 | 1 | 0 | 1 | 0 | 1 | 1 | 0 | 0 | 1 | 1.5446 |
| 14 | 1 | 1 | 0 | 1 | 1 | 1 | 1 | 1 | 1 | 0 | 0 | 0 | 1 | 1 | 1 | 1 | 0 | 1 | 1.6415 |
| 15 | 0 | 1 | 0 | 0 | 0 | 0 | 1 | 1 | 0 | 1 | 1 | 0 | 0 | 1 | 0 | 1 | 0 | 1 | 1.5001 |
| 16 | 0 | 0 | 0 | 0 | 0 | 1 | 0 | 1 | 0 | 0 | 0 | 1 | 1 | 1 | 0 | 1 | 1 | 1 | 1.5698 |
| 17 | 0 | 0 | 0 | 0 | 1 | 1 | 1 | 1 | 0 | 1 | 1 | 1 | 1 | 1 | 0 | 0 | 0 | 1 | 1.5623 |
| 18 | 1 | 0 | 0 | 1 | 0 | 0 | 1 | 0 | 1 | 0 | 1 | 1 | 1 | 0 | 1 | 1 | 1 | 0 | 1.7732 |
| 19 | 0 | 0 | 0 | 0 | 0 | 1 | 0 | 1 | 1 | 0 | 0 | 0 | 1 | 0 | 1 | 0 | 1 | 1 | 1.2810 |
| 20 | 1 | 1 | 0 | 0 | 0 | 0 | 0 | 1 | 1 | 1 | 1 | 0 | 1 | 1 | 0 | 1 | 1 | 1 | 1.1668 |
| 21 | 0 | 0 | 0 | 1 | 0 | 0 | 0 | 0 | 0 | 0 | 1 | 0 | 1 | 0 | 0 | 0 | 0 | 1 | 1.4218 |
| 22 | 0 | 1 | 0 | 1 | 1 | 1 | 0 | 0 | 0 | 1 | 0 | 0 | 1 | 1 | 1 | 1 | 1 | 1 | 1.3793 |
| 23 | 0 | 0 | 1 | 0 | 0 | 1 | 1 | 1 | 1 | 1 | 1 | 1 | 0 | 1 | 1 | 0 | 0 | 1 | 0.9573 |
| 24 | 1 | 1 | 0 | 1 | 1 | 0 | 1 | 0 | 0 | 0 | 0 | 0 | 1 | 0 | 1 | 1 | 0 | 1 | 1.2214 |
| 25 | 0 | 1 | 1 | 1 | 0 | 0 | 0 | 0 | 1 | 0 | 1 | 0 | 0 | 0 | 0 | 1 | 1 | 1 | 1.2238 |
| 26 | 1 | 0 | 1 | 1 | 0 | 0 | 0 | 0 | 0 | 0 | 0 | 1 | 0 | 0 | 0 | 0 | 0 | 1 | 1.4990 |
| 27 | 0 | 0 | 1 | 1 | 1 | 1 | 0 | 1 | 1 | 1 | 1 | 1 | 1 | 1 | 0 | 0 | 0 | 1 | 1.3191 |
| 28 | 0 | 0 | 0 | 0 | 1 | 1 | 0 | 1 | 1 | 0 | 1 | 0 | 0 | 1 | 0 | 0 | 0 | 0 | 1.1141 |
| 29 | 1 | 0 | 1 | 0 | 0 | 1 | 0 | 1 | 0 | 0 | 1 | 0 | 1 | 1 | 1 | 0 | 1 | 1 | 1.1790 |
| 30 | 0 | 1 | 0 | 0 | 0 | 0 | 0 | 0 | 1 | 1 | 1 | 0 | 0 | 0 | 0 | 1 | 0 | 0 | 1.1787 |

TABLE 12

Length 24 CGS Sequence: 10th Percentile Power Maximization

| # | Binary Sequence | | | | | | | | | | | | | | | | | | | | | | | | PAPR |
|---|---|---|---|---|---|---|---|---|---|---|---|---|---|---|---|---|---|---|---|---|---|---|---|---|---|
| 1  | 0 | 1 | 0 | 0 | 0 | 1 | 1 | 1 | 0 | 0 | 0 | 1 | 0 | 1 | 1 | 1 | 1 | 1 | 1 | 1 | 1 | 1 | 1 | 1 | 1.8683 |
| 2  | 0 | 1 | 0 | 1 | 1 | 0 | 0 | 1 | 0 | 1 | 0 | 1 | 0 | 0 | 1 | 0 | 1 | 0 | 1 | 1 | 0 | 0 | 1 | 1 | 1.1570 |
| 3  | 0 | 0 | 0 | 0 | 0 | 0 | 1 | 1 | 1 | 1 | 1 | 1 | 1 | 0 | 0 | 1 | 1 | 1 | 1 | 1 | 0 | 0 | 1 | 1 | 1.1637 |
| 4  | 0 | 1 | 0 | 1 | 0 | 0 | 0 | 0 | 1 | 0 | 1 | 0 | 1 | 0 | 1 | 0 | 1 | 0 | 1 | 1 | 1 | 0 | 0 | 1 | 1.1431 |
| 5  | 1 | 1 | 1 | 0 | 1 | 1 | 0 | 0 | 1 | 0 | 0 | 1 | 0 | 0 | 0 | 0 | 1 | 0 | 1 | 0 | 1 | 1 | 0 | 1 | 1.5343 |
| 6  | 1 | 0 | 0 | 0 | 0 | 0 | 0 | 0 | 1 | 1 | 0 | 0 | 0 | 0 | 0 | 1 | 1 | 0 | 0 | 1 | 1 | 1 | 1 | 1 | 1.1167 |
| 7  | 0 | 0 | 0 | 0 | 0 | 0 | 0 | 1 | 0 | 1 | 0 | 0 | 1 | 0 | 1 | 0 | 0 | 0 | 1 | 1 | 1 | 0 | 0 | 1 | 1.6272 |
| 8  | 0 | 1 | 0 | 1 | 1 | 1 | 1 | 1 | 1 | 1 | 0 | 1 | 1 | 0 | 0 | 0 | 1 | 1 | 1 | 0 | 1 | 0 | 1 | 1 | 1.5677 |
| 9  | 0 | 1 | 1 | 0 | 1 | 1 | 1 | 1 | 1 | 0 | 0 | 0 | 0 | 0 | 1 | 0 | 1 | 0 | 1 | 0 | 0 | 0 | 1 | 1 | 1.1976 |
| 10 | 0 | 0 | 1 | 0 | 1 | 0 | 1 | 1 | 1 | 1 | 0 | 1 | 1 | 0 | 1 | 1 | 0 | 1 | 0 | 0 | 0 | 0 | 0 | 1 | 1.5133 |
| 11 | 0 | 1 | 0 | 0 | 0 | 1 | 1 | 1 | 1 | 1 | 1 | 0 | 1 | 0 | 0 | 0 | 1 | 1 | 1 | 0 | 0 | 1 | 1 | 1 | 1.1210 |
| 12 | 0 | 1 | 1 | 1 | 0 | 0 | 0 | 1 | 0 | 1 | 0 | 1 | 1 | 1 | 0 | 0 | 0 | 1 | 0 | 1 | 1 | 1 | 1 | 1 | 1.5325 |
| 13 | 1 | 0 | 1 | 0 | 0 | 1 | 1 | 1 | 0 | 1 | 1 | 1 | 1 | 1 | 1 | 1 | 0 | 0 | 0 | 0 | 0 | 0 | 1 | 1 | 1.1918 |
| 14 | 0 | 0 | 1 | 0 | 1 | 1 | 0 | 1 | 0 | 1 | 0 | 1 | 1 | 1 | 0 | 1 | 1 | 0 | 0 | 0 | 0 | 0 | 0 | 1 | 1.1856 |
| 15 | 0 | 0 | 1 | 1 | 1 | 0 | 1 | 0 | 1 | 0 | 1 | 1 | 1 | 1 | 0 | 0 | 0 | 0 | 1 | 0 | 0 | 0 | 0 | 1 | 1.1989 |
| 16 | 1 | 0 | 0 | 1 | 1 | 1 | 1 | 1 | 1 | 0 | 1 | 1 | 0 | 0 | 0 | 0 | 0 | 0 | 1 | 1 | 0 | 1 | 1 | 1 | 1.0406 |
| 17 | 0 | 1 | 1 | 1 | 1 | 0 | 1 | 0 | 0 | 0 | 0 | 0 | 0 | 0 | 0 | 0 | 0 | 0 | 1 | 0 | 1 | 1 | 1 | 0 | 1.9000 |
| 18 | 0 | 0 | 0 | 0 | 0 | 0 | 1 | 1 | 0 | 1 | 1 | 1 | 1 | 1 | 0 | 0 | 1 | 1 | 1 | 1 | 0 | 1 | 1 | 1 | 1.0648 |
| 19 | 0 | 1 | 1 | 0 | 1 | 0 | 1 | 0 | 1 | 1 | 0 | 1 | 0 | 1 | 0 | 1 | 0 | 1 | 1 | 0 | 1 | 1 | 1 | 1 | 1.5084 |
| 20 | 1 | 1 | 0 | 0 | 0 | 1 | 0 | 0 | 0 | 0 | 0 | 0 | 0 | 0 | 1 | 1 | 1 | 1 | 0 | 0 | 0 | 1 | 1 | 0 | 1.3346 |
| 21 | 0 | 0 | 0 | 1 | 0 | 0 | 1 | 1 | 1 | 1 | 0 | 1 | 0 | 1 | 0 | 1 | 0 | 1 | 0 | 1 | 0 | 1 | 0 | 1 | 1.3305 |
| 22 | 1 | 0 | 1 | 0 | 0 | 0 | 1 | 1 | 1 | 0 | 1 | 1 | 1 | 1 | 0 | 1 | 0 | 0 | 0 | 1 | 1 | 1 | 0 | 1 | 1.5611 |
| 23 | 0 | 1 | 0 | 1 | 0 | 0 | 0 | 1 | 1 | 0 | 1 | 0 | 1 | 0 | 0 | 1 | 0 | 1 | 0 | 0 | 0 | 1 | 1 | 1 | 1.1640 |
| 24 | 0 | 1 | 0 | 1 | 0 | 0 | 1 | 0 | 1 | 1 | 1 | 0 | 1 | 0 | 0 | 0 | 0 | 0 | 1 | 0 | 0 | 0 | 1 | 1 | 1.1539 |
| 25 | 1 | 1 | 1 | 0 | 0 | 0 | 1 | 0 | 1 | 1 | 1 | 0 | 1 | 0 | 1 | 1 | 0 | 0 | 0 | 1 | 0 | 1 | 1 | 1 | 1.0954 |
| 26 | 0 | 0 | 1 | 1 | 1 | 1 | 1 | 1 | 0 | 0 | 0 | 0 | 0 | 0 | 1 | 0 | 1 | 0 | 0 | 1 | 1 | 1 | 1 | 1 | 1.1193 |
| 27 | 0 | 0 | 1 | 0 | 0 | 0 | 0 | 1 | 0 | 1 | 1 | 1 | 0 | 0 | 1 | 0 | 0 | 1 | 0 | 1 | 1 | 1 | 1 | 0 | 1.1501 |
| 28 | 0 | 1 | 1 | 1 | 0 | 0 | 0 | 0 | 0 | 0 | 1 | 0 | 0 | 0 | 0 | 0 | 0 | 1 | 0 | 1 | 1 | 1 | 0 | 1 | 1.5296 |
| 29 | 1 | 1 | 1 | 1 | 1 | 1 | 1 | 0 | 0 | 0 | 1 | 0 | 0 | 0 | 0 | 1 | 1 | 1 | 1 | 1 | 1 | 1 | 1 | 0 | 1.5312 |
| 30 | 0 | 0 | 0 | 1 | 1 | 1 | 1 | 1 | 0 | 1 | 1 | 0 | 1 | 1 | 0 | 0 | 0 | 1 | 0 | 1 | 0 | 1 | 0 | 0 | 1.1798 |

An example of sequences generated using this metric with K=30 sequences each for lengths L={6, 12, 18 and 24} and P=40 is provided in Tables 13-16 below.

TABLE 13

Length 6 CGS Sequence: 40th Percentile Power Maximization

| # | Binary Sequence | | | | | | PAPR |
|---|---|---|---|---|---|---|---|
| 1  | 0 | 0 | 0 | 1 | 1 | 1 | 0.7900 |
| 2  | 1 | 1 | 1 | 1 | 1 | 1 | 1.7210 |
| 3  | 1 | 1 | 0 | 0 | 1 | 1 | 1.1195 |
| 4  | 1 | 1 | 1 | 0 | 0 | 1 | 0.9982 |
| 5  | 1 | 0 | 1 | 0 | 1 | 1 | 1.5028 |
| 6  | 0 | 0 | 0 | 0 | 0 | 1 | 1.5695 |
| 7  | 0 | 0 | 1 | 0 | 1 | 1 | 1.1906 |
| 8  | 1 | 1 | 0 | 1 | 1 | 1 | 1.4457 |
| 9  | 1 | 0 | 1 | 1 | 0 | 1 | 0.7836 |
| 10 | 0 | 1 | 1 | 1 | 0 | 1 | 1.5951 |
| 11 | 1 | 0 | 0 | 1 | 0 | 1 | 1.0226 |
| 12 | 1 | 1 | 0 | 1 | 0 | 1 | 1.6140 |
| 13 | 0 | 0 | 1 | 1 | 0 | 1 | 1.1887 |
| 14 | 0 | 0 | 0 | 1 | 0 | 1 | 1.5969 |
| 15 | 0 | 0 | 1 | 0 | 0 | 1 | 0.7709 |
| 16 | 1 | 0 | 0 | 0 | 1 | 1 | 0.7733 |
| 17 | 1 | 1 | 0 | 0 | 0 | 1 | 0.8306 |
| 18 | 1 | 1 | 1 | 0 | 1 | 1 | 1.4589 |
| 19 | 0 | 1 | 1 | 0 | 0 | 1 | 1.0078 |
| 20 | 1 | 0 | 0 | 1 | 1 | 1 | 0.9162 |
| 21 | 0 | 1 | 0 | 0 | 0 | 1 | 1.6034 |
| 22 | 1 | 0 | 0 | 0 | 0 | 1 | 1.0016 |
| 23 | 1 | 0 | 1 | 1 | 1 | 1 | 1.4450 |
| 24 | 0 | 0 | 0 | 0 | 1 | 1 | 1.2340 |
| 25 | 1 | 1 | 1 | 1 | 0 | 1 | 1.5782 |
| 26 | 0 | 1 | 0 | 1 | 0 | 1 | 1.9329 |
| 27 | 0 | 1 | 1 | 0 | 1 | 1 | 0.7552 |
| 28 | 0 | 1 | 0 | 0 | 1 | 1 | 1.1927 |
| 29 | 0 | 0 | 1 | 1 | 1 | 1 | 1.1354 |
| 30 | 1 | 0 | 1 | 0 | 0 | 1 | 0.9694 |

TABLE 14

Length 12 CGS Sequence: 40th Percentile Power Maximization

| # | Binary Sequence | | | | | | | | | | | | PAPR |
|---|---|---|---|---|---|---|---|---|---|---|---|---|---|
| 1  | 0 | 0 | 1 | 1 | 1 | 0 | 0 | 1 | 1 | 1 | 1 | 1 | 1.1862 |
| 2  | 0 | 0 | 1 | 1 | 1 | 1 | 1 | 1 | 1 | 0 | 0 | 1 | 1.0340 |
| 3  | 0 | 0 | 0 | 1 | 0 | 1 | 0 | 1 | 0 | 0 | 0 | 1 | 1.7761 |
| 4  | 1 | 1 | 0 | 1 | 1 | 1 | 0 | 0 | 0 | 0 | 0 | 1 | 1.1837 |
| 5  | 1 | 1 | 1 | 0 | 0 | 0 | 0 | 1 | 0 | 0 | 1 | 1 | 0.7628 |
| 6  | 0 | 1 | 0 | 0 | 1 | 0 | 0 | 1 | 0 | 0 | 0 | 1 | 1.1865 |
| 7  | 1 | 1 | 0 | 1 | 1 | 0 | 0 | 0 | 1 | 1 | 1 | 1 | 1.3506 |
| 8  | 1 | 0 | 0 | 0 | 0 | 0 | 1 | 0 | 0 | 0 | 1 | 1 | 1.2020 |
| 9  | 0 | 0 | 1 | 0 | 0 | 0 | 1 | 0 | 0 | 1 | 0 | 1 | 1.1367 |
| 10 | 1 | 0 | 0 | 0 | 1 | 0 | 1 | 1 | 0 | 0 | 0 | 1 | 1.1241 |
| 11 | 1 | 0 | 0 | 0 | 1 | 1 | 0 | 1 | 1 | 1 | 1 | 1 | 0.9537 |
| 12 | 1 | 1 | 1 | 0 | 0 | 1 | 0 | 0 | 1 | 1 | 0 | 1 | 0.8001 |
| 13 | 1 | 0 | 0 | 1 | 1 | 1 | 1 | 0 | 1 | 0 | 1 | 1 | 1.2753 |
| 14 | 0 | 0 | 1 | 1 | 0 | 0 | 1 | 0 | 0 | 1 | 1 | 1 | 0.9448 |
| 15 | 0 | 0 | 0 | 0 | 1 | 0 | 0 | 0 | 1 | 1 | 0 | 1 | 1.4596 |
| 16 | 1 | 0 | 1 | 0 | 1 | 1 | 0 | 1 | 0 | 0 | 0 | 1 | 0.7879 |
| 17 | 1 | 1 | 1 | 0 | 1 | 1 | 1 | 0 | 0 | 0 | 1 | 1 | 1.1225 |
| 18 | 0 | 0 | 0 | 0 | 1 | 1 | 1 | 1 | 1 | 0 | 1 | 1 | 1.5145 |
| 19 | 1 | 1 | 1 | 0 | 1 | 1 | 1 | 0 | 0 | 1 | 0 | 1 | 1.0470 |
| 20 | 0 | 0 | 1 | 0 | 0 | 0 | 1 | 0 | 1 | 1 | 1 | 1 | 1.4673 |
| 21 | 0 | 1 | 1 | 1 | 0 | 1 | 0 | 1 | 1 | 0 | 1 | 1 | 1.2061 |
| 22 | 1 | 0 | 1 | 1 | 1 | 0 | 1 | 0 | 0 | 0 | 0 | 1 | 1.0540 |
| 23 | 0 | 1 | 1 | 1 | 1 | 0 | 0 | 1 | 1 | 1 | 0 | 1 | 1.2910 |
| 24 | 1 | 1 | 1 | 0 | 0 | 1 | 0 | 0 | 0 | 0 | 0 | 0 | 1.3783 |
| 25 | 1 | 0 | 0 | 0 | 1 | 0 | 0 | 0 | 1 | 1 | 0 | 1 | 0.9832 |
| 26 | 1 | 1 | 0 | 0 | 0 | 0 | 1 | 0 | 1 | 1 | 0 | 1 | 0.8382 |
| 27 | 1 | 0 | 1 | 1 | 0 | 0 | 0 | 1 | 1 | 0 | 0 | 1 | 0.9787 |
| 28 | 0 | 1 | 1 | 0 | 1 | 0 | 0 | 0 | 0 | 1 | 1 | 1 | 0.8382 |
| 29 | 0 | 1 | 0 | 0 | 1 | 1 | 0 | 1 | 1 | 1 | 1 | 1 | 1.4937 |
| 30 | 1 | 1 | 0 | 0 | 0 | 0 | 0 | 1 | 1 | 0 | 1 | 1 | 0.7504 |

TABLE 15

Length 18 CGS Sequence: 40th Percentile Power Maximization

| # | Binary Sequence | | | | | | | | | | | | | | | | | | PAPR |
|---|---|---|---|---|---|---|---|---|---|---|---|---|---|---|---|---|---|---|---|
| 1  | 0 | 0 | 1 | 0 | 0 | 0 | 1 | 0 | 0 | 1 | 1 | 1 | 0 | 1 | 1 | 1 | 1 | 1 | 1.0919 |
| 2  | 1 | 1 | 0 | 0 | 0 | 1 | 0 | 0 | 0 | 1 | 1 | 1 | 0 | 0 | 1 | 0 | 0 | 1 | 0.9712 |
| 3  | 0 | 1 | 1 | 1 | 0 | 1 | 1 | 0 | 0 | 0 | 1 | 1 | 0 | 1 | 1 | 0 | 0 | 0 | 0.9571 |
| 4  | 1 | 1 | 0 | 0 | 0 | 1 | 0 | 0 | 1 | 0 | 0 | 1 | 1 | 0 | 1 | 1 | 1 | 1 | 1.1511 |
| 5  | 1 | 0 | 1 | 1 | 0 | 0 | 1 | 0 | 1 | 1 | 0 | 1 | 1 | 1 | 1 | 0 | 0 | 1 | 1.2327 |
| 6  | 1 | 0 | 0 | 1 | 1 | 0 | 1 | 1 | 0 | 1 | 0 | 1 | 1 | 1 | 0 | 0 | 1 | 1 | 1.1795 |
| 7  | 1 | 1 | 1 | 1 | 0 | 0 | 1 | 1 | 0 | 1 | 0 | 1 | 1 | 0 | 0 | 0 | 1 | 1 | 1.2314 |
| 8  | 0 | 0 | 1 | 0 | 0 | 1 | 0 | 1 | 0 | 0 | 0 | 1 | 1 | 0 | 0 | 0 | 1 | 1 | 1.3216 |
| 9  | 0 | 1 | 1 | 1 | 1 | 1 | 1 | 1 | 0 | 0 | 1 | 0 | 0 | 1 | 1 | 0 | 1 | 1 | 0.9751 |
| 10 | 1 | 1 | 0 | 1 | 1 | 1 | 1 | 0 | 0 | 1 | 0 | 0 | 1 | 1 | 1 | 1 | 0 | 1 | 1.3914 |
| 11 | 0 | 0 | 1 | 1 | 1 | 0 | 0 | 1 | 1 | 1 | 0 | 0 | 1 | 0 | 0 | 0 | 0 | 0 | 1.2527 |
| 12 | 0 | 1 | 1 | 0 | 0 | 1 | 0 | 0 | 1 | 1 | 1 | 1 | 1 | 1 | 0 | 1 | 1 | 1 | 0.9817 |
| 13 | 0 | 0 | 1 | 0 | 0 | 0 | 1 | 0 | 1 | 1 | 1 | 0 | 0 | 0 | 0 | 1 | 1 | 1 | 1.2407 |
| 14 | 0 | 0 | 0 | 1 | 0 | 0 | 0 | 0 | 1 | 1 | 0 | 1 | 1 | 0 | 0 | 0 | 0 | 1 | 1.4018 |
| 15 | 0 | 0 | 1 | 1 | 0 | 0 | 0 | 1 | 1 | 0 | 0 | 1 | 1 | 1 | 1 | 0 | 1 | 1 | 1.2207 |
| 16 | 1 | 0 | 0 | 0 | 0 | 0 | 0 | 0 | 1 | 0 | 0 | 1 | 0 | 0 | 1 | 1 | 0 | 1 | 1.2652 |
| 17 | 0 | 1 | 0 | 0 | 1 | 1 | 0 | 1 | 1 | 1 | 0 | 0 | 0 | 1 | 1 | 1 | 0 | 1 | 1.0430 |
| 18 | 0 | 0 | 1 | 1 | 1 | 0 | 0 | 0 | 1 | 0 | 0 | 1 | 0 | 1 | 0 | 0 | 1 | 0 | 1.0535 |
| 19 | 0 | 0 | 1 | 0 | 0 | 1 | 0 | 1 | 1 | 0 | 1 | 1 | 1 | 1 | 0 | 1 | 1 | 1 | 1.2488 |
| 20 | 0 | 0 | 0 | 0 | 1 | 1 | 1 | 0 | 0 | 0 | 1 | 0 | 0 | 0 | 0 | 1 | 1 | 0 | 1.1054 |
| 21 | 1 | 0 | 0 | 1 | 0 | 1 | 0 | 0 | 0 | 1 | 1 | 0 | 0 | 0 | 0 | 0 | 0 | 1 | 1.2435 |
| 22 | 1 | 0 | 0 | 1 | 0 | 0 | 1 | 0 | 0 | 0 | 1 | 1 | 1 | 1 | 1 | 0 | 1 | 1 | 1.2229 |
| 23 | 0 | 1 | 1 | 0 | 1 | 1 | 0 | 0 | 0 | 1 | 0 | 0 | 0 | 0 | 0 | 1 | 1 | 1 | 1.0856 |
| 24 | 0 | 0 | 0 | 0 | 1 | 0 | 0 | 1 | 0 | 0 | 0 | 0 | 1 | 1 | 0 | 1 | 1 | 1 | 1.3217 |
| 25 | 0 | 0 | 1 | 1 | 0 | 1 | 0 | 0 | 0 | 1 | 1 | 1 | 0 | 1 | 0 | 0 | 1 | 1 | 0.7743 |
| 26 | 1 | 0 | 0 | 0 | 0 | 1 | 0 | 0 | 1 | 1 | 1 | 0 | 1 | 0 | 0 | 1 | 1 | 1 | 0.8107 |
| 27 | 0 | 0 | 1 | 0 | 0 | 1 | 0 | 1 | 0 | 0 | 1 | 0 | 0 | 1 | 0 | 1 | 1 | 1 | 0.8637 |
| 28 | 0 | 1 | 1 | 0 | 0 | 0 | 0 | 1 | 0 | 1 | 1 | 0 | 1 | 1 | 0 | 1 | 1 | 1 | 1.1906 |
| 29 | 1 | 0 | 1 | 1 | 0 | 1 | 0 | 0 | 1 | 0 | 0 | 1 | 1 | 1 | 0 | 1 | 1 | 1 | 1.1767 |
| 30 | 0 | 0 | 0 | 0 | 1 | 0 | 1 | 1 | 1 | 0 | 1 | 1 | 0 | 0 | 0 | 1 | 1 | 1 | 1.1590 |

TABLE 16

Length 24 CGS Sequence: 40th Percentile Power Maximization

| # | Binary Sequence | | | | | | | | | | | | | | | | | | | | | | | | PAPR |
|---|---|---|---|---|---|---|---|---|---|---|---|---|---|---|---|---|---|---|---|---|---|---|---|---|---|
| 1 | 0 | 1 | 1 | 0 | 0 | 1 | 1 | 1 | 0 | 0 | 1 | 1 | 0 | 0 | 0 | 1 | 0 | 1 | 1 | 0 | 1 | 1 | 1 | 1 | 1.1835 |
| 2 | 1 | 1 | 0 | 1 | 0 | 0 | 1 | 0 | 0 | 1 | 1 | 0 | 0 | 0 | 1 | 1 | 0 | 0 | 1 | 0 | 0 | 1 | 0 | 1 | 1.2153 |
| 3 | 1 | 1 | 1 | 0 | 1 | 0 | 0 | 1 | 1 | 0 | 0 | 0 | 1 | 1 | 1 | 0 | 1 | 1 | 1 | 1 | 0 | 0 | 1 | 1 | 1.3564 |
| 4 | 0 | 1 | 1 | 0 | 0 | 1 | 1 | 1 | 0 | 0 | 0 | 1 | 0 | 0 | 0 | 0 | 1 | 1 | 1 | 0 | 0 | 1 | 1 | 1 | 1.2581 |
| 5 | 1 | 0 | 1 | 1 | 0 | 1 | 0 | 0 | 0 | 1 | 1 | 0 | 1 | 1 | 1 | 0 | 0 | 1 | 1 | 0 | 1 | 1 | 1 | 1 | 1.5124 |
| 6 | 1 | 1 | 0 | 0 | 1 | 1 | 0 | 0 | 0 | 1 | 1 | 0 | 0 | 1 | 0 | 0 | 0 | 1 | 0 | 0 | 1 | 0 | 0 | 1 | 1.1889 |
| 7 | 0 | 0 | 0 | 1 | 1 | 1 | 0 | 0 | 0 | 1 | 1 | 1 | 0 | 0 | 0 | 1 | 1 | 0 | 1 | 1 | 1 | 0 | 1 | 1 | 1.0003 |
| 8 | 0 | 1 | 1 | 1 | 1 | 1 | 0 | 0 | 1 | 1 | 1 | 1 | 0 | 1 | 1 | 1 | 0 | 0 | 0 | 1 | 1 | 0 | 0 | 1 | 1.3523 |
| 9 | 1 | 0 | 0 | 1 | 1 | 1 | 1 | 0 | 0 | 1 | 1 | 1 | 1 | 0 | 1 | 0 | 1 | 1 | 0 | 0 | 0 | 1 | 1 | 1 | 0.9904 |
| 10 | 0 | 1 | 1 | 1 | 0 | 0 | 1 | 1 | 0 | 1 | 0 | 0 | 0 | 0 | 1 | 1 | 0 | 0 | 0 | 0 | 1 | 0 | 0 | 0 | 1.6100 |
| 11 | 0 | 0 | 0 | 1 | 1 | 0 | 1 | 0 | 1 | 1 | 1 | 0 | 1 | 0 | 1 | 1 | 0 | 0 | 0 | 1 | 1 | 0 | 1 | 1 | 1.2602 |
| 12 | 0 | 0 | 0 | 0 | 1 | 0 | 1 | 1 | 0 | 0 | 1 | 0 | 0 | 0 | 0 | 0 | 1 | 1 | 0 | 0 | 1 | 0 | 0 | 1 | 1.6180 |
| 13 | 1 | 1 | 0 | 0 | 0 | 1 | 1 | 0 | 0 | 1 | 0 | 0 | 1 | 1 | 1 | 1 | 1 | 0 | 1 | 1 | 0 | 1 | 1 | 1 | 1.3301 |
| 14 | 1 | 0 | 1 | 1 | 1 | 0 | 0 | 0 | 0 | 0 | 1 | 1 | 0 | 0 | 1 | 1 | 1 | 0 | 0 | 0 | 1 | 1 | 1 | 1 | 0.9498 |
| 15 | 1 | 0 | 0 | 1 | 0 | 0 | 0 | 0 | 1 | 1 | 1 | 0 | 1 | 0 | 0 | 1 | 1 | 0 | 0 | 1 | 0 | 0 | 0 | 1 | 1.5395 |
| 16 | 0 | 0 | 1 | 0 | 1 | 0 | 0 | 0 | 1 | 1 | 1 | 0 | 1 | 0 | 0 | 1 | 1 | 0 | 0 | 1 | 1 | 1 | 1 | 1 | 0.7929 |
| 17 | 0 | 1 | 1 | 1 | 0 | 1 | 1 | 1 | 0 | 0 | 0 | 1 | 0 | 1 | 1 | 0 | 1 | 0 | 0 | 0 | 1 | 1 | 1 | 1 | 1.3136 |
| 18 | 0 | 1 | 1 | 1 | 0 | 1 | 0 | 1 | 1 | 1 | 0 | 1 | 1 | 0 | 1 | 1 | 0 | 0 | 0 | 1 | 1 | 0 | 1 | 1 | 1.2731 |
| 19 | 0 | 0 | 1 | 0 | 0 | 0 | 1 | 0 | 0 | 1 | 1 | 1 | 0 | 0 | 1 | 1 | 1 | 0 | 0 | 0 | 1 | 1 | 1 | 1 | 1.0145 |
| 20 | 1 | 1 | 1 | 0 | 1 | 1 | 1 | 1 | 1 | 0 | 0 | 1 | 0 | 0 | 1 | 1 | 0 | 0 | 1 | 0 | 0 | 1 | 1 | 1 | 1.2581 |
| 21 | 0 | 0 | 0 | 0 | 1 | 1 | 0 | 1 | 0 | 0 | 0 | 1 | 1 | 0 | 1 | 1 | 1 | 1 | 1 | 0 | 0 | 1 | 1 | 1 | 1.2788 |
| 22 | 0 | 0 | 0 | 1 | 1 | 0 | 0 | 1 | 1 | 1 | 1 | 1 | 0 | 1 | 0 | 1 | 1 | 1 | 1 | 1 | 0 | 1 | 1 | 1 | 1.3943 |
| 23 | 0 | 1 | 1 | 1 | 0 | 1 | 1 | 0 | 0 | 0 | 0 | 1 | 1 | 1 | 0 | 0 | 0 | 1 | 1 | 0 | 1 | 0 | 1 | 1 | 1.3078 |
| 24 | 0 | 0 | 1 | 1 | 0 | 0 | 0 | 0 | 1 | 0 | 0 | 1 | 0 | 0 | 0 | 0 | 0 | 1 | 1 | 0 | 1 | 0 | 1 | 1 | 1.3310 |
| 25 | 1 | 1 | 1 | 0 | 1 | 1 | 1 | 1 | 1 | 0 | 1 | 1 | 1 | 0 | 0 | 1 | 1 | 1 | 0 | 0 | 1 | 1 | 1 | 1 | 1.3378 |
| 26 | 1 | 0 | 0 | 0 | 1 | 0 | 0 | 0 | 1 | 1 | 1 | 1 | 1 | 1 | 0 | 1 | 1 | 1 | 0 | 0 | 0 | 1 | 1 | 1 | 1.4434 |
| 27 | 0 | 1 | 0 | 0 | 0 | 1 | 1 | 1 | 0 | 0 | 1 | 1 | 1 | 0 | 1 | 1 | 0 | 1 | 0 | 0 | 0 | 1 | 1 | 1 | 1.4582 |
| 28 | 0 | 0 | 1 | 1 | 0 | 1 | 0 | 1 | 0 | 0 | 1 | 1 | 1 | 1 | 1 | 0 | 0 | 1 | 1 | 0 | 1 | 1 | 1 | 1 | 1.3714 |
| 29 | 1 | 1 | 0 | 0 | 1 | 1 | 1 | 1 | 0 | 0 | 0 | 1 | 0 | 0 | 0 | 1 | 1 | 1 | 1 | 0 | 0 | 1 | 1 | 1 | 1.2539 |
| 30 | 0 | 1 | 1 | 0 | 1 | 1 | 0 | 1 | 1 | 0 | 1 | 1 | 0 | 0 | 1 | 0 | 1 | 0 | 1 | 1 | 0 | 1 | 1 | 1 | 1.4346 |

In one embodiment, the value K of a number of sequence groups can be less than 30 (as in Rel-15 NR). In one embodiment, the sequences may be selected by computing cyclic auto-correlation of sequence d(i) according to the following equation:

$$R(j) = \frac{1}{n}\left|\sum_{i=0}^{n-1} d(i) \cdot d(\mathrm{mod}(i+j, n))^*\right|.$$

In some aspects, the set of sequences can be selected to searching the sequence that 'n' non-zero elements R(j) for j≠0 which has x times value lower that R(j) for j=0, i.e. R(j)/R(0)≤x. The value of 'n' can vary according to the following order 'n'=0, 1, 2, etc.

Figure 7:
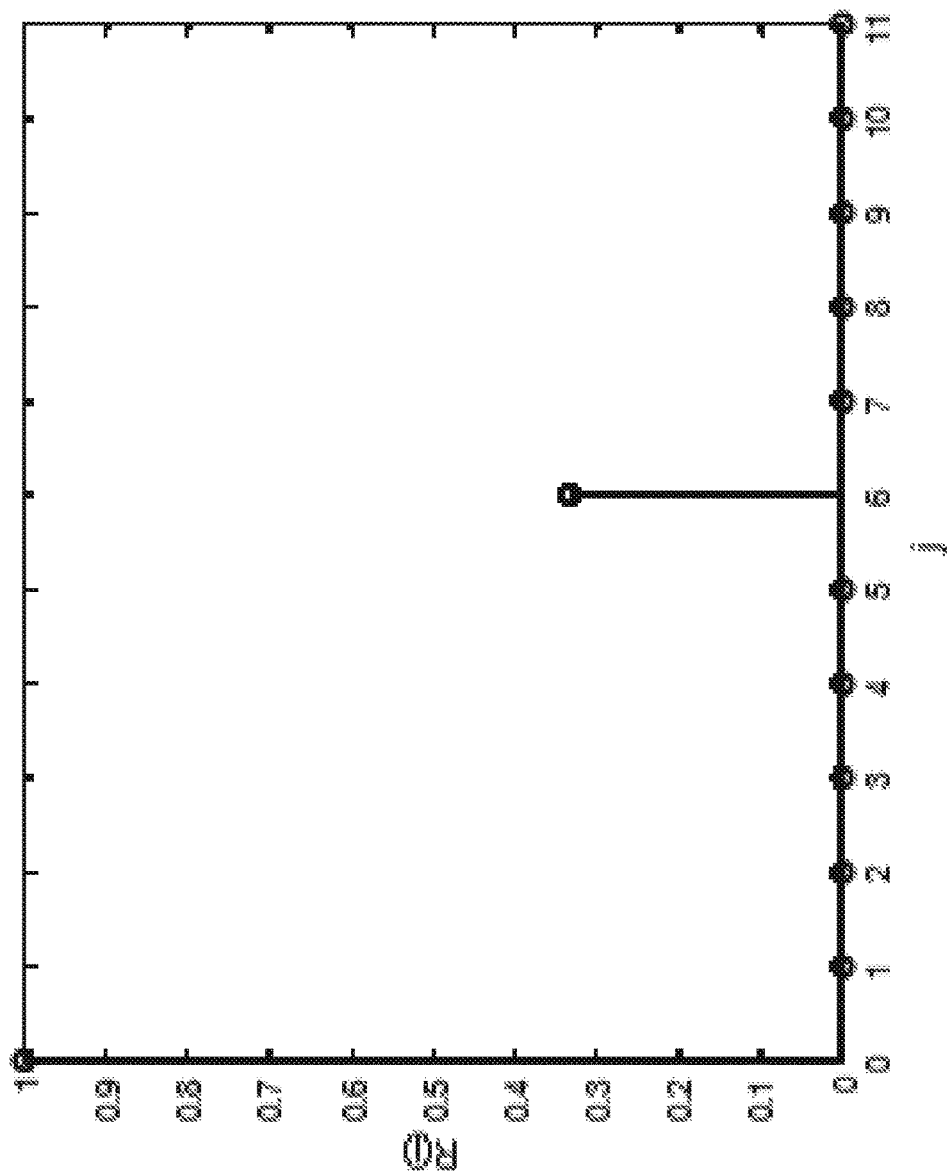
FIG. 7 is an example graph of an auto-correlation sequence, in accordance with some aspects.

FIG. 7 is an example graph 700 of an auto-correlation sequence, in accordance with some aspects. The example of the sequence, which has n=1 and x=−3 dB, is shown in FIG. 7.

In another example embodiment, the sequence can be selected to minimize the sum of the elements of signal auto-correlation function d(i)=argmin $\Sigma_{j=0}^{n-1}R(j)$.

In another embodiment, computer-generated sequences can be chosen based on the frequency domain properties of π/2 BPSK modulated DFT-spread binary sequences that correspond to previous time-domain autocorrelation properties. For example, sequences that are perfectly flat in terms of frequency-domain power yield perfect autocorrelation with R(j)≠0; j=0 and R(j)=0, j≠0.

Similarly, for sequences length N, which can be decomposed into two sequences, each with flat power profile in the frequency domain, yield autocorrelation with two peaks such that R(j)≠0; j=0, N/2 and R(j)=0 otherwise.

This property is a direct consequence of the linearity of the DFT operation and that the autocorrelation of the two superposed sub-sequences which form the sequences are also superposed. Similarly, sequences that can be decomposed into three sub-sequences, each with a flat power in the frequency domain will have almost perfect autocorrelation with 3 peaks in the time domain at lags 0, N/3, and 2N/3, respectively. These sequences are defined to be sequences with almost-perfect autocorrelation. Examples of such sequences are illustrated in FIG. 8.

Figure 8:
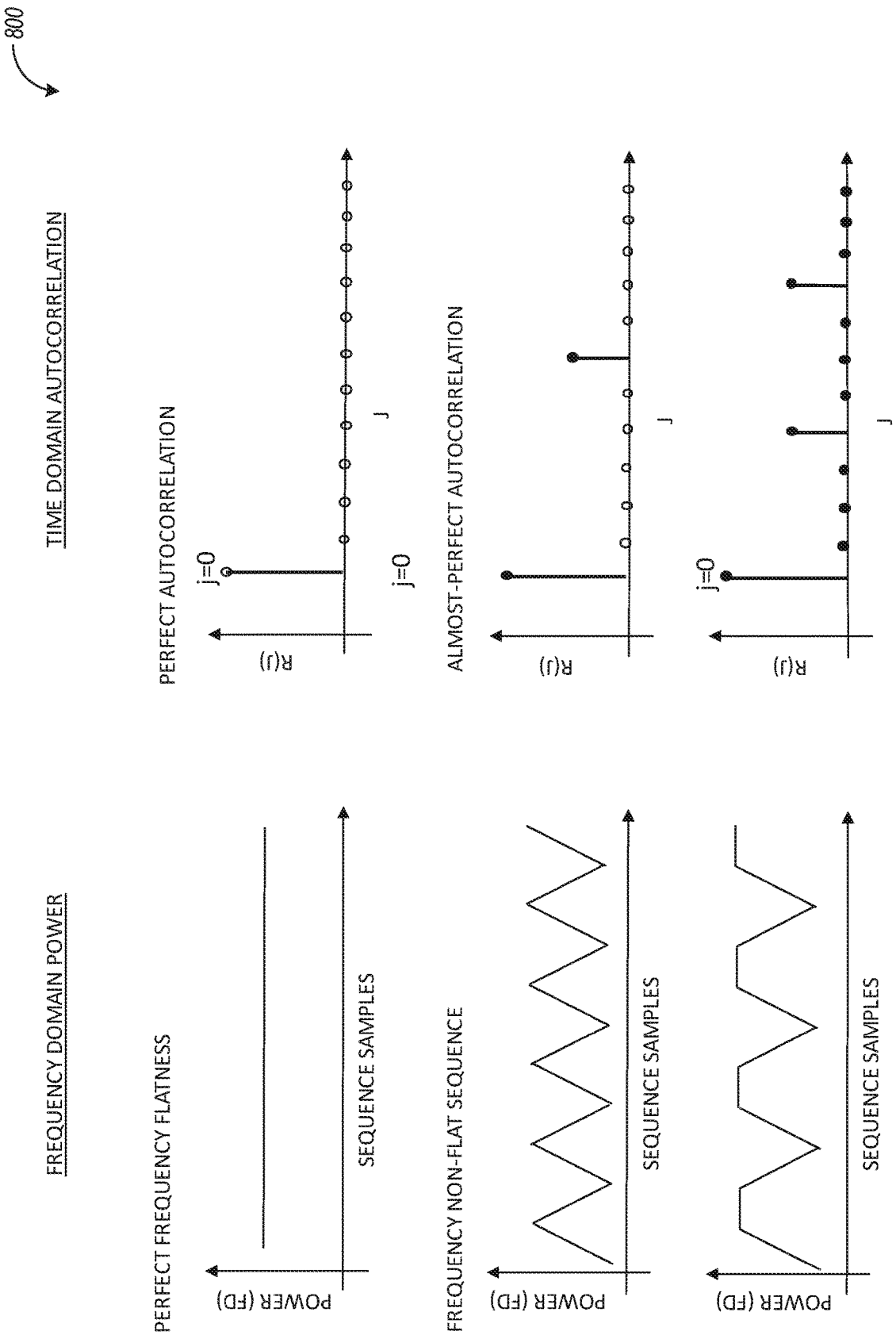
FIG. 8 illustrates example graphs with different samples of auto-correlation sequences, in accordance with some aspects.

FIG. 8 illustrates example graphs 800 with different samples of auto-correlation sequences, in accordance with some aspects.

Based on this observation, sequences with almost perfect autocorrelation or ones that can be decomposed into two/three or four sub-sequences with flat or relatively power profiles in the frequency domain may be selected for DMRS generation. Note that for channel estimation using such sequences, if adjacent samples are combined (for example in the two-level sequence case), the time domain autocorrelation of the sequences is further improved. Such sequences are further termed as frequency complementary sequences. For selecting such sequences an exhaustive search over all π/2-BPSK modulated binary sequences is conducted as shown in the previous figure with the metric being the levels of the sequences and final choice is based on pairwise partial cross-correlation.

An example of sequences generated using this method with K=30 sequences each for lengths L={12, 18 and 24} is provided in Tables 17-19 below.

For the case of length-12 CGS the sequence is generated as follows:

$$r_u(n) = \frac{e^{j\pi(n \bmod 2)/2}}{\sqrt{2}}[(1-2b(n)) + j(1-2b(n))]; n = 0, 2, \ldots, 11.$$

The binary sequence b(0), b(1), ..., b(11) is chosen from the u-th row of the following Table 17.

TABLE 17

Length 12 CGS Sequence

| μ | Binary Sequence | | | | | | | | | | | | PAPR |
|---|---|---|---|---|---|---|---|---|---|---|---|---|---|
| 0 | 0 | 0 | 1 | 0 | 0 | 1 | 1 | 1 | 1 | 1 | 1 | 1 | 1.0253 |
| 1 | 1 | 1 | 0 | 0 | 0 | 1 | 0 | 1 | 1 | 0 | 1 | 1 | 1.1203 |
| 2 | 0 | 0 | 1 | 0 | 0 | 0 | 1 | 0 | 0 | 1 | 0 | 1 | 1.1367 |
| 3 | 1 | 0 | 1 | 0 | 1 | 1 | 1 | 0 | 0 | 0 | 1 | 1 | 1.2924 |
| 4 | 1 | 0 | 1 | 1 | 0 | 1 | 0 | 1 | 1 | 0 | 1 | 1 | 1.1528 |
| 5 | 1 | 1 | 1 | 1 | 1 | 0 | 0 | 1 | 0 | 0 | 1 | 1 | 1.0191 |
| 6 | 0 | 0 | 1 | 0 | 0 | 1 | 0 | 0 | 0 | 0 | 0 | 1 | 1.3391 |
| 7 | 0 | 0 | 1 | 1 | 1 | 1 | 1 | 0 | 0 | 1 | 0 | 1 | 0.7283 |
| 8 | 1 | 1 | 1 | 0 | 1 | 1 | 0 | 1 | 0 | 0 | 0 | 1 | 1.1461 |
| 9 | 0 | 1 | 0 | 0 | 0 | 1 | 1 | 1 | 1 | 0 | 1 | 1 | 1.1414 |
| 10 | 0 | 1 | 1 | 1 | 0 | 0 | 0 | 1 | 0 | 0 | 0 | 1 | 1.1395 |
| 11 | 0 | 1 | 1 | 0 | 0 | 1 | 1 | 1 | 1 | 0 | 0 | 1 | 1.1241 |
| 12 | 1 | 0 | 0 | 1 | 0 | 1 | 0 | 0 | 1 | 1 | 1 | 1 | 0.7245 |
| 13 | 0 | 0 | 0 | 1 | 1 | 1 | 1 | 1 | 0 | 0 | 0 | 1 | 1.1852 |
| 14 | 1 | 0 | 1 | 1 | 0 | 0 | 0 | 0 | 0 | 0 | 0 | 1 | 1.0606 |
| 15 | 0 | 0 | 0 | 0 | 0 | 1 | 0 | 0 | 1 | 0 | 0 | 1 | 1.3533 |
| 16 | 1 | 0 | 0 | 0 | 1 | 1 | 1 | 0 | 1 | 0 | 1 | 1 | 1.2812 |
| 17 | 1 | 1 | 1 | 1 | 1 | 1 | 0 | 0 | 1 | 0 | 0 | 1 | 1.0274 |
| 18 | 0 | 1 | 1 | 1 | 1 | 0 | 1 | 0 | 1 | 1 | 1 | 1 | 1.7127 |
| 19 | 0 | 1 | 0 | 0 | 1 | 0 | 0 | 1 | 0 | 1 | 0 | 1 | 1.3548 |
| 20 | 0 | 1 | 1 | 1 | 0 | 1 | 0 | 0 | 1 | 1 | 0 | 1 | 1.5379 |
| 21 | 1 | 0 | 0 | 1 | 0 | 1 | 0 | 0 | 0 | 1 | 0 | 1 | 1.4976 |
| 22 | 1 | 0 | 0 | 0 | 1 | 0 | 0 | 0 | 0 | 1 | 1 | 1 | 1.1643 |
| 23 | 1 | 0 | 1 | 0 | 0 | 0 | 0 | 1 | 1 | 0 | 1 | 1 | 0.7859 |
| 24 | 0 | 1 | 0 | 0 | 1 | 0 | 0 | 0 | 1 | 0 | 1 | 1 | 1.0184 |
| 25 | 0 | 0 | 1 | 1 | 1 | 1 | 0 | 1 | 0 | 0 | 0 | 1 | 0.7693 |
| 26 | 0 | 1 | 1 | 0 | 1 | 0 | 0 | 0 | 1 | 0 | 0 | 1 | 0.9253 |
| 27 | 0 | 1 | 0 | 0 | 1 | 1 | 0 | 1 | 1 | 0 | 0 | 1 | 1.2242 |
| 28 | 1 | 1 | 0 | 1 | 0 | 1 | 1 | 0 | 0 | 0 | 1 | 1 | 1.1816 |
| 29 | 0 | 1 | 0 | 1 | 0 | 0 | 1 | 0 | 1 | 0 | 0 | 1 | 0.8722 |

For the case of length-12 CGS the sequence is generated as follows:

$$r_u(n) = \frac{e^{j\pi(n \bmod 2)/2}}{\sqrt{2}}[(1-2b(n)) + j(1-2b(n))]; n = 0, 2, \ldots, 17.$$

The binary sequence b(0), b(1), ..., b(17) is chosen from the u-th row of the following Table 18.

TABLE 18

Length 18 CGS Sequence

| μ | Binary Sequence | | | | | | | | | | | | | | | | | | PAPR |
|---|---|---|---|---|---|---|---|---|---|---|---|---|---|---|---|---|---|---|---|
| 0 | 0 | 0 | 1 | 1 | 0 | 1 | 0 | 1 | 1 | 0 | 0 | 1 | 1 | 1 | 1 | 1 | 1 | 1 | 1.2077 |
| 1 | 1 | 1 | 1 | 1 | 0 | 1 | 0 | 1 | 1 | 1 | 1 | 1 | 0 | 0 | 1 | 0 | 0 | 1 | 1.3961 |
| 2 | 0 | 1 | 1 | 0 | 0 | 0 | 0 | 0 | 0 | 1 | 1 | 0 | 1 | 0 | 0 | 0 | 0 | 1 | 1.1624 |
| 3 | 0 | 0 | 1 | 1 | 1 | 1 | 0 | 1 | 0 | 1 | 1 | 1 | 1 | 1 | 0 | 0 | 0 | 1 | 1.3868 |
| 4 | 1 | 0 | 0 | 1 | 0 | 0 | 0 | 1 | 0 | 0 | 1 | 1 | 1 | 0 | 1 | 1 | 1 | 1 | 1.1052 |
| 5 | 1 | 0 | 1 | 1 | 1 | 1 | 0 | 0 | 1 | 0 | 0 | 0 | 1 | 0 | 0 | 1 | 1 | 1 | 1.0921 |
| 6 | 0 | 1 | 0 | 1 | 0 | 1 | 1 | 0 | 0 | 1 | 1 | 1 | 1 | 0 | 0 | 1 | 1 | 1 | 1.2656 |
| 7 | 1 | 1 | 0 | 0 | 0 | 0 | 1 | 1 | 1 | 1 | 0 | 1 | 1 | 1 | 0 | 1 | 1 | 1 | 1.1667 |
| 8 | 0 | 1 | 0 | 0 | 0 | 1 | 1 | 1 | 0 | 0 | 0 | 1 | 0 | 0 | 1 | 0 | 1 | 1 | 1.0282 |
| 9 | 1 | 0 | 1 | 1 | 1 | 0 | 1 | 0 | 0 | 1 | 0 | 1 | 0 | 0 | 1 | 0 | 1 | 1 | 1.1750 |
| 10 | 1 | 1 | 0 | 0 | 0 | 0 | 0 | 1 | 1 | 1 | 0 | 1 | 1 | 0 | 1 | 1 | 0 | 1 | 1.0633 |
| 11 | 0 | 0 | 0 | 0 | 0 | 0 | 1 | 1 | 1 | 0 | 1 | 1 | 1 | 0 | 0 | 0 | 0 | 1 | 1.4126 |
| 12 | 1 | 0 | 1 | 1 | 1 | 0 | 0 | 0 | 0 | 0 | 1 | 0 | 0 | 0 | 0 | 0 | 1 | 1 | 1.4009 |
| 13 | 0 | 0 | 0 | 0 | 1 | 1 | 1 | 0 | 1 | 0 | 1 | 0 | 1 | 0 | 0 | 1 | 1 | 1 | 0.9790 |
| 14 | 0 | 1 | 1 | 0 | 1 | 0 | 1 | 1 | 0 | 1 | 1 | 1 | 0 | 1 | 1 | 0 | 1 | 1 | 1.3298 |
| 15 | 1 | 0 | 0 | 0 | 0 | 0 | 0 | 0 | 0 | 1 | 0 | 0 | 1 | 0 | 1 | 1 | 0 | 1 | 0.9914 |
| 16 | 0 | 0 | 1 | 1 | 0 | 1 | 1 | 0 | 0 | 0 | 0 | 0 | 1 | 1 | 0 | 0 | 0 | 1 | 1.2623 |
| 17 | 1 | 0 | 0 | 0 | 0 | 1 | 1 | 1 | 0 | 0 | 1 | 0 | 1 | 0 | 1 | 0 | 1 | 1 | 1.1325 |
| 18 | 1 | 1 | 0 | 1 | 0 | 1 | 0 | 1 | 0 | 0 | 1 | 1 | 0 | 0 | 0 | 0 | 0 | 1 | 1.1555 |
| 19 | 1 | 1 | 0 | 0 | 0 | 1 | 1 | 1 | 0 | 0 | 0 | 1 | 0 | 1 | 0 | 1 | 0 | 1 | 0.9805 |
| 20 | 0 | 1 | 1 | 1 | 0 | 0 | 0 | 1 | 1 | 0 | 0 | 0 | 0 | 0 | 1 | 1 | 1 | 1 | 1.0320 |
| 21 | 1 | 1 | 0 | 0 | 0 | 1 | 1 | 1 | 0 | 0 | 0 | 1 | 0 | 0 | 0 | 1 | 1 | 1 | 1.0175 |
| 22 | 0 | 0 | 1 | 0 | 1 | 0 | 0 | 1 | 0 | 1 | 0 | 0 | 1 | 0 | 0 | 0 | 0 | 1 | 1.3302 |
| 23 | 0 | 0 | 0 | 1 | 1 | 1 | 0 | 1 | 0 | 1 | 0 | 1 | 1 | 0 | 0 | 0 | 1 | 1 | 1.2787 |
| 24 | 1 | 0 | 1 | 1 | 1 | 0 | 0 | 0 | 0 | 1 | 1 | 1 | 0 | 1 | 1 | 1 | 1 | 1 | 1.2810 |
| 25 | 1 | 0 | 0 | 1 | 0 | 0 | 1 | 0 | 0 | 0 | 0 | 0 | 0 | 1 | 1 | 0 | 0 | 1 | 1.0088 |
| 26 | 0 | 1 | 0 | 0 | 1 | 1 | 1 | 0 | 0 | 1 | 0 | 1 | 0 | 0 | 0 | 0 | 0 | 1 | 1.3865 |
| 27 | 1 | 1 | 1 | 1 | 0 | 0 | 0 | 0 | 1 | 0 | 0 | 0 | 1 | 0 | 0 | 0 | 0 | 1 | 1.1766 |
| 28 | 0 | 1 | 1 | 1 | 1 | 1 | 1 | 0 | 1 | 1 | 0 | 1 | 0 | 1 | 1 | 0 | 0 | 1 | 1.1473 |
| 29 | 0 | 1 | 1 | 1 | 0 | 1 | 0 | 0 | 0 | 1 | 1 | 1 | 0 | 1 | 0 | 1 | 1 | 1 | 1.4049 |

For the case of length-12 CGS the sequence is generated as follows:

$$r_u(n) = \frac{e^{j\pi(n \bmod 2)/2}}{\sqrt{2}}[(1-2b(n)) + j(1-2b(n))]; n = 0, 2, \ldots, 23.$$

The binary sequence b(0), b(1), ..., b(23) is chosen from the u-th row of the following Table 19.

TABLE 19

Length 24 CGS Sequence

| u | Binary Sequence | PAPR |
|---|---|---|
| 0  | 1 0 0 0 1 1 0 0 0 0 0 1 0 0 0 0 1 1 1 1 1 0 1 0 | 1.4909 |
| 1  | 0 0 0 0 0 0 0 1 1 0 0 1 0 1 1 0 0 1 0 1 1 1 | 1.4587 |
| 2  | 0 1 1 0 1 0 1 1 1 0 0 1 0 1 0 0 0 0 1 0 0 0 0 | 1.1937 |
| 3  | 1 0 1 0 0 1 0 0 0 0 0 1 1 1 0 0 1 0 0 0 1 0 | 1.1799 |
| 4  | 1 0 1 0 0 0 1 0 0 1 1 1 0 0 0 0 0 1 0 0 0 1 0 | 1.3746 |
| 5  | 0 1 0 0 0 0 1 1 0 0 1 1 0 1 1 0 1 0 1 0 1 0 | 1.1224 |
| 6  | 0 0 1 0 0 1 1 1 0 1 1 1 1 0 1 1 1 1 0 0 0 1 | 1.3722 |
| 7  | 1 0 0 1 1 1 0 0 1 1 0 1 0 0 0 0 1 1 1 1 1 | 1.0961 |
| 8  | 1 0 0 1 1 0 1 0 0 0 0 1 1 1 1 1 1 1 0 0 | 1.4980 |
| 9  | 1 0 0 1 0 1 0 1 0 1 1 0 1 0 1 1 1 0 0 1 1 | 1.1375 |
| 10 | 1 0 1 1 1 1 0 0 0 1 0 1 0 0 0 0 1 1 1 0 1 | 1.3727 |
| 11 | 1 1 0 0 1 0 0 0 1 0 1 1 1 0 1 0 0 1 0 0 0 0 | 1.1776 |
| 12 | 0 0 0 0 0 1 0 0 1 0 1 1 1 0 1 0 0 0 1 0 0 1 | 1.3944 |
| 13 | 1 0 1 1 1 1 0 1 1 1 0 0 1 0 0 1 0 1 0 0 0 1 | 1.1907 |
| 14 | 1 0 0 0 0 0 1 0 1 0 1 1 0 0 1 0 0 1 0 0 0 1 | 1.2134 |
| 15 | 1 1 1 1 0 1 0 1 1 0 1 0 0 1 0 0 0 1 1 1 0 0 | 1.2319 |
| 16 | 0 1 0 0 1 1 1 1 1 0 0 1 0 0 0 1 1 0 0 0 0 | 1.3037 |
| 17 | 0 1 1 1 0 0 0 1 0 1 0 0 1 0 1 1 1 0 0 1 0 0 | 1.0199 |
| 18 | 0 0 0 0 1 1 0 1 1 1 1 0 0 1 0 0 0 0 0 0 0 1 | 1.3892 |
| 19 | 0 1 1 0 0 0 1 0 1 0 0 1 0 1 1 1 0 0 0 1 0 1 | 1.0166 |
| 20 | 0 0 0 1 0 0 1 0 0 1 1 0 1 0 1 0 0 0 0 0 1 1 | 0.8786 |
| 21 | 1 1 1 0 1 1 0 0 0 1 0 0 0 1 0 0 1 0 0 0 0 | 1.2069 |
| 22 | 0 0 0 1 1 1 1 1 1 1 0 1 1 0 0 0 0 1 0 0 1 1 | 1.3668 |
| 23 | 0 1 0 1 0 1 1 1 1 1 0 0 0 0 1 0 0 1 0 0 0 1 | 1.6128 |
| 24 | 1 0 0 0 1 0 1 1 1 0 1 1 0 0 0 1 0 1 1 0 1 0 | 1.2057 |
| 25 | 1 1 0 0 1 0 1 0 0 0 0 1 1 0 0 0 1 0 0 0 1 1 | 1.2954 |
| 26 | 0 0 0 0 1 0 0 1 1 1 1 1 0 0 1 1 1 1 1 1 0 | 0.9364 |
| 27 | 0 0 1 0 0 0 0 0 0 0 1 1 1 0 0 0 0 1 1 0 1 1 | 0.9265 |
| 28 | 1 0 0 0 1 0 0 0 1 0 0 1 0 0 1 0 1 0 0 1 1 | 1.4271 |
| 29 | 0 1 1 0 0 1 0 1 1 1 0 0 1 0 0 0 0 1 1 0 0 1 | 1.3067 |

Figure 9:
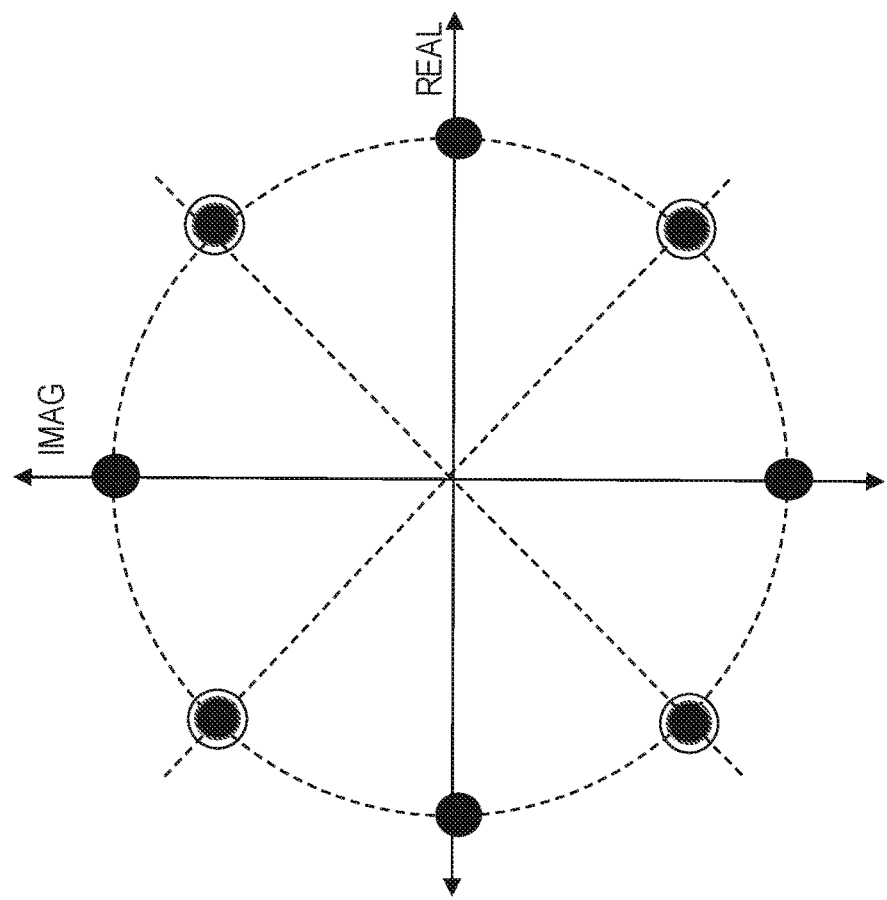
FIG. 9 illustrates example QPSK constellations, in accordance with some aspects.

FIG. 9 illustrates example QPSK constellations 900, in accordance with some aspects. In another embodiment, CGS sequences of length 6 for the case of 1 PRB allocation do not use binary sequences with π/2 BPSK modulation. Instead, sequences are generated using a π/4-QPSK constellation as shown in FIG. 9. The sequences are directly DFT-spread and mapped to REs using DMRS type 1 mapping.

In some aspects, for π/4-QPSK, two QPSK constellations are used wherein one constellation uses the real/imaginary axis (as shown by the black circles) while the other constellation is rotated in phase by π/4 on the unit circle (as shown by the blue circles). For such sequences, one sample uses the black dot constellation while the following sample uses the dot-circle constellation as seen in FIG. 9. Note that these sequences are a subset of the possible sequences that can be generated using an 8-PSK constellation.

In some aspects, for length 6 CGS a set K=30 π/4-QPSK modulated sequences are given by $$r_u(n) = e^{\frac{j\pi\phi(n)}{4}};$$

n=0, . . . , 5 and example CGS sequences are illustrated in Table 20 below.

TABLE 20

| Length 6 π/4-QPSK CGS Sequence | | | | | | | |
|---|---|---|---|---|---|---|---|
| u | φ(0), . . . , φ(5) | | | | | | PAPR |
| 0 | 2 | 1 | 2 | 7 | 4 | 7 | 2.0254 |
| 1 | 6 | 5 | 2 | 5 | 2 | 5 | 2.0666 |
| 2 | 2 | 5 | 2 | 1 | 2 | 5 | 2.0323 |
| 3 | 2 | 5 | 6 | 5 | 8 | 5 | 2.0489 |
| 4 | 8 | 1 | 6 | 1 | 4 | 1 | 2.0252 |
| 5 | 6 | 3 | 4 | 3 | 8 | 3 | 1.9743 |
| 6 | 2 | 7 | 4 | 5 | 4 | 7 | 1.9548 |
| 7 | 2 | 3 | 6 | 3 | 8 | 3 | 2.0020 |
| 8 | 2 | 3 | 2 | 5 | 8 | 5 | 1.9339 |
| 9 | 2 | 5 | 8 | 7 | 8 | 5 | 2.0406 |
| 10 | 2 | 1 | 2 | 5 | 2 | 5 | 2.0091 |
| 11 | 4 | 1 | 8 | 1 | 6 | 1 | 1.9352 |
| 12 | 4 | 1 | 4 | 3 | 4 | 7 | 2.0183 |
| 13 | 4 | 3 | 6 | 3 | 8 | 3 | 2.0523 |
| 14 | 2 | 5 | 6 | 5 | 2 | 5 | 2.0091 |
| 15 | 2 | 1 | 6 | 1 | 4 | 1 | 2.0522 |
| 16 | 2 | 5 | 2 | 3 | 2 | 7 | 1.9941 |
| 17 | 4 | 7 | 4 | 3 | 4 | 1 | 2.0259 |
| 18 | 2 | 3 | 2 | 7 | 2 | 7 | 2.0951 |
| 19 | 2 | 3 | 2 | 5 | 2 | 7 | 2.0101 |
| 20 | 2 | 3 | 8 | 5 | 8 | 3 | 1.9771 |
| 21 | 2 | 7 | 8 | 7 | 2 | 5 | 2.0197 |
| 22 | 4 | 7 | 6 | 7 | 4 | 1 | 1.9286 |
| 23 | 2 | 1 | 1 | 5 | 2 | 7 | 2.0453 |
| 24 | 4 | 1 | 8 | 1 | 4 | 1 | 2.0938 |
| 25 | 2 | 1 | 4 | 7 | 4 | 1 | 2.0619 |
| 26 | 8 | 7 | 8 | 5 | 8 | 3 | 1.9678 |
| 27 | 2 | 3 | 1 | 7 | 2 | 5 | 1.9286 |
| 28 | 2 | 7 | 2 | 3 | 2 | 5 | 1.9743 |
| 29 | 2 | 5 | 4 | 5 | 8 | 5 | 2.0132 |

In another embodiment, length 6 CGS sequences for 1 PRB allocation are generated from a 16-PSK constellation in the time domain, DFT-Spread and mapped to the frequency domain resources using Type 1 DMRS mapping. For length 6 CGS a set K=30 16-PSK modulated sequences are given by $r_u(n)=e^{j\pi\phi(n)/8}$; n=0, . . . , 5 and are illustrated in Table 21 below.

TABLE 21

| Length 6 π/4-QPSK CGS Sequence | | | | | | | |
|---|---|---|---|---|---|---|---|
| u | φ(0), . . . , φ(5) | | | | | | PAPR |
| 0 | -7 | -5 | 0 | -4 | 6 | 4 | 1.8951 |
| 1 | -3 | -6 | -4 | 6 | -5 | 0 | 2.0825 |
| 2 | -5 | 8 | -4 | 8 | 3 | 8 | 1.8676 |
| 3 | 6 | 3 | -1 | 3 | 8 | -5 | 2.0852 |
| 4 | -5 | -1 | -5 | 7 | -5 | 7 | 1.5968 |
| 5 | -1 | 3 | 0 | 3 | 8 | 3 | 1.8918 |
| 6 | -4 | 7 | -1 | -4 | 0 | 1.8669 | |
| 7 | -4 | -6 | 4 | 0 | 5 | 7 | 1.9003 |
| 8 | -4 | -2 | -5 | 8 | -3 | 2 | 2.0718 |
| 9 | -5 | -3 | 2 | 7 | 3 | 0 | 2.0702 |
| 10 | -7 | -5 | 7 | 4 | -1 | 4 | 2.0298 |
| 11 | -5 | 8 | 3 | 7 | 3 | 6 | 2.0669 |
| 12 | -5 | 6 | -6 | -3 | 2 | 0 | 1.6891 |
| 13 | -6 | -2 | -6 | -3 | -6 | 5 | 1.8601 |
| 14 | -4 | 0 | 5 | 2 | -2 | 1 | 2.0765 |
| 15 | -7 | 3 | 1 | 5 | 7 | -3 | 2.0649 |
| 16 | 2 | 7 | -7 | 4 | 1 | -3 | 1.9266 |
| 17 | -4 | 1 | -4 | 7 | 5 | -7 | 1.9650 |
| 18 | 6 | -6 | 5 | 2 | 7 | -6 | 2.0568 |
| 19 | -6 | -1 | 2 | 6 | 1 | -4 | 1.5005 |
| 20 | -7 | 5 | 2 | -3 | -1 | 4 | 1.8325 |
| 21 | -1 | -4 | 1 | 5 | 0 | 3 | 2.0819 |
| 27 | 1 | 4 | -7 | 4 | 0 | 4 | 1.8755 |
| 23 | -2 | 1 | 6 | -6 | -1 | -6 | 1.4192 |
| 24 | 7 | 3 | 6 | -5 | 8 | 3 | 2.0311 |
| 25 | 4 | -2 | 0 | -3 | -6 | -1 | 2.0793 |
| 26 | 7 | 3 | 5 | -6 | -1 | -6 | 2.0089 |
| 27 | -6 | 7 | 4 | 6 | 0 | 5 | 2.0924 |
| 28 | -7 | 4 | -1 | -3 | 1 | 4 | 2.0188 |
| 29 | -7 | -2 | 2 | -2 | 1 | -2 | 2.0815 |

In another embodiment of this invention, length 6 CGS sequences for 1 PRB allocation are generated from an 8-PSK constellation in the time domain, DFT-Spread and mapped to the frequency domain resources using Type 1 DMRS mapping. For length 6 CGS a set K=30 8-PSK modulated sequences are given by $r_u(n)=e^{j\pi\phi(n)/8}$; n=0, . . . , 5 and are illustrated in Table 22 below.

TABLE 22

| Length 6 8-PSK CGS Sequence | | | | | | | |
|---|---|---|---|---|---|---|---|
| u | φ(0), . . . , φ(5) | | | | | | PAPR |
| 0 | -7 | -3 | -7 | -3 | -7 | 5 | 1.5695 |
| 1 | -7 | 3 | -1 | 3 | 5 | -5 | 2.0805 |
| 2 | -7 | 5 | 1 | 5 | 1 | 5 | 1.4753 |
| 3 | -3 | 1 | 5 | 1 | -3 | -7 | 0.7709 |
| 4 | 5 | -7 | -3 | -7 | 5 | -7 | 1.4457 |
| 5 | -3 | 1 | -3 | -7 | -3 | 1 | 1.4589 |
| 6 | -7 | 5 | -7 | -3 | -7 | -3 | 1.4450 |
| 7 | -7 | -3 | -5 | 5 | 1 | 7 | 2.0919 |
| 8 | 5 | -7 | 5 | -7 | -3 | -7 | 1.5782 |
| 9 | -5 | 1 | 3 | 7 | 3 | -3 | 2.0990 |
| 10 | 3 | -1 | -5 | 7 | -5 | -1 | 0.7552 |
| 11 | -7 | 5 | -7 | -3 | 1 | -3 | 0.7836 |
| 12 | -7 | -3 | -7 | 5 | -7 | 5 | 1.5969 |
| 13 | -5 | 7 | -5 | 7 | 3 | 7 | 1.5200 |
| 14 | -5 | -1 | 1 | 7 | 5 | -1 | 2.0814 |
| 15 | -5 | 7 | 3 | 7 | -5 | -1 | 0.7733 |
| 16 | -5 | -1 | -5 | 7 | 3 | 7 | 0.7900 |
| 17 | -5 | 7 | 3 | 7 | -5 | 7 | 1.5951 |
| 18 | -7 | -3 | 1 | 5 | 1 | -3 | 0.8306 |
| 19 | -1 | -5 | -1 | 3 | -1 | -5 | 1.6034 |
| 20 | -5 | 5 | 7 | 5 | -7 | -1 | 1.8559 |
| 21 | 5 | 3 | 7 | -3 | -7 | 3 | 1.9329 |
| 22 | -7 | -5 | 5 | 1 | 7 | -5 | 1.9491 |
| 23 | -1 | 3 | 1 | 3 | -3 | -7 | 1.9255 |
| 24 | -7 | 5 | -1 | 1 | -1 | 3 | 1.9322 |
| 25 | -5 | -7 | -5 | 5 | 1 | 7 | 1.8663 |
| 26 | -1 | 1 | -1 | 3 | -7 | 5 | 1.9325 |
| 27 | -3 | -1 | 3 | -7 | 5 | -1 | 1.8048 |
| 28 | -5 | -7 | -5 | 7 | -5 | 1 | 2.3399 |
| 29 | -5 | 7 | -5 | -7 | -5 | 1 | 2.3900 |

In another embodiment of this invention, length 6 CGS sequences for 1 PRB allocation are generated from an 8-PSK constellation in the time domain, DFT-Spread and mapped to the frequency domain resources using Type 1 DMRS mapping. In this case, the chosen sequences provide low PAPR for both comb 0 and comb 1 i.e., when mapped to even or odd subcarriers.

For length 6 CGS a set K=30 8-PSK modulated sequences with Rel-15 Type mapping and good PAPR for both port 0 (comb 0) and port 2 (comb 1) are given by $r_u(n)=e^{j\pi\phi(n)/8}$; n=0, . . . , 5 and are illustrated in Table 22-a below.

TABLE 22-a

Length 6 8-PSK CGS Sequence with Rel-15 Type 1 Mapping

| u | \$\phi(0), \ldots, \phi(5)\$ | | | | | | Port 0 PAPR | Port 2 PAPR |
|---|---|---|---|---|---|---|---|---|
| 0 | −7 | −3 | −7 | 5 | −7 | −3 | 1.4589 | 2.1346 |
| 1 | 1 | −3 | 1 | −3 | 1 | 5 | 1.5028 | 2.1785 |
| 2 | −7 | −3 | 1 | −3 | −7 | −3 | 1.4457 | 2.1837 |
| 3 | −7 | 5 | −7 | −3 | −7 | −3 | 1.4450 | 2.1834 |
| 4 | −1 | −5 | −5 | 7 | −5 | −5 | 1.5200 | 2.1681 |
| 5 | −7 | 5 | 1 | 5 | 1 | 5 | 1.4753 | 2.1234 |
| 6 | −7 | −5 | −1 | −5 | −5 | 5 | 1.6514 | 1.5596 |
| 7 | 7 | 5 | −1 | −7 | −3 | 1 | 1.6764 | 1.7570 |
| 8 | −7 | −3 | 7 | −5 | 5 | −7 | 1.4270 | 1.4449 |
| 9 | −3 | 1 | 1 | 5 | −1 | −7 | 1.9579 | 1.3811 |
| 10 | 5 | 5 | −1 | −3 | 7 | −5 | 1.9816 | 1.9955 |
| 11 | 3 | 7 | 5 | 3 | 7 | −1 | 1.8483 | 1.9080 |
| 12 | −5 | −1 | 3 | −7 | 3 | −3 | 1.9564 | 1.6194 |
| 13 | −7 | 5 | −7 | 7 | −5 | 5 | 1.7588 | 1.9896 |
| 14 | 7 | 5 | −7 | −3 | 5 | −7 | 1.9019 | 1.9854 |
| 15 | −3 | 1 | −5 | −1 | −1 | −7 | 1.5303 | 1.6013 |
| 16 | 5 | −7 | 3 | 7 | −5 | −5 | 1.5113 | 1.4347 |
| 17 | 3 | −3 | 1 | 5 | −1 | −1 | 1.8116 | 1.8093 |
| 18 | −5 | 1 | −5 | 7 | 3 | −7 | 1.8275 | 1.9739 |
| 19 | −5 | 1 | −1 | 3 | 7 | 1 | 1.8065 | 1.8770 |
| 20 | 3 | −7 | −3 | 1 | −1 | −7 | 1.9287 | 1.6017 |
| 21 | −3 | 7 | 7 | 1 | 5 | −7 | 1.7455 | 1.4907 |
| 22 | −7 | −7 | 3 | 7 | −5 | 5 | 1.5271 | 1.5922 |
| 23 | −5 | 3 | 7 | 5 | 3 | 7 | 1.9311 | 1.9666 |
| 24 | −7 | 3 | −7 | −5 | 1 | −5 | 1.8142 | 1.8725 |
| 25 | −3 | 7 | 7 | −5 | −1 | −7 | 1.1953 | 1.1791 |
| 26 | −5 | 5 | 3 | −7 | −5 | 1 | 1.7946 | 1.8689 |
| 27 | −7 | 5 | −5 | −1 | −3 | 1 | 1.5822 | 1.7728 |
| 28 | −3 | 1 | 7 | 3 | −5 | −1 | 1.6074 | 1.8093 |
| 29 | −5 | 1 | −5 | 5 | −7 | −3 | 1.9181 | 1.8474 |

In another embodiment, length 6 CGS sequences for 1 PRB allocation are generated from an 8-PSK constellation in the time domain. The Type 1 comb mapping is implemented using pre-DFT TD-OCC and block repetition. For any given length-6 sequence X, Port 0⇒DFT([X; X]) Port 2⇒DFT ([X;−X]).

For length 6 CGS a set K=30 8-PSK modulated sequences with the TD-OCC based port mapping and good PAPR for both port 0 (comb 0) and port 2 (comb 1) are given by $r_u(n) = e^{j\pi\phi(n)/8}$; n=0, ..., 5 and are illustrated in Table 22-b below.

TABLE 22-b

Length 6 8-PSK CGS Sequence with TD-OCC based port mapping

| u | \$\phi(0), \ldots, \phi(5)\$ | | | | | | Port 0 PAPR | Port 2 PAPR |
|---|---|---|---|---|---|---|---|---|
| 0 | −7 | −7 | 3 | −7 | −1 | −7 | 2.1757 | 1.5436 |
| 1 | −5 | 5 | 1 | 5 | 7 | −3 | 2.0805 | 1.9246 |
| 2 | −3 | −7 | −3 | −7 | 5 | −7 | 1.5200 | 0.7862 |
| 3 | 5 | −7 | 5 | 1 | 5 | 1 | 1.5969 | 0.7450 |
| 4 | −3 | 1 | 3 | −1 | −5 | 7 | 2.1041 | 1.8695 |
| 5 | 1 | 5 | 1 | 5 | −7 | 5 | 1.5782 | 0.7862 |
| 6 | −7 | −1 | −3 | 3 | −1 | 7 | 1.9926 | 1.8172 |
| 7 | −7 | 3 | −3 | −5 | −1 | 7 | 1.8559 | 1.6634 |
| 8 | −3 | 5 | 1 | 5 | −5 | −5 | 1.8615 | 1.6255 |
| 9 | −7 | 3 | 1 | −5 | −5 | 5 | 1.9161 | 1.9752 |
| 10 | 1 | −5 | −1 | −1 | 3 | −3 | 1.4068 | 1.5612 |
| 11 | −7 | 1 | 5 | 3 | −3 | 7 | 1.8465 | 1.7371 |
| 12 | −5 | 1 | 3 | −3 | 7 | −3 | 1.7057 | 0.9758 |
| 13 | −7 | 3 | 7 | −5 | 5 | −7 | 1.5318 | 1.9484 |
| 14 | −7 | 3 | 7 | −5 | −7 | −3 | 1.7727 | 1.5361 |
| 15 | −5 | −1 | −5 | −1 | −5 | −1 | 1.7210 | 0.5211 |
| 16 | −7 | 3 | 5 | −5 | 1 | −5 | 1.9048 | 0.8707 |
| 17 | 3 | 7 | −3 | −5 | −1 | −1 | 1.9169 | 1.9804 |
| 18 | −7 | 3 | 5 | −1 | 5 | 5 | 1.6561 | 1.0730 |
| 19 | 1 | 5 | −3 | −1 | −7 | 3 | 1.8488 | 1.3408 |
| 20 | −7 | −1 | −7 | 3 | 1 | 7 | 1.8292 | 0.9035 |
| 21 | 3 | −3 | −5 | 5 | −5 | −1 | 1.9628 | 1.8735 |
| 22 | −1 | −7 | 7 | −5 | 1 | −5 | 1.8328 | 1.8779 |
| 23 | −7 | 3 | −3 | −1 | 7 | −5 | 1.9681 | 1.4762 |
| 24 | −5 | 1 | −1 | 5 | 7 | −1 | 1.9759 | 1.9037 |
| 25 | −1 | −7 | −3 | 7 | 7 | 1 | 1.9319 | 1.5857 |
| 26 | −7 | 5 | −5 | 1 | −1 | 7 | 1.9247 | 1.4577 |
| 27 | −5 | 5 | −7 | −1 | −3 | 7 | 1.7086 | 1.3874 |
| 28 | −3 | 7 | 5 | −1 | 3 | −3 | 1.9446 | 1.2862 |
| 29 | −5 | −1 | −3 | −1 | 1 | −5 | 1.9628 | 1.9930 |

In some embodiments, based on the CGS sequences generated using any of the above metrics, additional sequences can be generated using the following operations on the sequence:

(a) Frequency domain cyclic shift of the generated sequence. In one embodiment, the cyclic shift which is multiple of 6 subcarriers may be excluded in the generation procedure to avoid high cross-correlation between partially overlapping resource allocation in the frequency domain.

(b) Time-domain cyclic shifts of the pi/2 BPSK-modulated sequence, i.e. d'(j)=d(mod(j+offset, n)). In one embodiment, the cyclic shift defined by parameter offset which has a value lower the pre-determined threshold 'y' and larger than pre-determined threshold 'n-y' may not be considered to accommodate propagation delay difference between different UEs in different cells. In one example, the threshold 'y' can be selected according to the CP duration of the DFT-s-OFDM signal.

(c) Repetition of the generated sequence in time/frequency.

Complementary Sequences

In another embodiment, for the case of two-symbol DMRS, i.e., DMRS occupying two adjacent symbols or DMRS configuration with two or more symbols, complementary sequences (e.g., a, b, etc.) can be used. The complimentary DMRS signal can be defined to have a sum of auto-correlation function close to the delta function. For example, for two sequences da and db, the sum of auto-correlation function can be defined as follows: $R(j) = R_{d_a}(j) + R_{d_b}(j)$.

In one example, the following condition may be fulfilled, where x is pre-determined threshold:

$$\frac{R(j)}{R(0)} < x, \; j \neq 0.$$

In another example, x=0.

Figure 10:
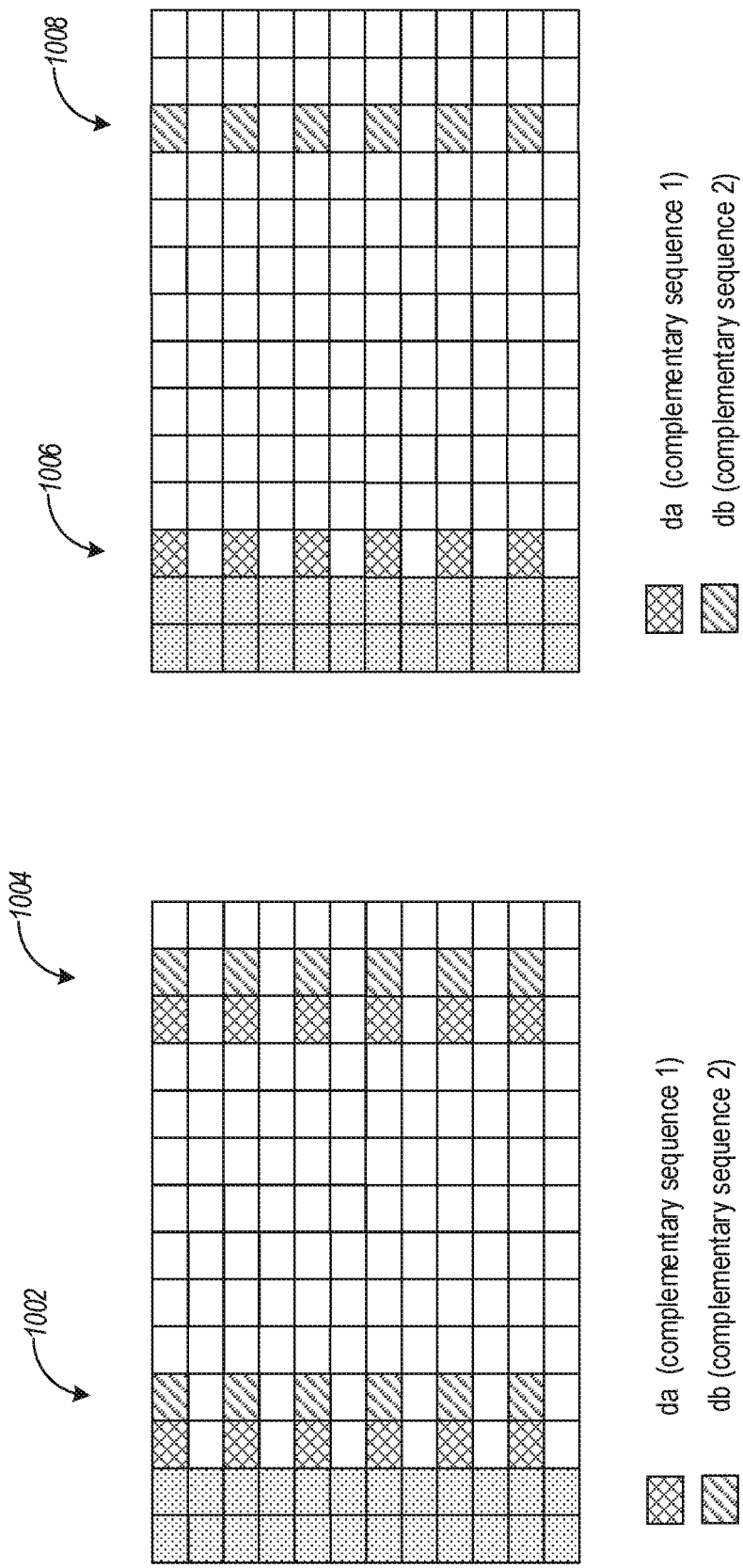
FIG. 10 illustrates example DMRS using complementary sequences, in accordance with some aspects.

The example of the sequence da and db assignment is shown in FIG. 10.

FIG. 10 illustrates example DMRS 1002, 1004, 1006, and 1008 using complementary sequences, in accordance with some aspects.

In another embodiment, complementary sequences can be chosen such that the combined autocorrelation of the two sequences have almost-perfect autocorrelation as defined before. Examples of such complementary sequences are shown in the following Tables 23-31. For length 6 CGS with π/4 QPSK modulation, the sequences are given by $$r_u(n) = e^{\frac{j\pi\phi(n)}{4}};$$

n=0, ..., 5 illustrated in Table 23 below.

TABLE 23

Length 6 π/4-QPSK complementary CGS Sequences

| u | CGS: $\phi(0), \ldots, \phi(5)$ | | | | | | Complementary CGS: $\phi(0), \ldots, \phi(5)$ | | | | | |
|---|---|---|---|---|---|---|---|---|---|---|---|---|
| 0 | 2 | 1 | 2 | 7 | 4 | 7 | 2 | 1 | 2 | 5 | 6 | 5 |
| 1 | 6 | 5 | 2 | 5 | 2 | 5 | 2 | 1 | 4 | 5 | 6 | 3 |
| 2 | 2 | 5 | 2 | 1 | 2 | 5 | 2 | 1 | 6 | 5 | 6 | 1 |
| 3 | 2 | 5 | 6 | 5 | 8 | 5 | 2 | 1 | 2 | 5 | 6 | 3 |
| 4 | 8 | 1 | 6 | 1 | 4 | 1 | 2 | 1 | 2 | 3 | 6 | 5 |
| 5 | 6 | 3 | 4 | 3 | 8 | 3 | 2 | 1 | 4 | 5 | 6 | 5 |
| 6 | 2 | 7 | 4 | 5 | 4 | 7 | 2 | 1 | 6 | 7 | 8 | 3 |
| 7 | 2 | 3 | 6 | 3 | 8 | 3 | 2 | 1 | 6 | 7 | 2 | 3 |
| 8 | 2 | 3 | 2 | 5 | 8 | 5 | 2 | 1 | 8 | 3 | 4 | 5 |
| 9 | 2 | 5 | 8 | 7 | 8 | 5 | 2 | 1 | 8 | 5 | 6 | 7 |
| 10 | 2 | 1 | 2 | 5 | 2 | 5 | 2 | 3 | 2 | 7 | 6 | 7 |
| 11 | 4 | 1 | 8 | 1 | 6 | 1 | 2 | 1 | 6 | 5 | 6 | 7 |
| 12 | 4 | 1 | 4 | 3 | 4 | 7 | 2 | 1 | 8 | 1 | 4 | 5 |
| 13 | 4 | 3 | 6 | 3 | 8 | 3 | 2 | 1 | 8 | 5 | 6 | 1 |
| 14 | 2 | 5 | 6 | 5 | 2 | 5 | 2 | 3 | 4 | 1 | 8 | 7 |
| 15 | 2 | 1 | 6 | 1 | 4 | 1 | 2 | 1 | 6 | 5 | 8 | 1 |
| 16 | 2 | 5 | 2 | 3 | 2 | 7 | 2 | 3 | 2 | 7 | 6 | 1 |
| 17 | 4 | 7 | 4 | 3 | 4 | 1 | 2 | 3 | 4 | 3 | 8 | 7 |
| 18 | 2 | 3 | 2 | 7 | 2 | 7 | 2 | 3 | 4 | 7 | 6 | 5 |
| 19 | 2 | 3 | 2 | 5 | 2 | 7 | 2 | 3 | 2 | 1 | 6 | 7 |
| 20 | 2 | 3 | 8 | 5 | 8 | 3 | 2 | 3 | 6 | 5 | 4 | 1 |
| 21 | 2 | 7 | 8 | 7 | 2 | 5 | 2 | 3 | 6 | 7 | 6 | 3 |
| 22 | 4 | 7 | 6 | 7 | 4 | 1 | 2 | 3 | 8 | 7 | 6 | 1 |
| 23 | 2 | 1 | 2 | 5 | 2 | 7 | 2 | 3 | 6 | 7 | 4 | 3 |
| 24 | 4 | 1 | 8 | 1 | 4 | 1 | 2 | 5 | 4 | 3 | 8 | 1 |
| 25 | 2 | 1 | 4 | 7 | 4 | 1 | 2 | 5 | 6 | 5 | 2 | 1 |
| 26 | 8 | 7 | 8 | 5 | 8 | 3 | 2 | 3 | 4 | 7 | 6 | 3 |
| 27 | 2 | 3 | 2 | 7 | 2 | 5 | 2 | 3 | 6 | 5 | 2 | 1 |
| 28 | 2 | 7 | 2 | 3 | 2 | 5 | 2 | 3 | 6 | 7 | 6 | 5 |
| 29 | 2 | 5 | 4 | 5 | 8 | 5 | 2 | 3 | 8 | 7 | 6 | 7 |

For length 6 CGS with 16-PSK modulation, the sequences are given by $r_u(n)=e^{j\pi\phi(n)/8}$; n=0, ..., 5 illustrated in Table 24 below.

TABLE 24

Length 6 16-PSK complementary CGS Sequences

| u | CGS: $\phi(0), \ldots, \phi(5)$ | | | | | | Complementary CGS: $\phi(0), \ldots, \phi(5)$ | | | | | |
|---|---|---|---|---|---|---|---|---|---|---|---|---|
| 0 | -7 | -5 | 0 | -4 | 6 | 4 | -7 | -5 | 8 | 5 | -6 | -1 |
| 1 | -3 | -6 | -4 | 6 | -5 | 0 | -7 | -5 | -2 | -3 | 6 | 1 |
| 2 | -5 | 8 | -4 | 8 | 3 | 8 | -7 | -4 | 0 | 5 | 1 | -2 |
| 3 | 6 | 3 | -1 | 3 | 8 | -5 | -7 | -4 | -7 | -3 | -7 | 4 |
| 4 | -5 | -1 | -5 | 7 | -5 | 7 | -7 | -3 | -7 | 5 | 1 | 5 |
| 5 | -1 | 3 | 0 | 3 | 8 | 3 | -7 | -4 | 1 | 5 | 2 | -2 |
| 6 | -4 | 7 | -4 | -1 | -4 | 0 | -7 | -4 | 7 | 3 | 0 | 4 |
| 7 | -4 | -6 | 4 | 0 | 5 | 7 | -7 | -2 | -5 | 8 | -6 | 4 |
| 8 | -4 | -2 | -5 | 8 | -3 | 2 | -7 | 8 | -5 | -3 | 5 | 0 |
| 9 | -5 | -3 | 2 | 7 | 3 | 0 | -7 | -4 | 1 | -4 | 8 | -4 |
| 10 | -7 | -5 | 7 | 4 | -1 | 4 | -7 | -4 | -6 | -2 | -6 | 4 |
| 11 | -5 | 8 | 3 | 7 | 3 | 6 | -7 | -4 | -7 | 5 | 0 | 5 |
| 12 | -5 | 6 | -6 | -3 | 2 | 0 | -7 | -4 | -7 | 4 | -7 | -3 |

TABLE 24-continued

Length 6 16-PSK complementary CGS Sequences

| u | CGS: $\phi(0), \ldots, \phi(5)$ | | | | | | Complementary CGS: $\phi(0), \ldots, \phi(5)$ | | | | | |
|---|---|---|---|---|---|---|---|---|---|---|---|---|
| 13 | -6 | -2 | -6 | -3 | -6 | 5 | -7 | -4 | 0 | -5 | 7 | 4 |
| 14 | -4 | 0 | 5 | 2 | -2 | 1 | -7 | -4 | 0 | -3 | 8 | 4 |
| 15 | -7 | 3 | 1 | 5 | 7 | -3 | -7 | 3 | 5 | 2 | -1 | 4 |
| 16 | 2 | 7 | -7 | 4 | 1 | -3 | -7 | -3 | -7 | 4 | -7 | -4 |
| 17 | -4 | 1 | -4 | 7 | 5 | -7 | -7 | -4 | 8 | 5 | -6 | -2 |
| 18 | 6 | -6 | 5 | 2 | 7 | -6 | -7 | -4 | 0 | 5 | 0 | -4 |
| 19 | -6 | -1 | 2 | 6 | 1 | -4 | -7 | -4 | 8 | -4 | 1 | -4 |
| 20 | -7 | 5 | 2 | -3 | -1 | 4 | -7 | -3 | -6 | -3 | 2 | -3 |
| 21 | -1 | -4 | 1 | 5 | 0 | 3 | -7 | -4 | 1 | -3 | 8 | 5 |
| 22 | 1 | 4 | -7 | 4 | 0 | 4 | -7 | -4 | 7 | 4 | 0 | 5 |
| 23 | -2 | 1 | 6 | 4 | -1 | -6 | -7 | -3 | -7 | -4 | -7 | 4 |
| 24 | 7 | 3 | 6 | -5 | 8 | 3 | -7 | -3 | 0 | -3 | -7 | 4 |
| 25 | 4 | -2 | 0 | -3 | -6 | -1 | -6 | -7 | -4 | -2 | 6 | 1 |
| 26 | 7 | 3 | 5 | -6 | -1 | -6 | -7 | -4 | 1 | -5 | 7 | -5 |
| 27 | -6 | 7 | 4 | 6 | 0 | 5 | -6 | -4 | -1 | -2 | 7 | 2 |
| 28 | -7 | 4 | -1 | -3 | 1 | 4 | -7 | -3 | 2 | -1 | -5 | -2 |
| 29 | -7 | -2 | 2 | -2 | 1 | -2 | -7 | -4 | 0 | 5 | 2 | -3 |

For length 6 CGS with 8-PSK modulation, the sequences are given by $r_u(n)=e^{j\pi\phi(n)/8}$; n=0, ..., 5 illustrated in Table 25 below.

TABLE 25

Length 6 8-PSK complementary CGS Sequences

| u | CGS: $\phi(0), \ldots, \phi(5)$ | | | | | | Complementary CGS: $\phi(0), \ldots, \phi(5)$ | | | | | |
|---|---|---|---|---|---|---|---|---|---|---|---|---|
| 0 | -7 | -3 | -7 | -3 | -7 | 5 | -7 | -3 | -7 | 5 | 1 | 5 |
| 1 | -7 | 3 | -1 | 3 | 5 | -5 | -7 | -3 | -7 | 7 | -5 | -1 |
| 2 | -7 | 5 | 1 | 5 | 1 | 5 | -7 | -3 | 1 | -3 | -7 | 5 |
| 3 | -3 | 1 | 5 | 1 | -3 | -7 | -7 | -3 | -7 | -3 | -7 | 5 |
| 4 | 5 | -7 | -3 | -7 | 5 | -7 | -7 | -3 | 1 | 5 | 1 | -3 |
| 5 | -3 | 1 | -3 | -7 | -3 | 1 | -7 | 5 | -7 | -3 | 1 | -3 |
| 6 | -7 | 5 | -7 | -3 | -7 | -3 | -7 | 5 | 1 | -3 | 1 | 5 |
| 7 | -7 | -3 | -5 | 5 | 1 | 7 | -7 | -3 | -7 | 7 | -5 | 1 |
| 8 | 5 | -7 | 5 | -7 | -3 | -7 | -7 | 5 | 1 | 5 | -7 | -3 |
| 9 | -5 | 1 | 3 | 7 | 3 | -3 | -7 | -3 | -5 | 7 | -5 | 5 |
| 10 | 3 | -1 | -5 | 7 | -5 | -1 | -7 | -3 | -7 | -3 | 1 | -3 |
| 11 | -7 | 5 | -7 | -3 | 1 | -3 | -7 | -3 | -7 | 5 | -7 | -3 |
| 12 | -7 | -3 | -7 | 5 | -7 | 5 | -5 | -1 | -5 | 7 | 3 | 7 |
| 13 | -5 | 7 | -5 | 7 | 3 | 7 | -5 | -1 | 3 | -1 | -5 | 7 |
| 14 | -5 | -1 | 1 | 7 | 5 | -1 | -7 | -3 | 1 | -5 | -1 | -5 |
| 15 | -5 | 7 | 3 | 7 | -5 | 1 | -7 | -3 | -7 | 5 | -7 | 5 |
| 16 | -5 | -1 | -5 | 7 | 3 | 7 | -7 | -3 | 1 | -3 | -7 | -3 |
| 17 | -5 | 7 | 3 | 7 | -5 | 7 | -5 | -1 | 3 | 7 | 3 | -1 |
| 18 | -7 | -3 | 1 | 5 | 1 | -3 | -7 | -3 | 1 | -3 | 1 | -3 |
| 19 | -1 | -5 | -1 | 3 | -1 | -5 | -5 | 7 | -5 | -1 | 3 | -1 |
| 20 | -5 | 5 | 7 | 5 | -7 | -1 | -7 | -5 | 3 | 1 | 7 | -3 |
| 21 | 5 | 3 | 7 | -3 | -7 | 3 | -7 | -1 | -3 | 5 | 7 | 3 |
| 22 | -7 | -5 | 5 | 1 | 7 | -5 | -7 | -1 | 5 | 1 | 3 | -5 |
| 23 | -1 | 3 | 1 | 3 | -3 | -7 | -7 | 1 | -1 | 5 | -5 | 7 |
| 24 | -7 | 5 | -1 | 1 | -1 | 3 | -7 | 1 | 3 | -1 | 5 | -5 |
| 25 | -5 | -7 | -5 | 5 | 1 | 7 | -7 | 5 | -5 | 1 | -1 | 7 |
| 26 | -1 | 1 | -1 | 3 | -7 | 5 | -7 | 5 | 7 | -1 | -3 | 3 |
| 27 | -3 | -1 | 3 | -7 | 5 | -1 | -7 | -3 | 1 | -1 | -5 | -1 |
| 28 | -5 | -7 | -5 | 7 | -5 | 1 | -7 | -3 | -7 | 3 | 1 | 7 |
| 29 | -5 | 7 | -5 | -7 | -5 | 1 | -5 | 7 | 3 | -1 | 3 | 7 |

For the case of CGS sequences of length 12, 18 and 24, the complementary sequences are given in the following tables for a case of binary CGS using π/2-BPSK modulation.

TABLE 26

Length 12 complementary CGS Sequence

| u | Binary Sequence | Binary Complementary Sequence |
|---|---|---|
| 0 | 0 0 0 1 0 0 1 1 1 1 1 1 | 0 0 1 0 0 1 1 1 1 1 |

TABLE 26-continued

Length 12 complementary CGS Sequence

| u | Binary Sequence | Binary Complementary Sequence |
|---|---|---|
| 1 | 1 1 0 0 0 1 1 0 1 1 0 1 | 0 1 1 1 0 1 1 1 1 1 1 1 |
| 2 | 0 0 1 0 0 1 0 1 0 0 1 0 | 0 0 1 0 0 1 1 1 1 1 1 1 |
| 3 | 1 0 1 0 1 1 1 1 0 0 0 1 | 0 1 1 0 1 1 1 0 1 1 1 1 |
| 4 | 1 0 1 1 0 1 0 1 1 0 1 1 | 1 1 0 0 1 0 1 0 0 1 1 1 |
| 5 | 1 1 1 1 1 1 0 0 1 0 0 1 | 0 0 0 1 0 0 1 0 1 1 1 1 |
| 6 | 0 0 1 0 0 1 1 0 0 0 0 0 | 1 0 1 1 0 1 1 1 0 1 1 1 |
| 7 | 0 0 1 1 1 1 1 1 0 0 1 0 | 1 1 1 1 0 1 1 1 1 1 1 1 |
| 8 | 1 1 1 0 1 1 0 1 0 0 0 1 | 1 0 1 1 1 0 1 1 1 1 1 1 |
| 9 | 0 1 0 0 0 1 1 1 1 0 1 1 | 1 0 1 1 0 1 1 1 1 1 1 1 |
| 10 | 1 1 1 0 0 1 0 1 0 0 0 1 | 1 1 0 0 1 0 1 0 1 1 1 1 |
| 11 | 0 1 1 0 1 1 1 1 0 0 0 0 | 1 1 1 1 1 1 1 0 1 1 1 1 |
| 12 | 1 0 0 1 0 1 0 0 1 1 1 1 | 1 1 1 0 1 1 1 1 0 1 1 1 |
| 13 | 0 0 0 1 1 1 1 1 0 0 0 1 | 0 0 0 1 0 0 1 0 1 1 1 1 |
| 14 | 1 0 1 1 0 1 0 0 0 0 0 0 | 0 0 0 0 0 1 1 1 1 0 1 1 |
| 15 | 0 0 0 0 0 1 1 0 0 1 0 0 | 1 1 0 1 1 0 1 1 1 0 1 1 |
| 16 | 1 0 0 0 1 1 1 1 0 1 0 1 | 0 1 1 0 1 0 1 1 1 0 1 1 |
| 17 | 1 1 1 1 1 1 0 0 1 0 0 0 | 0 1 1 1 0 1 1 0 1 0 1 1 |
| 18 | 0 1 1 1 1 0 1 0 1 1 1 0 | 0 1 1 1 0 0 1 1 1 1 1 1 |
| 19 | 0 1 0 0 1 1 0 0 1 0 1 0 | 1 0 0 1 1 1 1 0 0 1 1 1 |
| 20 | 0 1 1 1 0 1 1 0 0 1 1 0 | 0 1 1 1 0 0 1 1 1 1 1 1 |
| 21 | 1 0 0 1 0 1 1 0 0 1 0 0 | 0 1 1 1 0 1 1 1 1 1 1 1 |
| 22 | 1 0 0 0 1 1 0 0 0 0 1 0 | 1 1 1 0 0 0 1 1 1 1 1 1 |
| 23 | 1 0 1 0 0 1 0 0 0 1 1 0 | 0 0 1 1 0 1 1 1 1 1 1 1 |
| 24 | 0 1 0 0 1 1 0 0 0 1 0 1 | 1 0 1 0 0 1 1 1 1 0 1 1 |
| 25 | 0 0 1 1 1 1 1 1 0 1 0 0 | 0 1 1 0 0 0 1 1 1 1 1 1 |
| 26 | 0 1 1 0 1 1 0 0 0 1 0 0 | 0 1 0 0 1 1 1 1 0 1 1 1 |
| 27 | 0 1 0 0 1 1 1 0 1 1 0 0 | 0 0 1 1 1 1 1 1 1 1 1 1 |
| 28 | 1 1 0 1 0 1 1 1 0 0 0 1 | 1 0 0 0 1 1 1 0 1 1 1 1 |
| 29 | 0 1 0 1 0 0 0 1 0 1 0 0 | 0 0 1 0 0 1 1 1 0 1 1 1 |

TABLE 27

Length 18 complementary CGS Sequence

| u | Binary Sequence |
|---|---|
| 0 | 0 0 1 1 0 1 1 1 1 0 1 1 0 0 1 1 1 1 |
| 1 | 1 1 1 1 0 1 0 0 1 0 1 1 1 1 0 0 0 1 |
| 2 | 1 1 0 0 0 0 0 0 0 0 0 1 1 0 1 0 |
| 3 | 0 0 1 1 1 1 1 0 0 1 0 1 1 1 1 |

TABLE 27-continued

Length 18 complementary CGS Sequence

| | | | | | | | | | | | | | | | | | | |
|---|---|---|---|---|---|---|---|---|---|---|---|---|---|---|---|---|---|---|
| 4 | 1 | 0 | 0 | 1 | 0 | 0 | 0 1 | 1 1 | 0 1 | 0 | 1 | 1 | 1 | 1 | 0 | | | |
| 5 | 1 | 0 | 1 | 1 | 1 | 1 | 0 1 | 0 1 | 1 1 | 0 | 0 | 0 | 1 | 0 | 0 | | | |
| 6 | 0 | 1 | 0 | 1 | 0 | 1 | 1 0 | 0 1 | 0 1 | 1 | 1 | 1 | 1 | 1 | 0 | | | |
| 7 | 1 | 1 | 0 | 0 | 0 | 0 | 0 0 | 1 1 | 1 1 | 1 | 1 | 0 | 1 | 1 | 1 | | | |
| 8 | 0 | 0 | 1 | 0 | 0 | 0 | 1 1 | 1 0 | 1 1 | 0 | 0 | 0 | 1 | 0 | 0 | | | |
| 9 | 1 | 0 | 1 | 1 | 1 | 0 | 1 0 | 0 1 | 0 1 | 1 | 0 | 1 | 0 | 0 | 1 | | | |
| 10 | 1 | 1 | 0 | 0 | 0 | 0 | 0 1 | 1 0 | 1 1 | 1 | 0 | 1 | 1 | 0 | 1 | | | |
| 11 | 0 | 0 | 0 | 0 | 0 | 1 | 1 0 | 1 0 | 0 1 | 1 | 1 | 1 | 0 | 0 | 0 | | | |
| 12 | 1 | 0 | 1 | 1 | 1 | 0 | 0 0 | 0 1 | 0 1 | 0 | 1 | 0 | 0 | 0 | 0 | | | |
| 13 | 0 | 0 | 0 | 0 | 1 | 1 | 1 1 | 0 1 | 1 1 | 0 | 1 | 0 | 1 | 0 | 0 | | | |
| 14 | 0 | 1 | 1 | 0 | 1 | 0 | 1 0 | 1 1 | 0 1 | 1 | 1 | 1 | 0 | 1 | 1 | | | |
| 15 | 1 | 0 | 0 | 0 | 0 | 0 | 0 1 | 0 0 | 0 1 | 1 | 0 | 0 | 1 | 0 | 1 | | | |
| 16 | 0 | 0 | 1 | 1 | 0 | 1 | 1 0 | 0 0 | 0 1 | 0 | 0 | 0 | 0 | 0 | 1 | | | |
| 17 | 1 | 0 | 0 | 0 | 0 | 1 | 1 0 | 1 1 | 0 1 | 0 | 1 | 0 | 1 | 0 | 1 | | | |
| 18 | 1 | 1 | 0 | 1 | 0 | 1 | 0 0 | 1 0 | 0 1 | 0 | 1 | 1 | 1 | 0 | 0 | | | |
| 19 | 1 | 1 | 0 | 0 | 0 | 1 | 1 1 | 0 0 | 0 1 | 0 | 1 | 1 | 0 | 1 | 0 | | | |
| 20 | 0 | 1 | 1 | 1 | 0 | 0 | 0 1 | 1 1 | 1 1 | 1 | 0 | 0 | 0 | 0 | 0 | | | |
| 21 | 1 | 1 | 0 | 0 | 0 | 1 | 1 1 | 1 1 | 0 1 | 0 | 0 | 1 | 0 | 0 | 0 | | | |
| 22 | 0 | 0 | 1 | 0 | 1 | 0 | 0 0 | 1 0 | 0 1 | 0 | 1 | 0 | 0 | 1 | 0 | | | |
| 23 | 0 | 0 | 0 | 1 | 1 | 1 | 0 0 | 1 1 | 0 1 | 1 | 0 | 1 | 1 | 0 | 0 | | | |
| 24 | 1 | 0 | 1 | 1 | 1 | 0 | 0 1 | 0 1 | 0 1 | 0 | 1 | 1 | 1 | 0 | 1 | | | |
| 25 | 1 | 0 | 0 | 1 | 0 | 0 | 1 1 | 0 0 | 0 1 | 0 | 0 | 0 | 0 | 0 | 1 | | | |
| 26 | 0 | 1 | 0 | 0 | 1 | 1 | 1 0 | 0 0 | 0 1 | 1 | 0 | 1 | 0 | 0 | 0 | | | |
| 27 | 1 | 1 | 1 | 1 | 0 | 0 | 0 0 | 0 0 | 1 1 | 0 | 0 | 0 | 1 | 0 | 0 | | | |
| 28 | 0 | 0 | 1 | 1 | 1 | 1 | 1 1 | 1 0 | 1 1 | 0 | 0 | 1 | 0 | 1 | 1 | | | |
| 29 | 0 | 1 | 1 | 1 | 0 | 1 | 0 1 | 0 1 | 1 1 | 1 | 1 | 0 | 0 | 1 | 0 | | | |

| u | Binary Complementary Sequence | | | | | | | | | | | | | | | | | |
|---|---|---|---|---|---|---|---|---|---|---|---|---|---|---|---|---|---|---|
| 0 | 0 | 0 | 0 | 0 | 1 | 0 | 0 | 0 1 | 1 1 | 0 | 0 | 0 | 0 | 1 | 1 | 1 | | |
| 1 | 0 | 0 | 1 | 0 | 0 | 0 | 1 | 0 1 | 0 1 | 1 | 1 | 1 | 0 | 1 | 1 | | | |
| 2 | 0 | 1 | 1 | 1 | 1 | 0 | 0 | 1 1 | 0 1 | 0 | 1 | 0 | 0 | 1 | 1 | | | |
| 3 | 1 | 0 | 0 | 1 | 0 | 0 | 0 | 1 1 | 0 1 | 0 | 1 | 1 | 1 | 0 | 1 | | | |
| 4 | 0 | 0 | 1 | 0 | 1 | 1 | 1 | 0 1 | 1 1 | 0 | 0 | 1 | 1 | 1 | 1 | | | |
| 5 | 1 | 0 | 0 | 1 | 0 | 1 | 1 | 1 1 | 0 1 | 1 | 0 | 0 | 1 | 1 | 1 | | | |
| 6 | 0 | 0 | 0 | 0 | 0 | 1 | 1 | 1 1 | 1 1 | 0 | 1 | 1 | 1 | 0 | 1 | | | |
| 7 | 0 | 0 | 1 | 1 | 0 | 1 | 0 | 1 1 | 1 1 | 0 | 0 | 1 | 1 | 1 | 1 | | | |
| 8 | 0 | 0 | 0 | 1 | 0 | 0 | 0 | 1 1 | 1 1 | 1 | 1 | 0 | 1 | 1 | 1 | | | |
| 9 | 1 | 0 | 0 | 1 | 1 | 0 | 1 | 0 1 | 1 1 | 1 | 0 | 0 | 1 | 1 | 1 | | | |
| 10 | 0 | 1 | 1 | 1 | 0 | 0 | 0 | 0 1 | 0 1 | 1 | 1 | 0 | 1 | 1 | 1 | | | |

TABLE 27-continued

Length 18 complementary CGS Sequence

| u | Binary Sequence |
|---|---|
| 11 | 0 0 0 1 0 0 1 1 1 0 0 1 0 0 0 1 1 1 |
| 12 | 1 0 0 0 1 0 0 1 1 1 0 0 1 0 0 0 1 1 |
| 13 | 1 1 0 0 1 1 0 1 1 1 0 1 1 0 0 1 1 1 |
| 14 | 0 1 1 1 1 1 0 1 1 0 0 1 0 0 0 1 1 1 |
| 15 | 0 0 1 1 0 1 0 1 1 1 0 1 1 0 0 1 1 1 |
| 16 | 0 0 1 0 0 1 1 1 1 1 1 1 0 1 0 1 1 1 |
| 17 | 0 0 1 0 0 1 1 1 1 1 1 0 1 1 1 0 1 1 |
| 18 | 1 1 1 0 0 1 1 1 1 0 1 0 1 1 0 0 1 1 |
| 19 | 0 1 0 1 1 0 0 1 1 0 1 1 0 1 0 1 1 1 |
| 20 | 0 0 0 1 0 0 0 1 1 0 0 1 0 0 0 1 1 1 |
| 21 | 1 0 0 0 1 0 0 1 1 0 1 1 1 1 0 1 1 1 |
| 22 | 1 0 1 1 1 0 0 1 1 0 0 1 1 1 0 1 1 1 |
| 23 | 1 1 0 0 1 0 1 1 1 1 1 0 1 0 0 1 1 1 |
| 24 | 0 0 0 0 1 1 1 1 1 0 1 1 0 1 1 0 1 1 |
| 25 | 0 1 0 1 1 1 1 1 1 1 0 0 1 0 0 1 1 1 |
| 26 | 0 0 1 0 1 1 1 1 1 0 1 0 0 1 1 1 0 1 |
| 27 | 1 0 0 1 1 0 1 1 1 0 1 0 1 0 0 1 1 1 |
| 28 | 0 1 1 0 0 0 0 1 1 1 0 0 0 0 1 1 0 1 |
| 29 | 1 0 0 0 0 1 0 1 1 0 0 1 0 0 0 0 1 1 |

TABLE 28

Length 24 complementary CGS Sequence

| u | Binary Sequence |
|---|---|
| 0 | 1 0 0 0 1 1 0 0 0 0 0 0 0 0 1 1 1 1 1 0 1 0 0 1 |
| 1 | 0 0 0 0 0 0 0 1 1 0 0 0 1 1 0 0 1 0 1 1 1 1 1 1 |
| 2 | 0 1 1 0 1 0 1 1 1 0 0 0 0 1 0 0 0 1 0 0 0 1 1 1 |
| 3 | 1 0 1 0 0 1 0 0 0 0 0 1 1 1 0 0 1 0 0 1 0 1 1 1 |
| 4 | 1 0 1 0 0 0 1 0 0 1 1 1 0 0 0 0 0 0 1 0 1 1 1 1 |
| 5 | 0 1 0 0 0 0 1 1 0 0 1 0 0 1 1 0 1 0 1 1 0 1 0 1 |
| 6 | 0 0 1 0 0 1 1 1 0 0 0 1 1 1 1 0 1 1 0 1 1 0 0 1 |
| 7 | 1 0 0 1 1 1 0 0 1 1 0 1 0 0 0 0 1 1 1 1 1 1 1 1 |
| 8 | 1 0 0 1 1 0 1 0 0 0 0 0 1 1 1 1 1 1 1 0 0 1 1 1 |
| 9 | 1 0 0 1 0 1 0 1 0 1 1 0 1 0 1 1 1 1 0 0 1 1 0 1 |
| 10 | 1 0 1 1 1 1 0 0 0 1 0 1 0 0 1 0 0 1 1 1 1 0 0 1 |
| 11 | 1 1 0 0 1 0 0 0 1 0 1 1 1 0 0 1 0 0 0 0 0 1 0 1 |
| 12 | 0 0 0 0 0 1 0 0 1 0 1 1 1 0 0 1 0 0 0 1 1 1 0 1 |
| 13 | 1 0 1 1 1 0 1 1 1 0 0 1 1 1 0 1 0 0 0 1 1 0 1 1 |
| 14 | 1 0 0 0 0 0 1 0 1 0 1 1 0 0 1 0 0 1 0 0 0 1 1 1 |

TABLE 28-continued

Length 24 complementary CGS Sequence

| u | Sequence |
|---|---|
| 15 | 1 1 1 1 0 1 0 1 1 0 1 0 0 1 0 0 0 1 1 1 0 0 1 1 |
| 16 | 0 1 0 0 1 1 1 1 1 0 0 0 0 1 0 0 0 1 1 0 0 0 0 1 |
| 17 | 0 1 1 1 0 0 0 1 0 1 0 0 1 0 1 1 1 0 0 1 0 0 0 1 |
| 18 | 0 0 0 0 1 1 0 1 1 1 1 0 0 1 0 0 0 0 0 0 0 1 1 1 |
| 19 | 0 1 1 0 0 0 1 0 1 1 0 1 0 1 1 0 0 0 0 0 0 1 1 1 |
| 20 | 0 0 0 1 0 0 1 0 0 1 1 0 1 0 1 0 0 0 0 0 0 1 1 1 |
| 21 | 1 1 1 0 1 1 0 0 0 1 0 0 0 0 1 0 0 1 0 0 0 0 0 1 |
| 22 | 0 0 0 1 1 1 1 1 1 1 0 1 1 0 0 0 0 1 0 0 1 1 1 1 |
| 23 | 0 1 0 1 0 1 1 1 1 1 0 0 0 0 0 1 0 0 1 0 0 1 1 1 |
| 24 | 1 0 0 0 1 0 1 1 1 0 1 1 0 0 0 1 0 1 1 0 1 0 1 1 |
| 25 | 1 1 0 0 1 0 1 0 0 0 0 1 1 0 0 0 1 0 0 0 1 1 1 1 |
| 26 | 0 0 0 0 1 0 0 1 1 1 1 0 0 0 1 1 1 1 1 1 0 1 1 |
| 27 | 0 0 1 0 0 0 0 0 0 1 1 1 0 0 0 0 1 1 0 1 1 1 1 |
| 28 | 1 0 0 0 1 0 0 0 0 1 1 0 0 0 1 0 1 0 0 1 1 1 1 1 |
| 29 | 0 1 1 0 0 1 0 1 1 1 0 0 0 0 0 0 1 1 0 1 0 1 1 1 |

Binary Complementary Sequence

| u | Sequence |
|---|---|
| 0 | 0 0 0 1 0 1 1 1 0 0 0 1 1 1 0 1 1 0 1 1 1 1 1 |
| 1 | 0 0 1 1 0 1 0 1 1 0 0 1 0 1 0 1 1 0 1 1 1 1 1 |
| 2 | 0 0 0 1 0 1 0 1 1 0 0 1 1 1 1 1 0 0 1 1 1 1 1 |
| 3 | 0 1 1 0 1 0 1 0 0 1 1 0 1 0 1 1 0 0 1 1 1 1 1 |
| 4 | 0 1 1 0 1 1 1 0 0 0 1 1 1 0 1 0 0 0 1 1 1 1 1 |
| 5 | 0 0 1 1 1 1 1 0 0 1 1 0 0 1 0 1 0 0 1 1 1 1 1 |
| 6 | 1 0 0 0 1 0 1 1 1 0 0 0 1 1 1 0 1 1 0 1 1 1 1 |
| 7 | 1 0 0 1 1 0 1 0 1 1 0 0 1 0 1 0 1 1 0 1 1 1 1 |
| 8 | 0 0 1 1 0 1 0 1 0 0 0 1 1 1 1 1 0 0 1 1 1 1 1 |
| 9 | 1 0 0 0 1 0 1 0 1 1 0 0 1 0 0 1 1 1 1 1 1 1 |
| 10 | 1 0 1 1 0 1 0 1 0 0 1 1 0 1 0 1 1 0 1 1 1 1 1 |
| 11 | 0 0 1 1 1 1 1 0 0 0 0 1 1 0 0 1 1 1 1 1 1 1 |
| 12 | 1 0 1 1 0 1 1 1 0 0 0 1 1 1 0 1 0 0 1 1 1 1 1 |
| 13 | 1 0 1 1 0 1 1 1 0 0 0 1 1 1 0 1 0 0 1 1 1 1 1 |
| 14 | 0 0 1 1 1 0 1 0 0 0 1 0 0 1 1 0 1 1 1 1 1 1 1 |
| 15 | 0 1 1 0 0 1 0 0 0 1 0 1 1 0 0 1 1 1 1 1 1 1 1 |
| 16 | 0 0 0 1 1 0 0 0 0 1 0 0 1 1 1 1 0 1 1 1 1 1 1 |
| 17 | 0 1 1 0 1 1 0 0 0 0 0 1 1 0 1 1 0 1 1 1 1 1 1 |
| 18 | 1 0 0 1 1 1 0 1 0 0 0 1 0 0 1 1 0 1 1 1 1 1 1 |
| 19 | 0 1 0 0 1 1 0 0 0 0 0 1 1 0 0 1 0 1 1 1 1 1 1 |
| 20 | 1 0 1 1 0 0 1 0 0 0 1 0 1 1 1 0 0 1 1 1 1 1 1 |
| 21 | 0 1 1 1 1 0 0 1 0 0 0 0 1 1 0 0 0 1 1 1 1 1 1 |

TABLE 28-continued

Length 24 complementary CGS Sequence

| 22 | 1 | 1 | 0 | 0 | 1 | 1 | 1 | 0 | 1 | 0 | 0 | 0 | 1 | 0 | 0 | 1 |
|----|---|---|---|---|---|---|---|---|---|---|---|---|---|---|---|---|
|    |   |   |   |   | 1 | 0 | 1 | 1 | 1 | 1 | 1 | 1 |   |   |   |   |
| 23 | 0 | 0 | 1 | 0 | 0 | 1 | 1 | 1 | 0 | 0 | 1 | 0 | 0 | 1 | 1 | 1 |
|    |   |   |   |   | 1 | 1 | 0 | 1 | 1 | 1 | 1 | 1 |   |   |   |   |
| 24 | 0 | 0 | 1 | 0 | 0 | 1 | 0 | 0 | 1 | 0 | 0 | 1 | 1 | 1 | 1 | 1 |
|    |   |   |   |   | 1 | 0 | 1 | 1 | 1 | 1 | 1 | 1 |   |   |   |   |
| 25 | 1 | 0 | 0 | 0 | 1 | 1 | 0 | 0 | 0 | 0 | 1 | 0 | 0 | 1 | 1 | 1 |
|    |   |   |   |   | 1 | 0 | 1 | 1 | 1 | 1 | 1 | 1 |   |   |   |   |
| 26 | 1 | 1 | 0 | 1 | 1 | 0 | 0 | 1 | 0 | 0 | 0 | 1 | 0 | 1 | 1 | 1 |
|    |   |   |   |   | 0 | 0 | 1 | 1 | 1 | 1 | 1 | 1 |   |   |   |   |
| 27 | 1 | 1 | 1 | 0 | 0 | 1 | 1 | 0 | 1 | 0 | 0 | 0 | 1 | 0 | 0 | 0 |
|    |   |   |   |   | 1 | 1 | 0 | 1 | 1 | 1 | 1 | 1 |   |   |   |   |
| 28 | 1 | 0 | 1 | 1 | 0 | 1 | 1 | 0 | 0 | 0 | 0 | 0 | 1 | 1 | 0 | 1 |
|    |   |   |   |   | 1 | 0 | 1 | 1 | 1 | 1 | 1 | 1 |   |   |   |   |
| 29 | 0 | 1 | 1 | 0 | 1 | 1 | 1 | 0 | 0 | 0 | 0 | 0 | 1 | 1 | 1 | 0 |
|    |   |   |   |   | 1 | 1 | 0 | 1 | 1 | 1 | 1 | 1 |   |   |   |   |

For the case of CGS sequences of length 12, 18 and 24, the complementary CGS sequences are given in the following tables.

TABLE 29

Length 12 complementary CGS Sequence

| u | Binary Sequence | Binary Complementary Sequence |
|---|---|---|
| 0 | 000000110110 | 0 0 1 0 0 1 1 1 1 1 1 1 |
| 1 | 000001000111 | 0 1 1 1 0 0 0 1 1 1 1 1 |
| 2 | 000001110111 | 1 0 0 1 0 0 1 1 1 1 1 1 |
| 3 | 110110101000 | 0 0 0 1 1 0 1 1 1 1 1 1 |
| 4 | 110010101001 | 0 1 1 0 1 1 0 1 1 1 1 1 |
| 5 | 101101001011 | 1 0 1 0 0 1 1 1 0 1 1 1 |
| 6 | 000100100010 | 0 1 1 0 1 1 1 0 1 1 1 1 |
| 7 | 010001001000 | 0 1 1 1 0 1 1 0 1 1 1 1 |
| 8 | 101111011011 | 1 0 1 1 0 1 1 1 0 1 1 1 |
| 9 | 101101111000 | 0 1 1 1 0 1 1 1 1 1 1 1 |
| 10 | 101101000110 | 1 0 1 1 0 1 1 1 1 1 1 1 |
| 11 | 101001001010 | 0 0 1 1 1 0 0 1 1 1 1 1 |
| 12 | 110000011110 | 0 1 1 0 1 1 1 1 1 1 1 1 |
| 13 | 010001101011 | 1 1 1 0 1 1 0 1 1 1 1 1 |
| 14 | 000001100011 | 0 0 0 1 1 1 1 1 1 1 1 1 |
| 15 | 000001001001 | 1 1 0 0 1 0 0 1 1 1 1 1 |
| 16 | 001001000001 | 0 0 0 1 0 0 0 1 1 1 1 1 |
| 17 | 000001101110 | 0 0 0 1 0 0 1 1 1 1 1 1 |
| 18 | 000111110001 | 1 0 1 1 0 1 1 0 1 1 1 1 |
| 19 | 100010000011 | 1 0 0 0 1 1 1 0 1 1 1 1 |
| 20 | 011110101111 | 1 0 0 1 1 1 0 0 1 1 1 1 |
| 21 | 011101001101 | 0 1 1 1 1 0 0 1 1 1 1 1 |
| 22 | 011111001000 | 1 1 0 1 1 0 1 1 0 1 1 1 |
| 23 | 011100000100 | 0 0 0 1 1 1 1 0 1 1 1 1 |
| 24 | 001111111100 | 1 0 0 1 1 0 1 0 1 1 1 1 |
| 25 | 011100110100 | 1 0 0 0 0 1 1 1 1 1 1 1 |
| 26 | 011101110111 | 1 0 0 1 0 1 0 1 1 1 1 1 |
| 27 | 011111100011 | 0 1 1 0 0 0 1 1 1 1 1 1 |
| 28 | 011110000011 | 1 1 1 1 0 1 1 0 1 1 1 1 |
| 29 | 011101111011 | 0 0 1 0 0 1 1 0 1 1 1 1 |

TABLE 30

Length 18 complementary CGS Sequence

| u | Binary Sequence | Binary Complementary Sequence |
|---|---|---|
| 0 | 000001000111110001 | 0 0 0 1 0 0 1 0 0 1 0 0 0 1 1 1 1 1 |
| 1 | 000000011111001001 | 0 0 1 0 0 1 1 1 1 0 1 1 1 1 1 1 1 1 |
| 2 | 00001111011101111 | 10 0 0 1 1 0 1 0 1 0 0 1 1 1 1 1 1 |
| 3 | 010110110001101011 | 1 0 0 1 0 0 1 1 0 1 1 1 1 1 1 1 1 1 |

TABLE 30-continued

Length 18 complementary CGS Sequence

| u | Binary Sequence | Binary Complementary Sequence |
|---|---|---|
| 4 | 110100101010011110 | 1 0 1 1 0 0 1 0 0 1 1 1 0 1 1 1 1 1 |
| 5 | 010101110010110110 | 0 0 0 1 1 0 1 1 0 1 1 1 1 1 1 1 1 1 |
| 6 | 000111000100011111 | 0 0 0 1 0 0 0 1 1 1 1 1 0 1 1 1 1 1 |
| 7 | 010100011010000011 | 0 1 1 1 1 1 0 0 1 0 0 1 1 1 1 1 1 1 |
| 8 | 001010001010010001 | 1 0 0 0 1 0 0 1 0 0 1 0 0 0 1 1 1 1 |
| 9 | 101100101010010001 | 0 1 0 0 0 1 0 1 1 0 1 1 0 1 1 1 1 1 |
| 10 | 101100011100000001 | 0 0 0 1 0 1 1 1 0 1 1 1 0 1 1 1 1 1 |
| 11 | 110110111011111000 | 0 0 0 0 1 0 0 1 1 1 1 0 1 1 1 1 1 1 |
| 12 | 100010101000110101 | 0 0 0 1 1 1 0 1 1 1 0 0 0 1 1 1 1 1 |
| 13 | 101101011100000110 | 0 0 1 0 0 1 1 1 0 1 0 1 1 1 1 1 1 1 |
| 14 | 000001110110101100 | 0 1 0 0 0 1 1 1 1 0 1 1 0 1 1 1 1 1 |
| 15 | 001110110100011010 | 1 0 1 1 0 1 0 0 0 1 1 1 0 1 1 1 1 1 |
| 16 | 010010001110100111 | 1 0 1 1 1 0 0 0 1 0 1 1 0 1 1 1 1 1 |
| 17 | 010011011000000010 | 0 0 1 0 1 1 1 0 1 0 0 1 1 1 1 1 1 1 |
| 18 | 001001111000001100 | 0 0 0 1 0 0 0 1 0 0 0 1 1 1 1 1 1 1 |
| 19 | 000000010010011011 | 1 0 0 1 0 1 1 1 0 1 0 0 1 1 1 1 1 1 |
| 20 | 000001100001001111 | 1 0 0 0 1 0 0 0 1 0 0 0 1 1 1 1 1 1 |
| 21 | 111101011111001001 | 0 0 1 0 0 0 1 0 0 1 1 1 1 0 1 1 1 1 |
| 22 | 100100010011110111 | 0 0 1 0 0 1 1 1 1 1 0 1 0 1 1 1 1 1 |
| 23 | 001000111000100101 | 0 1 1 1 0 0 0 0 0 1 1 1 0 1 1 1 1 1 |
| 24 | 110110000000110110 | 0 0 1 0 0 1 1 1 1 1 0 1 1 1 1 1 1 1 |
| 25 | 110101011000010110 | 1 0 1 1 1 0 0 1 0 0 1 1 0 1 1 1 1 1 |
| 26 | 011111110010100110 | 0 1 0 1 1 1 0 0 0 1 0 1 1 0 1 1 1 1 |
| 27 | 011011100000001100 | 0 1 0 1 1 1 0 0 0 1 1 1 1 0 1 1 1 1 |
| 28 | 000110000000001100 | 0 0 1 0 0 1 0 0 1 0 0 1 1 1 1 1 1 1 |
| 29 | 011101101011101100 | 0 1 1 1 1 0 0 1 0 0 1 1 1 1 1 1 1 1 |

TABLE 31

Length 24 complementary CGS Sequence

| u | Binary Sequence | Binary Complementary Sequence |
|---|---|---|
| 0 | 000000010011111001001001 | 0 1 0 0 1 0 0 1 0 1 1 0 0 0 1 1 0 1 1 1 1 1 |
| 1 | 000000010010110111000110 | 0 0 1 1 1 1 0 1 0 0 1 0 0 0 0 1 1 |
| 2 | 000000001001001001111011 | 0 0 0 0 1 1 0 0 1 1 1 1 1 1 0 0 1 1 1 1 1 1 |
| 3 | 000000001101100101011011 | 0 1 0 0 1 0 0 0 1 1 0 1 1 0 1 1 1 0 1 1 1 1 |
| 4 | 100111110110111011000111 | 0 0 0 1 0 1 0 1 0 0 0 1 0 0 1 0 0 1 1 1 1 1 |
| 5 | 101011011001111100110111 | 0 0 0 0 1 1 0 0 1 1 0 0 1 1 1 1 1 1 |
| 6 | 011001001111110111101101 | 0 0 1 1 1 0 1 1 1 1 0 1 0 0 0 1 0 1 1 1 1 1 1 |

TABLE 31-continued

Length 24 complementary CGS Sequence

| u | Binary Sequence | | | | | | Binary Complementary Sequence | | | | | | | | | | | |
|---|---|---|---|---|---|---|---|---|---|---|---|---|---|---|---|---|---|---|
| 7 | 101111111110100111 001101 | 0 | 0 | 0 | 0 | 1 | 1 1 | 0 1 | 1 1 | 0 1 | 0 1 | 0 1 | 1 1 | 1 | 0 | 1 | 0 | 0 |
| 8 | 001001010001001000 001110 | 0 | 1 | 0 | 0 | 1 | 1 0 | 1 0 | 0 1 | 1 1 | 1 1 | 1 1 | 0 1 | 1 | 1 | 1 | 0 | 0 |
| 9 | 000010011010000011 000101 | 0 | 0 | 1 | 0 | 0 | 1 1 | 1 1 | 1 1 | 0 1 | 0 1 | 0 1 | 0 1 | 1 | 0 | 0 | 0 | 0 |
| 10 | 101000111001111011 110010 | 0 | 0 | 0 | 0 | 0 | 0 1 | 1 1 | 1 1 | 0 1 | 1 1 | 1 1 | 1 1 | 1 | 1 | 1 | 0 | 0 |
| 11 | 001001000001110001 001010 | 0 | 0 | 0 | 0 | 1 | 1 1 | 1 0 | 0 1 | 1 1 | 1 1 | 1 1 | 0 1 | 1 | 1 | 1 | 0 | 0 |
| 12 | 101001110100010111 001011 | 0 | 0 | 1 | 1 | 1 | 0 1 | 0 1 | 0 1 | 0 1 | 0 1 | 0 1 | 0 1 | 1 | 1 | 1 | 0 | 0 |
| 13 | 101001101101010110 110010 | 0 | 0 | 0 | 1 | 1 | 0 1 | 0 1 | 0 1 | 0 1 | 0 1 | 0 1 | 0 1 | 1 | 1 | 0 | 0 | 0 |
| 14 | 101000100111000001 001011 | 0 | 0 | 0 | 1 | 0 | 1 0 | 1 1 | 1 1 | 0 1 | 0 1 | 0 1 | 1 1 | 1 | 1 | 0 | 1 | 1 |
| 15 | 100101001100001111 111001 | 0 | 0 | 0 | 1 | 0 | 0 1 | 1 1 | 0 1 | 0 1 | 1 1 | 1 1 | 1 1 | 1 | 1 | 0 | 1 | 0 |
| 16 | 000111100101001110 111001 | 0 | 0 | 0 | 1 | 0 | 1 1 | 0 1 | 0 1 | 0 1 | 1 1 | 1 1 | 1 1 | 1 | 1 | 0 | 0 | 1 |
| 17 | 110101110011100000 011010 | 0 | 0 | 0 | 1 | 1 | 0 0 | 0 1 | 0 1 | 1 1 | 0 1 | 0 1 | 0 1 | 0 | 1 | 0 | 1 | 0 |
| 18 | 000000000111100010 110001 | 0 | 0 | 1 | 0 | 0 | 1 1 | 1 0 | 1 1 | 0 1 | 1 1 | 0 1 | 0 1 | 0 | 1 | 1 | 1 | 1 |
| 19 | 100010110001000000 000111 | 0 | 1 | 1 | 1 | 1 | 1 0 | 0 0 | 0 1 | 1 1 | 0 1 | 0 1 | 1 1 | 1 | 1 | 0 | 0 | 1 |
| 20 | 000000111011000110 001010 | 0 | 1 | 1 | 0 | 0 | 0 1 | 0 1 | 1 1 | 1 1 | 1 1 | 0 1 | 0 1 | 0 | 0 | 1 | 1 | 0 |
| 21 | 011010111000010000 100011 | 0 | 0 | 1 | 1 | 0 | 1 0 | 0 1 | 1 1 | 1 1 | 0 1 | 0 1 | 1 1 | 0 | 1 | 0 | 1 | 1 |
| 22 | 101001000001110010 001011 | 0 | 0 | 1 | 0 | 0 | 1 0 | 0 1 | 1 1 | 1 1 | 0 1 | 0 1 | 1 1 | 1 | 1 | 1 | 1 | 0 |
| 23 | 100110100000111111 110011 | 0 | 1 | 1 | 0 | 1 | 0 0 | 1 1 | 0 1 | 0 1 | 1 1 | 1 1 | 0 1 | 1 | 0 | 1 | 1 | 0 |
| 24 | 100011010100100111 111000 | 0 | 1 | 1 | 0 | 0 | 1 1 | 0 1 | 1 1 | 1 1 | 0 1 | 0 1 | 0 1 | 1 | 0 | 1 | 1 | 0 |
| 25 | 101011000100011111 100100 | 1 | 0 | 1 | 1 | 0 | 1 0 | 0 1 | 0 1 | 1 1 | 1 1 | 1 1 | 0 1 | 1 | 0 | 0 | 1 | 1 |
| 26 | 010010101100011111 100100 | 0 | 1 | 1 | 0 | 1 | 0 1 | 0 1 | 1 1 | 1 1 | 1 1 | 0 1 | 1 1 | 0 | 0 | 1 | 1 | 0 |
| 27 | 010110101010110110 010011 | 0 | 0 | 0 | 1 | 1 | 1 1 | 1 1 | 1 1 | 0 1 | 0 1 | 1 1 | 1 1 | 1 | 1 | 1 | 0 | 0 |
| 28 | 010001101010111010 010011 | 0 | 0 | 0 | 0 | 0 | 1 1 | 0 1 | 1 1 | 0 1 | 1 1 | 1 1 | 1 1 | 1 | 0 | 1 | 1 | 0 |
| 29 | 010010011111111110 010011 | 0 | 0 | 1 | 1 | 1 | 0 1 | 0 1 | 1 1 | 1 1 | 1 1 | 1 1 | 1 1 | 0 | 0 | 0 | 0 | 0 |

In another embodiment of this invention, for the case of CGS sequences of length 12, 18 and 24 which were agreed in RAN WG1 NRAH1901 and presented in R1-1901362, a set of complementary sequences may be chosen from the set of sequences in R1-1901362 i.e., for each sequence in the sets of sequences provided in R1-1901362, a corresponding sequence is selected from the same set such that the frequency domain properties of the two sequences when used in adjacent DMRS symbols or adjacent occurring DMRS symbols in time domain. In this case, this deterministic choice of sequences behaves similar to a fixed group-hopping pattern. The following tables provide an example of complementary sequences chosen from the set of 30 sequences for length 12 (Table 1), 18 (Table 2) and 24 (Table 3) from R1-1901362. The indexing is with reference to the indexing provided in R1-1901362 and can also be found in the first two columns of Tables 29-31.

TABLE 32

Complementary CGS for Length 12
Based on Table 1 from R1-1901362

| CGS Index for First Symbol | Complementary CGS Index for adjacent DMRS Symbol |
|---|---|
| 0 | 15 |
| 1 | 0 |
| 2 | 16 |
| 3 | 10 |
| 4 | 2 |
| 5 | 4 |
| 6 | 8 |
| 7 | 13 |
| 8 | 6 |
| 9 | 26 |
| 10 | 7 |
| 11 | 14 |
| 12 | 1 |
| 13 | 29 |
| 14 | 11 |
| 15 | 18 |
| 16 | 9 |
| 17 | 21 |

TABLE 32-continued

Complementary CGS for Length 12
Based on Table 1 from R1-1901362

| CGS Index for First Symbol | Complementary CGS Index for adjacent DMRS Symbol |
|---|---|
| 18 | 19 |
| 19 | 23 |
| 20 | 25 |
| 21 | 17 |
| 22 | 3 |
| 23 | 12 |
| 24 | 20 |
| 25 | 22 |
| 26 | 28 |
| 27 | 5 |
| 28 | 27 |
| 29 | 24 |

TABLE 33

Complementary CGS for Length 18
Based on Table 2 from R1-1901362

| CGS Index for First Symbol | Complementary CGS Index for adjacent DMRS Symbol |
|---|---|
| 0 | 23 |
| 1 | 17 |
| 2 | 6 |
| 3 | 0 |
| 4 | 19 |
| 5 | 7 |
| 6 | 8 |
| 7 | 11 |
| 8 | 2 |
| 9 | 4 |
| 10 | 22 |
| 11 | 21 |
| 12 | 18 |
| 13 | 29 |
| 14 | 10 |
| 15 | 5 |
| 16 | 1 |
| 17 | 20 |
| 18 | 12 |
| 19 | 25 |
| 20 | 24 |
| 21 | 15 |
| 22 | 28 |
| 23 | 9 |
| 24 | 27 |
| 25 | 14 |
| 26 | 13 |
| 27 | 16 |
| 28 | 26 |
| 29 | 3 |

TABLE 34

Complementary CGS for Length 24
Based on Table 3 from R1-1901362

| CGS Index for First Symbol | Complementary CGS Index for adjacent DMRS Symbol |
|---|---|
| 0 | 8 |
| 1 | 3 |
| 2 | 20 |
| 3 | 2 |
| 4 | 18 |
| 5 | 14 |
| 6 | 29 |
| 7 | 0 |
| 8 | 11 |
| 9 | 26 |
| 10 | 21 |
| 11 | 22 |
| 12 | 13 |
| 13 | 12 |
| 14 | 23 |
| 15 | 7 |
| 16 | 19 |
| 17 | 4 |
| 18 | 9 |
| 19 | 16 |
| 20 | 1 |
| 21 | 27 |
| 22 | 28 |
| 23 | 10 |
| 24 | 6 |
| 25 | 5 |
| 26 | 15 |
| 27 | 24 |
| 28 | 25 |
| 29 | 17 |

Sequence Group Hopping when Transform Precoding is Enabled

In one embodiment, when transform precoding is enabled and π/2-BPSK modulated PUSCH/PUCCH is used, for a case of smaller resource allocation of 1-4 PRBs, sequence hopping can be employed where the CGS sequences to be used for each symbol is determined as follows:

$r(n) = r_u(n)$; $n = 0, 1, \ldots, M_{sc}^{PUSCH}/2 - 1$, where the sequence group $u = (f_{gh} + n_{ID}^{RS}) \mod 30$ wherein $n_{ID}^{RS}$ is defined in TS 38.211 (v15.1.0), section 6.4.1.1.1.2.

In one embodiment, per-symbol group hopping can be enabled where $f_{gh} = (\Sigma_{m=0}^{7} 2^m c(8(N_{symb}^{slot} n_{s,f}^{u} + 1) + m)) \mod 30$, where $N_{symb}^{slot}$, $n_{s,f}^{u}$ are defined in TS 38.211 (v15.1.0) and l is the symbol number within the slot. The gold sequence c(i) is defined in TS 38.211 (v15.1.0), section 5.2.1 and may be initialized with $c_{init} = \lfloor n_{ID}^{RS}/30 \rfloor$.

In one embodiment, when two symbol DMRS is used, per-symbol-pair group hopping can be enabled using $f_{gh} = (\Sigma_{m=0}^{7} 2^m c(8(N_{symb}^{slot} n_{s,f}^{u} + \bar{l}) + m)) \mod 30$; $l = \bar{l} + l'$, where $\bar{l}$ is the DMRS position within the slot and is defined in Tables 6.4.1.1.3-3/4 of TS 38.211 (v15.1.0) and $l' \in \{0,1\}$ is the time domain DMRS symbol index defined in TS 38.211 (v15.1.0). In another embodiment, for the case when l'=1, i.e., for the second time domain DMRS symbol, the sequences are chosen from the set of corresponding complementary sequences relative to the primary sequence chosen for the l'=0 i.e., the first DMRS symbol.

In another embodiment, per-symbol-pair group hopping can be enabled using $f_{gh} = (\Sigma_{m=0}^{7} 2^m c(8(N_{symb}^{slot} n_{s,f}^{u} + 1) + m)) \mod 30$, where for every pair of adjacent occurring DMRS symbols, l is the symbol index of the first occurring DMRS symbol of the pair.

In another embodiment, when per-symbol-pair group hopping is used, for every pair of adjacent occurring DMRS symbols a deterministic hopping pattern can be chosen i.e., sequence A can be used in the first symbol of the pair while a corresponding sequence B can be used in the second symbol of the pair, where sequence A and B pairs are pre-determined for example as in Tables 32-34. In another example, the complementary sequence B can be a sequence that belongs to a different set of sequences than set A as in previous tables. The choice of one of 30 pairs is determined by u for each slot. Furthermore, in the case of more than two DMRS symbols in the slot, group hopping is used to determine the sequence sets in the second pair of symbols. For example, if there are four DMRS symbols in the slot, the first two symbols can use sequence pairs A and B while the second two symbols can use pairs C and D where the choice of each pair is based on per-symbol pair sequence hopping as above.

In one embodiment, per-slot group hopping can be enabled using $f_{gh}=(\Sigma_{m=0}^{7} 2^m c(8(N_{symb}^{slot} n_{s,f}^{\mu})+m)) \mod 30$.

In another embodiment, per-slot group hopping can be enabled using $f_{gh}=(\Sigma_{m=0}^{7} 2^m c(8(N_{symb}^{slot} n_{s,f}^{\mu}+l)+m)) \mod 30$, where for every slot, l is the symbol index of the first occurring DMRS symbol in the slot.

In another embodiment, when per-slot group hopping is used, for every pair of adjacent occurring DMRS symbols a deterministic hopping pattern can be chosen i.e., sequence A can be used in the first symbol of the pair while a corresponding sequence B can be used in the second symbol of the pair, where sequence A and B pairs are pre-determined for example as in Tables 32-34. In another example, the complementary sequence B can be a sequence that belongs to a different set of sequences than set A as in previous tables. The choice of one of 30 pairs may be determined by u for each slot. Furthermore, in case of more than two DMRS symbols in the slot, the same pattern is repeated i.e., symbols 1 and 2 use sequences A and B respectively; symbols 3 and 4 use sequences A and B respectively.

In another embodiment, the Gold sequence in the above embodiments can be initialized by $c_{init}=\lfloor (n_{ID}^{RS}+n_{SCID})/30 \rfloor$.

In yet another embodiment, the Gold sequence in the above embodiments can be initialized by $c_{init}=\lfloor (n_{ID}^{RS,nSCID})/30 \rfloor$.

In some aspects, two RS IDs are configured by higher layer parameters nPUSCH-Identity0, nPUSCH-Identity1 and one of them is selected by using $n_{SCID}$. Modification of DMRS indication table to jointly signal port and $n_{SCID}$ is proposed in the following description and applies to small resource allocation as well.

For all the embodiments above, in yet another embodiment, the value of sequence hopping parameter v=0, i.e., sequence hopping is disabled.

Sequence Design for Case II (Larger Resource Allocation)

For pi/2 BPSK-modulated PUSCH or PUCCH DMRS with resources allocations larger than 4 PRBs, Gold Code based binary PN sequences as in Rel-15 NR CP-OFDM based PUSCH DMRS are used with the following initialization:

$c_{init}=(2^{17}(N_{symb}^{slot} n_{s,f}^{\mu}+l+1)(2N_{ID}+1)+2N_{ID}) \mod 2^{31}$, where the sequence generation using Gold sequences is defined in TS 38.211 (v15.1.0), Section 5.2.

In another embodiment, the DMRS sequence can be initialized with $c_{init}=(2^{17} (N_{symb}^{slot} n_{s,f}^{\mu}+l+1)(2N_{ID}^{nSCID}+1)+2N_{ID}^{nSCID}+n_{SCID}) \mod 2^{31}$, where the scrambling ID i.e., $n_{SCID} \in \{0,1\}$ can be signaled as follows:

In one embodiment, the $n_{SCID} \in \{0,1\}$ can be signaled dynamically by using a bit in DCI 0_0 or 0_1 for the case when transform precoding for UL is enabled by RRC configuration.

In another embodiment, the $n_{SCID} \in \{0,1\}$ can be signaled to the UE dynamically in the DCI by using entries in the DMRS antenna port indication tables 7.3.1.1.2-6 and 7.3.1.1.2-7 in TS 38.212 (v15.1.0).

In one embodiment of this embodiment, for maxLength=1, when one symbol front-loaded DMRS is used and only one DMRS port per CDM group is supported i.e., only port 0 and port 2 from TS 38.211 (v15.1.0) Table 6.4.1.1.3-1 are supported, then Table 7.3.1.1.2-6 in TS 38.212 (v15.1.0) can be modified as follows in Table 35:

TABLE 35

| Value | Number of DMRS CDM group(s) without data | DMRS port(s) | $n_{SCID}$ |
|---|---|---|---|
| 0 | 2 | 0 | 0 |
| 1 | 2 | 0 | 1 |
| 2 | 2 | 2 | 0 |
| 3 | 2 | 2 | 1 |

In one embodiment, for maxLength=1, when one symbol front-loaded DMRS is used and two DMRS ports per CDM group is supported as in TS 38.211 (v15.1.0), Table 6.4.1.1.3-1, then Table 7.3.1.1.2-6 in TS 38.212 (v15.1.0) can be extended as follows in Table 36 by increasing the bit-width by 1 bit:

TABLE 36

| Value | Number of DMRS CDM group(s) without data | DMRS port(s) | $n_{SCID}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 0 | 1 |
| 5 | 2 | 1 | 1 |
| 6 | 2 | 2 | 1 |
| 7 | 2 | 3 | 1 |

In another embodiment, for maxLength=2, when up to 2 front loaded DMRS symbols are used and ports 0, 2, 4 and 6 from TS 38.211 (v15.1.0) Table 6.4.1.1.3-1, i.e., 2 orthogonal ports per CDM group are supported, Table 7.3.1.1.2-6 TS 38.212 (v15.1.0) can be modified as follows in:

TABLE 37

| Value | Number of DMRS CDM group(s) without data | DMRS port(s) | Number of front-loaded symbols | $n_{SCID}$ |
|---|---|---|---|---|
| 0 | 2 | 0 | 1 | 0 |
| 1 | 2 | 0 | 1 | 1 |
| 2 | 2 | 2 | 1 | 0 |
| 3 | 2 | 2 | 1 | 1 |
| 4 | 2 | 0 | 2 | 0 |
| 5 | 2 | 0 | 2 | 1 |
| 6 | 2 | 2 | 2 | 0 |
| 7 | 2 | 2 | 2 | 1 |
| 8 | 2 | 4 | 2 | 0 |
| 9 | 2 | 4 | 2 | 1 |
| 10 | 2 | 6 | 2 | 0 |
| 11 | 2 | 6 | 2 | 1 |
| 12-15 | Reserved | Reserved | Reserved | Reserved |

In another embodiment of this embodiment, for maxLength=2, when up to 2 front-loaded DMRS symbols are used and ports 0-7 from TS 38.211 (v15.1.0) Table 6.4.1.1.3-1, i.e., 4 orthogonal ports per CDM group are supported, Table 7.3.1.1.2-6 TS 38.212 (v15.1.0) can be modified as follows:

TABLE 38

| Value | Number of DMRS CDM group(s) without data | DMRS port(s) | Number of front-loaded symbols | $n_{SCID}$ |
|---|---|---|---|---|
| 0 | 2 | 0 | 1 | 0 |
| 1 | 2 | 1 | 1 | 0 |
| 2 | 2 | 2 | 1 | 0 |
| 3 | 2 | 3 | 1 | 0 |
| 4 | 2 | 0 | 2 | 0 |
| 5 | 2 | 1 | 2 | 0 |
| 6 | 2 | 2 | 2 | 0 |
| 7 | 2 | 3 | 2 | 0 |
| 8 | 2 | 4 | 2 | 0 |
| 9 | 2 | 5 | 2 | 0 |
| 10 | 2 | 6 | 2 | 0 |
| 11 | 2 | 7 | 2 | 0 |
| 12 | 2 | 0 | 1 | 1 |
| 13 | 2 | 1 | 1 | 1 |
| 14 | 2 | 2 | 1 | 1 |
| 15 | 2 | 3 | 1 | 1 |

In this case, the scrambling ID-based initialization is allowed only for the case 1 symbol front-loaded DMRS.

In another embodiment, for maxLength=2, when up to 2 front-loaded DMRS symbols are used and ports 0 and 2 TS 38.211 (v15.1.0) Table 6.4.1.1.3-1, i.e., 1 orthogonal ports per CDM group are supported, Table 7.3.1.1.2-6 TS 38.212 (v15.1.0) can be modified as follows: Table 39:

TABLE 39

| Value | Number of DMRS CDM group(s) without data | DMRS port(s) | Number of front-loaded symbols | $n_{SCID}$ |
|---|---|---|---|---|
| 0 | 2 | 0 | 1 | 0 |
| 1 | 2 | 0 | 1 | 1 |
| 2 | 2 | 2 | 1 | 0 |
| 3 | 2 | 2 | 1 | 1 |
| 4 | 2 | 0 | 2 | 0 |
| 5 | 2 | 0 | 2 | 1 |
| 6 | 2 | 2 | 2 | 0 |
| 7 | 2 | 2 | 2 | 1 |
| 8-15 | Reserved | Reserved | Reserved | Reserved |

In another embodiment, the bit-width can be reduced to 3 in this case and no reserved entries are used.

In another embodiment of this invention, the $n_{SCID}$ can be used to configure one of two possible sequences where the better sequence is configured for use, and better is defined as one of:

(a) The gold sequence which after π/2-BPSK modulation and DFT precoding has a flatter frequency response with flatter being defined as the ratio of the minimum sample power to the maximum sample power; and (b) The gold sequence which after π/2-BPSK modulation has lower energy in the autocorrelation function across the first X lags after the zero-th lag where X can be defined as 10%, 20%, 30% or 40% of the total number of lags.

Support of Multiple Antenna Ports

To support MU-MIMO and SU-MIMO transmission scenarios with multiple MIMO layers, multiple orthogonal DMRS sequences may be supported to facilitate channel estimation on each layer while mitigating interference from other DMRS sequences transmission. According to an example embodiment, additional DMRS sequence which is orthogonal to the sequence, proposed above can be obtained by using an alternative approach to generate the pi/2 BPSK sequence as shown in the equation below, where λ=0 for the 1st DMRS ports and λ=1 for the 2nd DMRS port:

$$r_u^{(\lambda)}(n) = \frac{e^{j\pi((n+\lambda) \mod 2)/2}}{\sqrt{2}}[(1-2b(n)) + j(1-2b(n))];$$

$$n = 0, 1, 2, \ldots, N-1, \lambda = \{0, 1\}.$$

The cover code (w1, w2, w3, w4) can be used to provide a larger number of orthogonal DMRS sequences as follows: (w₁·[$r_u^{(\lambda)}(n)$, $r_u^{(\lambda)}(n)$] w₂·[$r_u^{(\lambda)}(n)$, $r_u^{(\lambda)}(n)$] w₂·[$r_u^{(\lambda)}(n)$, $r_u^{(\lambda)}(n)$] w₃·[$r_u^{(\lambda)}(n)$, $r_u^{(\lambda)}(n)$]), where (w1, w2, w3, w4) is one of the following (1, 1, 1, 1), (1,−1,1,−1), (1,1,−1,−1), (1,−1,−1,1).

Non-Pi/2 BPSK Modulated Case

In another embodiment, for large resource allocations, an M-PSK constellation (with numbered constellation points) in the time domain may be used along with a binary Gold Code based PN sequence with c_init as above configured to each UE. In one embodiment, a UE can start modulation with the 1st constellation point. In another embodiment, the constellation starting point is configured to the UE by DCI. When a sequence bit is 1, the bit is modulated using the next clockwise constellation point. If a bit is zero, the bit is modulated using the next anti-clockwise point. The modulation of the next bit may be clockwise or anti-clockwise w.r.t the current state (constellation point).

In another embodiment, the Rel-16 UL DMRS sequences can be configured to the UE for PUSCH scheduled by DCI format 0_1 or for PUSCH scheduled by DCI format 0_0 in the UE specific search space with CRC scrambled by C-RNTI, MCS-C-RNTI or CS-RNTI.

Figure 11:
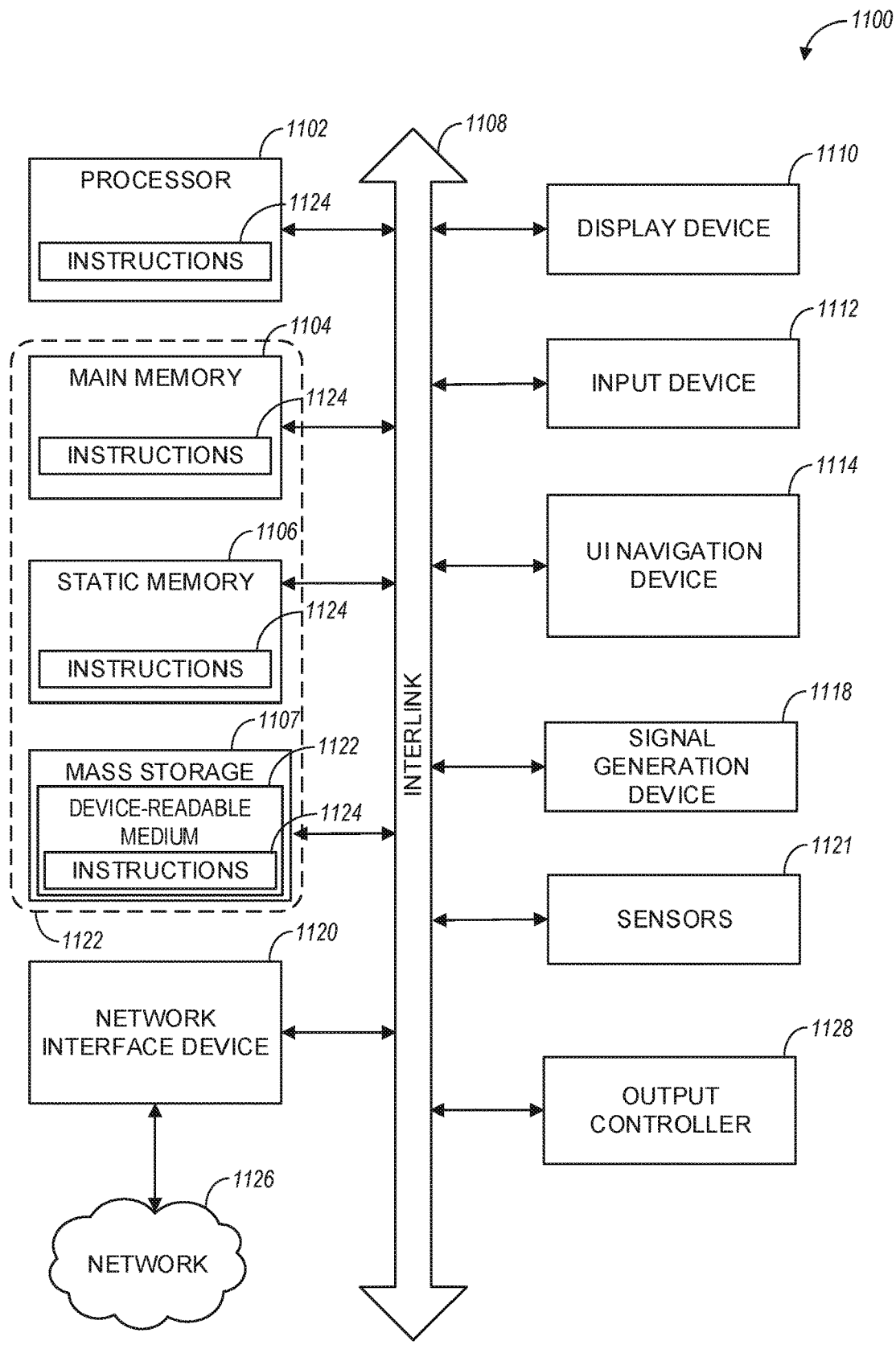
FIG. 11 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 11 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 1100 may operate as a standalone device or may be connected (e.g., networked) to other communication devices.

Circuitry (e.g., processing circuitry) is a collection of circuits implemented in tangible entities of the device 1100 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1100 follow.

In some aspects, the device 1100 may operate as a standalone device or may be connected (e.g., networked) to other devices. In a networked deployment, the communication device 1100 may operate in the capacity of a server communication device, a client communication device, or both in server-client network environments. In an example, the communication device 1100 may act as a peer communication device in peer-to-peer (P2P) (or other distributed) network environment. The communication device 1100 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 1100 may include a hardware processor 1102 (e.g., a central processing unit (CPU), a graphics processing unit (GPU), a hardware processor core, or any combination thereof), a main memory 1104, a static memory 1106, and mass storage 1107 (e.g., hard drive, tape drive, flash storage, or other block or storage devices), some or all of which may communicate with each other via an interlink (e.g., bus) 1108.

The communication device 1100 may further include a display device 1110, an alphanumeric input device 1112 (e.g., a keyboard), and a user interface (UI) navigation device 1114 (e.g., a mouse). In an example, the display device 1110, input device 1112 and UI navigation device 1114 may be a touchscreen display. The communication device 1100 may additionally include a signal generation device 1118 (e.g., a speaker), a network interface device 1120, and one or more sensors 1121, such as a global positioning system (GPS) sensor, compass, accelerometer, or another sensor. The communication device 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1107 may include a communication device-readable medium 1122, on which is stored one or more sets of data structures or instructions 1124 (e.g., software) embodying or utilized by any one or more of the techniques or functions described herein. In some aspects, registers of the processor 1102, the main memory 1104, the static memory 1106, and/or the mass storage 1107 may be, or include (completely or at least partially), the device-readable medium 1122, on which is stored the one or more sets of data structures or instructions 1124, embodying or utilized by any one or more of the techniques or functions described herein. In an example, one or any combination of the hardware processor 1102, the main memory 1104, the static memory 1106, or the mass storage 1116 may constitute the device-readable medium 1122.

As used herein, the term "device-readable medium" is interchangeable with "computer-readable medium" or "machine-readable medium". While the communication device-readable medium 1122 is illustrated as a single medium, the term "communication device-readable medium" may include a single medium or multiple media (e.g., a centralized or distributed database, and/or associated caches and servers) configured to store the one or more instructions 1124. The term "communication device-readable medium" is inclusive of the terms "machine-readable medium" or "computer-readable medium", and may include any medium that is capable of storing, encoding, or carrying instructions (e.g., instructions 1124) for execution by the communication device 1100 and that cause the communication device 1100 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1124 may further be transmitted or received over a communications network 1126 using a transmission medium via the network interface device 1120 utilizing any one of a number of transfer protocols. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input-multiple-output (SIMO), MIMO, or multiple-input-single-output (MISO) techniques. In some examples, the network interface device 1120 may wirelessly communicate using Multiple User MIMO techniques.

The term "transmission medium" shall be taken to include any intangible medium that is capable of storing, encoding or carrying instructions for execution by the communication device 1100, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus of a user equipment (UE), the apparatus comprising:
   processing circuitry, wherein to configure the UE for demodulation reference signal (DMRS) processing in a Previously Presented Radio (NR) network, the processing circuitry is to:
      decode higher layer signaling, the higher layer signaling to indicate whether transform precoding is enabled and to indicate a modulation scheme for a physical uplink shared channel (PUSCH) when transform precoding is enabled;
      generate a set of low Peak-to-Average-Power-Ratio (PAPR) base sequences of length L, L being one of 12, 18 or 24;
      generate a reference signal sequence as a demodulation reference signal (DMRS) using the set of low-PAPR base sequences, based on the modulation scheme when transform precoding is enabled by the higher layer signaling, the modulation scheme being a $\pi/2$-binary phase-shift keying (BPSK) modulation scheme; and
      perform mapping of the DMRS to physical resources for transmission using the PUSCH;
      wherein the reference signal sequence is generated as the DMRS using a length-31 Gold sequence, when transform precoding is not enabled by the higher layer signaling; and memory coupled to the processing circuitry and configured to store the DMRS.

2. The apparatus of claim 1, wherein the set of low-PAPR base sequences includes a length-12 sequence of "0 0 0 0 0 1 0 0 1 0 0 1".

3. The apparatus of claim 1, wherein the set of low-PAPR base sequences includes a length-12 sequence of "0 0 0 1 1 1 1 1 0 0 0 1".

4. The apparatus of claim 1, wherein the set of low-PAPR base sequences includes a length-12 sequence of "0 1 1 1 1 0 1 0 1 1 1 1".

5. The apparatus of claim 1, wherein the set of low-PAPR base sequences includes a length-12 sequence of "0 1 1 0 1 0 0 1 1 0 1".

6. The apparatus of claim 1, wherein the set of low-PAPR base sequences includes a length-12 sequence of "1 0 0 0 1 0 0 0 0 1 1".

7. The apparatus of claim 1, wherein the set of low-PAPR base sequences includes a length-18 sequence of "1 1 1 1 0 1 0 1 1 1 1 0 0 1 0 0 1".

8. The apparatus of claim 1, wherein the set of low-PAPR base sequences includes a length-18 sequence of "1 0 0 1 0 0 0 1 0 0 1 1 1 1 0 1 1 1".

9. The apparatus of claim 1, wherein the set of low-PAPR base sequences includes a length-18 sequence of "0 0 1 0 0 0 1 1 1 0 0 0 1 0 0 1 0 1".

10. The apparatus of claim 1, wherein the set of low-PAPR base sequences includes a length-18 sequence of "1 0 0 1 0 0 0 1 0 0 1 1 1 1 0 1 1 1".

11. A non-transitory computer-readable storage medium that stores instructions for execution by one or more processors of a user equipment (UE), the instructions to configure the one or more processors for demodulation reference signal (DMRS) processing in a Previously Presented Radio (NR) network and to cause the UE to:
    decode higher layer signaling, the higher layer signaling to indicate whether transform precoding is enabled and to indicate a modulation scheme for a physical uplink shared channel (PUSCH) when transform precoding is enabled;
    generate a set of low Peak-to-Average-Power-Ratio (PAPR) base sequences of length L, L being one of 12, 18 or 24;
    generate a reference signal sequence as a demodulation reference signal (DMRS) using the set of low-PAPR base sequences, based on the modulation scheme when transform precoding is enabled by the higher layer signaling, the modulation scheme being a $\pi/2$-binary phase-shift keying (BPSK) modulation scheme; and
    perform mapping of the DMRS to physical resources for transmission using the PUSCH;
    wherein the reference signal sequence is generated as the DMRS using a length-31 Gold sequence, when transform precoding is not enabled by the higher layer signaling.

12. The non-transitory computer-readable storage medium of claim 11, wherein the set of low-PAPR base sequences includes a length-12 sequence of "0 0 0 0 0 1 0 0 1 0 0 1".

13. The non-transitory computer-readable storage medium of claim 11, wherein the set of low-PAPR base sequences includes a length-12 sequence of "0 0 0 1 1 1 1 1 0 0 0 1".

14. The non-transitory computer-readable storage medium of claim 11, wherein the set of low-PAPR base sequences includes a length-12 sequence of "0 1 1 1 1 0 1 0 1 1 1 1".

15. The non-transitory computer-readable storage medium of claim 11, wherein the set of low-PAPR base sequences includes a length-12 sequence of "0 1 1 1 0 1 0 0 1 1 0 1".

16. The non-transitory computer-readable storage medium of claim 11, wherein the set of low-PAPR base sequences includes a length-12 sequence of "1 0 0 0 1 0 0 0 0 0 1 1".

17. The non-transitory computer-readable storage medium of claim 11, wherein the set of low-PAPR base sequences includes a length-18 sequence of "1 1 1 1 0 1 0 1 1 1 1 1 0 0 1 0 0 1".

18. The non-transitory computer-readable storage medium of claim 11, wherein the set of low-PAPR base sequences includes a length-18 sequence of "1 0 0 1 0 0 0 1 0 0 1 1 1 1 0 1 1 1".

19. A non-transitory computer-readable storage medium that stores instructions for execution by one or more processors of a base station, the instructions to configure the one or more processors for demodulation reference signal (DMRS) processing in a Previously Presented Radio (NR) network and to cause the base station to:
  encode higher layer signaling, the higher layer signaling to indicate transform precoding is enabled and to indicate a π/2-binary phase-shift keying (BPSK) modulation scheme for a physical uplink shared channel (PUSCH); and
  decode a DMRS received with uplink data via the PUSCH, the DMRS associated with a set of low Peak-to-Average-Power-Ratio (PAPR) base sequences of length L, L being one of 12, 18 or 24, corresponding to the π/2-BPSK modulation scheme.

20. The non-transitory computer-readable storage medium of claim 19, wherein the set of low-PAPR base sequences includes a length-18 sequence of "1 0 0 1 0 0 0 1 0 0 1 1 1 1 0 1 1 1".

\* \* \* \* \*